(12) United States Patent
Svendsen et al.

(10) Patent No.: US 8,978,196 B2
(45) Date of Patent: Mar. 17, 2015

(54) COVERAGE ROBOT MOBILITY

(71) Applicant: iRobot Corporation, Bedford, MA (US)

(72) Inventors: Selma Svendsen, Andover, MA (US); Daniel N. Ozick, Newtown, MA (US); Christopher M. Casey, Lexington, MA (US); Deepak Ramesh Kapoor, Cupertino, CA (US); Tony L. Campbell, Stoneham, MA (US); Chikyung Won, Tewksbury, MA (US); Christopher John Morse, Malden, MA (US); Scott Thomas Burnett, Windham, NH (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 13/722,566

(22) Filed: Dec. 20, 2012

(65) Prior Publication Data

US 2013/0206170 A1 Aug. 15, 2013

Related U.S. Application Data

(63) Continuation of application No. 12/211,938, filed on Sep. 17, 2008, now Pat. No. 8,661,605, which is a continuation of application No. 11/633,885, filed on Dec. 4, 2006, now Pat. No. 7,441,298.

(60) Provisional application No. 60/741,442, filed on Dec. 2, 2005.

(51) Int. Cl.
*A47L 5/00* (2006.01)
*A47L 11/40* (2006.01)
(Continued)

(52) U.S. Cl.
CPC . *A47L 11/40* (2013.01); *A47L 5/30* (2013.01); *A47L 9/0466* (2013.01); *A47L 11/24* (2013.01);
(Continued)

(58) Field of Classification Search
USPC ............. 15/319, 320, 322, 340.3, 401, 93.1, 15/339, 325, 340.4, 364, 384

IPC .................................................. A47L 9/28,5/00
See application file for complete search history.

(56) References Cited

U.S. PATENT DOCUMENTS 1,755,054 A 4/1930 Darst
1,780,221 A 11/1930 Buchmann
(Continued)

FOREIGN PATENT DOCUMENTS

DE 2128842 C3 12/1980
DE 3317376 C2 12/1987
(Continued)

OTHER PUBLICATIONS

Andersen et al., "Landmark based navigation strategies," SPIE Conference on Mobile Robots XIII, SPIE vol. 3525, pp. 170-181, Jan. 8, 1999.
(Continued)

*Primary Examiner* — David Redding
(74) *Attorney, Agent, or Firm* — Fish & Richardson P.C.

(57) ABSTRACT

An autonomous coverage robot includes a body having at least one outer wall, a drive system disposed on the body and configured to maneuver the robot over a work surface, and a cleaning assembly carried by the body. The cleaning assembly includes first and second cleaning rollers rotatably coupled to the body, a suction assembly having a channel disposed adjacent at least one of the cleaning rollers, and a container in fluid communication with the channel. The container is configured to collect debris drawn into the channel. The suction assembly is configured to draw debris removed from the work surface by at least one of the cleaning rollers into the channel, and the container has a wall common with the at least one outer wall of the body.

26 Claims, 21 Drawing Sheets

(51) Int. Cl.
  *A47L 5/30*   (2006.01)
  *A47L 9/04*   (2006.01)
  *A47L 11/24*   (2006.01)
  *G05D 1/02*   (2006.01)
  *B25J 9/00*   (2006.01)
  *H04L 1/16*   (2006.01)

(52) U.S. Cl.
  CPC .......... *A47L 11/4011* (2013.01); *A47L 11/4013* (2013.01); *A47L 11/4041* (2013.01); *A47L 11/4061* (2013.01); *A47L 11/4072* (2013.01); *G05D 1/0225* (2013.01); *G05D 1/0227* (2013.01); *G05D 1/0234* (2013.01); *G05D 1/0242* (2013.01); *G05D 1/0272* (2013.01); *G05D 1/028* (2013.01); *B25J 9/0003* (2013.01); *A47L 2201/00* (2013.01); *G05D 1/0255* (2013.01); *G05D 1/0274* (2013.01); *G05D 2201/0203* (2013.01); *G05D 2201/0215* (2013.01); *H04L 1/16* (2013.01); *Y02T 10/7258* (2013.01); *Y02B 60/50* (2013.01); *Y10S 901/01* (2013.01); *Y10S 901/50* (2013.01)
  USPC ............. 15/319; 15/339; 15/340.3; 15/340.4; 15/364; 15/384; 15/325; 15/401; 901/1; 901/50

(56) References Cited

U.S. PATENT DOCUMENTS

| | | | |
|---|---|---|---|
| 1,970,302 | A | 8/1934 | Gerhardt |
| 2,136,324 | A | 11/1938 | John |
| 2,302,111 | A | 11/1942 | Dow et al. |
| 2,353,621 | A | 7/1944 | Sav et al. |
| 2,770,825 | A | 11/1956 | Pullen |
| 2,930,055 | A | 3/1960 | Fallen et al. |
| 3,119,369 | A | 1/1964 | Harland et al. |
| 3,166,138 | A | 1/1965 | Dunn |
| 3,333,564 | A | 8/1967 | Waters |
| 3,375,375 | A | 3/1968 | Robert et al. |
| 3,381,652 | A | 5/1968 | Schaefer et al. |
| 3,457,575 | A | 7/1969 | Bienek |
| 3,550,714 | A | 12/1970 | Bellinger |
| 3,569,727 | A | 3/1971 | Aggarwal et al. |
| 3,649,981 | A | 3/1972 | Woodworth |
| 3,674,316 | A | 7/1972 | De Bray |
| 3,678,882 | A | 7/1972 | Kinsella |
| 3,690,559 | A | 9/1972 | Rudloff |
| 3,744,586 | A | 7/1973 | Leinauer |
| 3,756,667 | A | 9/1973 | Bombardier et al. |
| 3,809,004 | A | 5/1974 | Leonheart |
| 3,816,004 | A | 6/1974 | Bignardi |
| 3,845,831 | A | 11/1974 | James |
| RE28,268 | E | 12/1974 | Autrand |
| 3,851,349 | A | 12/1974 | Lowder |
| 3,853,086 | A | 12/1974 | Asplund |
| 3,863,285 | A | 2/1975 | Hukuba |
| 3,888,181 | A | 6/1975 | Kups |
| 3,937,174 | A | 2/1976 | Haaga |
| 3,952,361 | A | 4/1976 | Wilkins |
| 3,989,311 | A | 11/1976 | Debrey |
| 3,989,931 | A | 11/1976 | Phillips |
| 4,004,313 | A | 1/1977 | Capra |
| 4,012,681 | A | 3/1977 | Finger et al. |
| 4,070,170 | A | 1/1978 | Leinfelt |
| 4,099,284 | A | 7/1978 | Shinozaki et al. |
| 4,119,900 | A | 10/1978 | Kremnitz |
| 4,175,589 | A | 11/1979 | Nakamura et al. |
| 4,175,892 | A | 11/1979 | De bray |
| 4,196,727 | A | 4/1980 | Verkaart et al. |
| 4,198,727 | A | 4/1980 | Farmer |
| 4,199,838 | A | 4/1980 | Simonsson |
| 4,209,254 | A | 6/1980 | Reymond et al. |
| D258,901 | S | 4/1981 | Keyworth |
| 4,297,578 | A | 10/1981 | Carter |
| 4,305,234 | A | 12/1981 | Pichelman |
| 4,306,329 | A | 12/1981 | Yokoi |
| 4,309,758 | A | 1/1982 | Halsall et al. |
| 4,328,545 | A | 5/1982 | Halsall et al. |
| 4,367,403 | A | 1/1983 | Miller |
| 4,369,543 | A | 1/1983 | Chen et al. |
| 4,401,909 | A | 8/1983 | Gorsek |
| 4,416,033 | A | 11/1983 | Specht |
| 4,445,245 | A | 5/1984 | Lu |
| 4,465,370 | A | 8/1984 | Yuasa et al. |
| 4,477,998 | A | 10/1984 | You |
| 4,481,692 | A | 11/1984 | Kurz |
| 4,482,960 | A | 11/1984 | Pryor |
| 4,492,058 | A | 1/1985 | Goldfarb et al. |
| 4,513,469 | A | 4/1985 | Godfrey et al. |
| D278,732 | S | 5/1985 | Ohkado |
| 4,518,437 | A | 5/1985 | Sommer |
| 4,534,637 | A | 8/1985 | Suzuki et al. |
| 4,556,313 | A | 12/1985 | Miller et al. |
| 4,575,211 | A | 3/1986 | Matsumura et al. |
| 4,580,311 | A | 4/1986 | Kurz |
| 4,601,082 | A | 7/1986 | Kurz |
| 4,618,213 | A | 10/1986 | Chen |
| 4,620,285 | A | 10/1986 | Perdue |
| 4,624,026 | A | 11/1986 | Olson et al. |
| 4,626,995 | A | 12/1986 | Lofgren et al. |
| 4,628,454 | A | 12/1986 | Ito |
| 4,638,445 | A | 1/1987 | Mattaboni |
| 4,644,156 | A | 2/1987 | Takahashi et al. |
| 4,649,504 | A | 3/1987 | Krouglicof et al. |
| 4,652,917 | A | 3/1987 | Miller |
| 4,654,492 | A | 3/1987 | Koerner et al. |
| 4,654,924 | A | 4/1987 | Getz et al. |
| 4,660,969 | A | 4/1987 | Sorimachi et al. |
| 4,662,854 | A | 5/1987 | Fang |
| 4,674,048 | A | 6/1987 | Okumura |
| 4,679,152 | A | 7/1987 | Perdue |
| 4,680,827 | A | 7/1987 | Hummel |
| 4,696,074 | A | 9/1987 | Cavalli |
| D292,223 | S | 10/1987 | Trumbull |
| 4,700,301 | A | 10/1987 | Dyke |
| 4,700,427 | A | 10/1987 | Knepper |
| 4,703,820 | A | 11/1987 | Reinaud |
| 4,709,773 | A | 12/1987 | Clement et al. |
| 4,710,020 | A | 12/1987 | Maddox et al. |
| 4,712,740 | A | 12/1987 | Duncan et al. |
| 4,716,621 | A | 1/1988 | Zoni |
| 4,728,801 | A | 3/1988 | O'Connor |
| 4,733,343 | A | 3/1988 | Yoneda et al. |
| 4,733,430 | A | 3/1988 | Westergren |
| 4,733,431 | A | 3/1988 | Martin |
| 4,735,136 | A | 4/1988 | Lee et al. |
| 4,735,138 | A | 4/1988 | Gawler et al. |
| 4,748,336 | A | 5/1988 | Fujie et al. |
| 4,748,833 | A | 6/1988 | Nagasawa |
| 4,756,049 | A | 7/1988 | Uehara |
| 4,767,213 | A | 8/1988 | Hummel |
| 4,769,700 | A | 9/1988 | Pryor |
| 4,777,416 | A | 10/1988 | George et al. |
| D298,766 | S | 11/1988 | Tanno et al. |
| 4,782,550 | A | 11/1988 | Jacobs |
| 4,796,198 | A | 1/1989 | Boultinghouse et al. |
| 4,806,751 | A | 2/1989 | Abe et al. |
| 4,811,228 | A | 3/1989 | Hyyppa |
| 4,813,906 | A | 3/1989 | Matsuyama et al. |
| 4,815,157 | A | 3/1989 | Tsuchiya |
| 4,817,000 | A | 3/1989 | Eberhardt |
| 4,818,875 | A | 4/1989 | Weiner |
| 4,829,442 | A | 5/1989 | Kadonoff et al. |
| 4,829,626 | A | 5/1989 | Harkonen et al. |
| 4,832,098 | A | 5/1989 | Palinkas et al. |
| 4,851,661 | A | 7/1989 | Everett |
| 4,854,000 | A | 8/1989 | Takimoto |
| 4,854,006 | A | 8/1989 | Nishimura et al. |
| 4,855,915 | A | 8/1989 | Dallaire |
| 4,857,912 | A | 8/1989 | Everett et al. |
| 4,858,132 | A | 8/1989 | Holmquist |
| 4,867,570 | A | 9/1989 | Sorimachi et al. |
| 4,880,474 | A | 11/1989 | Koharagi et al. |
| 4,887,415 | A | 12/1989 | Martin |

(56) References Cited

U.S. PATENT DOCUMENTS

| | | |
|---|---|---|
| 4,891,762 A | 1/1990 | Chotiros |
| 4,893,025 A | 1/1990 | Lee |
| 4,901,394 A | 2/1990 | Nakamura et al. |
| 4,905,151 A | 2/1990 | Weiman et al. |
| 4,909,972 A | 3/1990 | Britz |
| 4,912,643 A | 3/1990 | Beirne |
| 4,918,441 A | 4/1990 | Bohman |
| 4,919,224 A | 4/1990 | Shyu et al. |
| 4,919,489 A | 4/1990 | Kopsco |
| 4,920,060 A | 4/1990 | Parrent et al. |
| 4,920,605 A | 5/1990 | Takashima |
| 4,933,864 A | 6/1990 | Evans et al. |
| 4,937,912 A | 7/1990 | Kurz |
| 4,953,253 A | 9/1990 | Fukuda et al. |
| 4,954,962 A | 9/1990 | Evans et al. |
| 4,955,714 A | 9/1990 | Stotler et al. |
| 4,956,891 A | 9/1990 | Wulff |
| 4,961,303 A | 10/1990 | McCarty et al. |
| 4,961,304 A | 10/1990 | Ovsborn et al. |
| 4,962,453 A | 10/1990 | Pong et al. |
| 4,967,862 A | 11/1990 | Pong et al. |
| 4,971,591 A | 11/1990 | Raviv et al. |
| 4,973,912 A | 11/1990 | Kaminski et al. |
| 4,974,283 A | 12/1990 | Holsten et al. |
| 4,977,618 A | 12/1990 | Allen |
| 4,977,639 A | 12/1990 | Takahashi et al. |
| 4,986,663 A | 1/1991 | Cecchi et al. |
| 5,001,635 A | 3/1991 | Yasutomi et al. |
| 5,002,145 A | 3/1991 | Wakaumi et al. |
| 5,012,886 A | 5/1991 | Jonas et al. |
| 5,018,240 A | 5/1991 | Holman |
| 5,020,186 A | 6/1991 | Lessig et al. |
| 5,022,812 A | 6/1991 | Coughlan et al. |
| 5,023,788 A | 6/1991 | Kitazume et al. |
| 5,024,529 A | 6/1991 | Svetkoff et al. |
| D318,500 S | 7/1991 | Malewicki et al. |
| 5,032,775 A | 7/1991 | Mizuno et al. |
| 5,033,151 A | 7/1991 | Kraft et al. |
| 5,033,291 A | 7/1991 | Podoloff et al. |
| 5,040,116 A | 8/1991 | Evans et al. |
| 5,045,769 A | 9/1991 | Everett |
| 5,049,802 A | 9/1991 | Mintus et al. |
| 5,051,906 A | 9/1991 | Evans et al. |
| 5,062,819 A | 11/1991 | Mallory |
| 5,070,567 A | 12/1991 | Holland |
| 5,084,934 A | 2/1992 | Lessig et al. |
| 5,086,535 A | 2/1992 | Grossmeyer et al. |
| 5,090,321 A | 2/1992 | Abouav |
| 5,093,955 A | 3/1992 | Blehert et al. |
| 5,094,311 A | 3/1992 | Akeel |
| 5,098,262 A | 3/1992 | Wecker et al. |
| 5,105,502 A | 4/1992 | Takashima |
| 5,105,550 A | 4/1992 | Shenoha |
| 5,109,566 A | 5/1992 | Kobayashi et al. |
| 5,111,401 A | 5/1992 | Everett, Jr. et al. |
| 5,115,538 A | 5/1992 | Cochran et al. |
| 5,127,128 A | 7/1992 | Lee |
| 5,136,675 A | 8/1992 | Hodson |
| 5,136,750 A | 8/1992 | Takashima et al. |
| 5,142,985 A | 9/1992 | Stearns et al. |
| 5,144,471 A | 9/1992 | Takanashi et al. |
| 5,144,714 A | 9/1992 | Mori et al. |
| 5,144,715 A | 9/1992 | Matsuyo et al. |
| 5,152,028 A | 10/1992 | Hirano |
| 5,152,202 A | 10/1992 | Strauss |
| 5,154,617 A | 10/1992 | Suman et al. |
| 5,155,684 A | 10/1992 | Burke et al. |
| 5,163,202 A | 11/1992 | Kawakami et al. |
| 5,163,320 A | 11/1992 | Goshima et al. |
| 5,164,579 A | 11/1992 | Pryor et al. |
| 5,165,064 A | 11/1992 | Mattaboni |
| 5,170,352 A | 12/1992 | McTamaney et al. |
| 5,173,881 A | 12/1992 | Sindle |
| 5,182,833 A | 2/1993 | Yamaguchi et al. |
| 5,187,662 A | 2/1993 | Kamimura et al. |
| 5,202,742 A | 4/1993 | Frank et al. |
| 5,204,814 A | 4/1993 | Noonan et al. |
| 5,206,500 A | 4/1993 | Decker et al. |
| 5,208,521 A | 5/1993 | Aoyama |
| 5,216,777 A | 6/1993 | Moro et al. |
| 5,222,786 A | 6/1993 | Sovis et al. |
| 5,227,985 A | 7/1993 | DeMenthon |
| 5,233,682 A | 8/1993 | Abe et al. |
| 5,239,720 A | 8/1993 | Wood et al. |
| 5,251,358 A | 10/1993 | Moro et al. |
| 5,261,139 A | 11/1993 | Lewis |
| 5,276,618 A | 1/1994 | Everett |
| 5,276,939 A | 1/1994 | Uenishi |
| 5,277,064 A | 1/1994 | Knigga et al. |
| 5,279,672 A | 1/1994 | Betker et al. |
| 5,284,452 A | 2/1994 | Corona |
| 5,284,522 A | 2/1994 | Kobayashi et al. |
| 5,293,955 A | 3/1994 | Lee |
| D345,707 S | 4/1994 | Alister |
| 5,303,448 A | 4/1994 | Hennessey et al. |
| 5,307,273 A | 4/1994 | Oh et al. |
| 5,309,592 A | 5/1994 | Hiratsuka |
| 5,310,379 A | 5/1994 | Hippely et al. |
| 5,315,227 A | 5/1994 | Pierson et al. |
| 5,319,827 A | 6/1994 | Yang |
| 5,319,828 A | 6/1994 | Waldhauser et al. |
| 5,321,614 A | 6/1994 | Ashworth |
| 5,323,483 A | 6/1994 | Baeg |
| 5,324,948 A | 6/1994 | Dudar et al. |
| 5,331,713 A | 7/1994 | Tipton |
| 5,341,186 A | 8/1994 | Kato |
| 5,341,540 A | 8/1994 | Soupert et al. |
| 5,341,549 A | 8/1994 | Wirtz et al. |
| 5,345,649 A | 9/1994 | Whitlow |
| 5,352,901 A | 10/1994 | Poorman |
| 5,353,224 A | 10/1994 | Lee et al. |
| 5,363,305 A | 11/1994 | Cox et al. |
| 5,363,935 A | 11/1994 | Schempf et al. |
| 5,369,347 A | 11/1994 | Yoo |
| 5,369,838 A | 12/1994 | Wood et al. |
| 5,386,862 A | 2/1995 | Glover et al. |
| 5,399,951 A | 3/1995 | Lavallee et al. |
| 5,400,244 A | 3/1995 | Watanabe et al. |
| 5,404,612 A | 4/1995 | Ishikawa |
| 5,410,479 A | 4/1995 | Coker |
| 5,435,405 A | 7/1995 | Schempf et al. |
| 5,440,216 A | 8/1995 | Kim |
| 5,442,358 A | 8/1995 | Keeler et al. |
| 5,444,965 A | 8/1995 | Colens |
| 5,446,356 A | 8/1995 | Kim |
| 5,446,445 A | 8/1995 | Bloomfield et al. |
| 5,451,135 A | 9/1995 | Schempf et al. |
| 5,454,129 A | 10/1995 | Kell |
| 5,455,982 A | 10/1995 | Armstrong et al. |
| 5,465,525 A | 11/1995 | Mifune et al. |
| 5,465,619 A | 11/1995 | Sotack et al. |
| 5,467,273 A | 11/1995 | Faibish et al. |
| 5,471,560 A | 11/1995 | Allard et al. |
| 5,491,670 A | 2/1996 | Weber |
| 5,497,529 A | 3/1996 | Boesi |
| 5,498,948 A | 3/1996 | Bruni et al. |
| 5,502,638 A | 3/1996 | Takenaka |
| 5,505,072 A | 4/1996 | Oreper |
| 5,507,067 A | 4/1996 | Hoekstra et al. |
| 5,510,893 A | 4/1996 | Suzuki |
| 5,511,147 A | 4/1996 | Abdel |
| 5,515,572 A | 5/1996 | Hoekstra et al. |
| 5,534,762 A | 7/1996 | Kim |
| 5,535,476 A | 7/1996 | Kresse et al. |
| 5,537,017 A | 7/1996 | Feiten et al. |
| 5,537,711 A | 7/1996 | Tseng |
| 5,539,953 A | 7/1996 | Kurz |
| 5,542,146 A | 8/1996 | Hoekstra et al. |
| 5,542,148 A | 8/1996 | Young |
| 5,546,631 A | 8/1996 | Chambon |
| 5,548,511 A | 8/1996 | Bancroft |
| 5,551,119 A | 9/1996 | Wörwag |
| 5,551,525 A | 9/1996 | Pack et al. |
| 5,553,349 A | 9/1996 | Kilstrom et al. |

(56) References Cited

U.S. PATENT DOCUMENTS

| | | |
|---|---|---|
| 5,555,587 A | 9/1996 | Guha |
| 5,560,077 A | 10/1996 | Crotchett |
| 5,568,589 A | 10/1996 | Hwang |
| D375,592 S | 11/1996 | Ljunggren |
| 5,608,306 A | 3/1997 | Rybeck et al. |
| 5,608,894 A | 3/1997 | Kawakami et al. |
| 5,608,944 A | 3/1997 | Gordon |
| 5,610,488 A | 3/1997 | Miyazawa |
| 5,611,106 A | 3/1997 | Wulff |
| 5,611,108 A | 3/1997 | Knowlton et al. |
| 5,613,261 A | 3/1997 | Kawakami et al. |
| 5,613,269 A | 3/1997 | Miwa |
| 5,621,291 A | 4/1997 | Lee |
| 5,622,236 A | 4/1997 | Azumi et al. |
| 5,634,237 A | 6/1997 | Paranjpe |
| 5,634,239 A | 6/1997 | Tuvin et al. |
| 5,636,402 A | 6/1997 | Kubo et al. |
| 5,642,299 A | 6/1997 | Hardin et al. |
| 5,646,494 A | 7/1997 | Han |
| 5,647,554 A | 7/1997 | Ikegami et al. |
| 5,650,702 A | 7/1997 | Azumi |
| 5,652,489 A | 7/1997 | Kawakami |
| 5,682,313 A | 10/1997 | Edlund et al. |
| 5,682,839 A | 11/1997 | Grimsley et al. |
| 5,696,675 A | 12/1997 | Nakamura et al. |
| 5,698,861 A | 12/1997 | Oh |
| 5,709,007 A | 1/1998 | Chiang |
| 5,710,506 A | 1/1998 | Broell et al. |
| 5,714,119 A | 2/1998 | Kawagoe et al. |
| 5,717,169 A | 2/1998 | Liang et al. |
| 5,717,484 A | 2/1998 | Hamaguchi et al. |
| 5,720,077 A | 2/1998 | Nakamura et al. |
| 5,732,401 A | 3/1998 | Conway |
| 5,735,017 A | 4/1998 | Barnes et al. |
| 5,735,959 A | 4/1998 | Kubo et al. |
| 5,742,975 A | 4/1998 | Knowlton et al. |
| 5,745,235 A | 4/1998 | Vercammen et al. |
| 5,752,871 A | 5/1998 | Tsuzuki |
| 5,756,904 A | 5/1998 | Oreper et al. |
| 5,761,762 A | 6/1998 | Kubo |
| 5,764,888 A | 6/1998 | Bolan et al. |
| 5,767,437 A | 6/1998 | Rogers |
| 5,767,960 A | 6/1998 | Orman |
| 5,770,936 A | 6/1998 | Hirai et al. |
| 5,777,596 A | 7/1998 | Herbert |
| 5,778,486 A | 7/1998 | Kim |
| 5,781,697 A | 7/1998 | Jeong |
| 5,781,960 A | 7/1998 | Kilstrom et al. |
| 5,784,755 A | 7/1998 | Karr et al. |
| 5,786,602 A | 7/1998 | Pryor et al. |
| 5,787,545 A | 8/1998 | Colens |
| 5,793,900 A | 8/1998 | Nourbakhsh et al. |
| 5,794,297 A | 8/1998 | Muta |
| 5,802,665 A | 9/1998 | Knowlton et al. |
| 5,812,267 A | 9/1998 | Everett et al. |
| 5,814,808 A | 9/1998 | Takada et al. |
| 5,815,880 A | 10/1998 | Nakanishi |
| 5,815,884 A | 10/1998 | Imamura et al. |
| 5,819,008 A | 10/1998 | Asama et al. |
| 5,819,360 A | 10/1998 | Fujii |
| 5,819,936 A | 10/1998 | Saveliev et al. |
| 5,820,821 A | 10/1998 | Kawagoe et al. |
| 5,821,730 A | 10/1998 | Drapkin |
| 5,825,981 A | 10/1998 | Matsuda |
| 5,828,770 A | 10/1998 | Leis et al. |
| 5,831,597 A | 11/1998 | West et al. |
| 5,836,045 A | 11/1998 | Anthony et al. |
| 5,839,156 A | 11/1998 | Park et al. |
| 5,839,532 A | 11/1998 | Yoshiji et al. |
| 5,841,259 A | 11/1998 | Kim et al. |
| 5,867,800 A | 2/1999 | Leif |
| 5,867,861 A | 2/1999 | Kasen et al. |
| 5,869,910 A | 2/1999 | Colens |
| 5,894,621 A | 4/1999 | Kubo |
| 5,896,611 A | 4/1999 | Haaga |
| 5,903,124 A | 5/1999 | Kawakami |
| 5,905,209 A | 5/1999 | Oreper |
| 5,907,886 A | 6/1999 | Buscher |
| 5,910,700 A | 6/1999 | Crotzer |
| 5,911,260 A | 6/1999 | Suzuki |
| 5,916,008 A | 6/1999 | Wong |
| 5,924,167 A | 7/1999 | Wright et al. |
| 5,926,909 A | 7/1999 | McGee |
| 5,933,102 A | 8/1999 | Miller et al. |
| 5,933,913 A | 8/1999 | Wright et al. |
| 5,935,179 A | 8/1999 | Kleiner et al. |
| 5,935,333 A | 8/1999 | Davis |
| 5,940,346 A | 8/1999 | Sadowsky et al. |
| 5,940,927 A | 8/1999 | Haegermarck et al. |
| 5,940,930 A | 8/1999 | Oh et al. |
| 5,942,869 A | 8/1999 | Katou et al. |
| 5,943,730 A | 8/1999 | Boomgaarden |
| 5,943,733 A | 8/1999 | Tagliaferri |
| 5,943,933 A | 8/1999 | Evans et al. |
| 5,947,225 A | 9/1999 | Kawakami et al. |
| 5,950,408 A | 9/1999 | Schaedler |
| 5,959,423 A | 9/1999 | Nakanishi et al. |
| 5,968,281 A | 10/1999 | Wright et al. |
| 5,974,348 A | 10/1999 | Rocks |
| 5,974,365 A | 10/1999 | Mitchell |
| 5,983,448 A | 11/1999 | Wright et al. |
| 5,984,880 A | 11/1999 | Lander et al. |
| 5,987,383 A | 11/1999 | Keller et al. |
| 5,989,700 A | 11/1999 | Krivopal |
| 5,991,951 A | 11/1999 | Kubo et al. |
| 5,995,883 A | 11/1999 | Nishikado |
| 5,995,884 A | 11/1999 | Allen et al. |
| 5,996,167 A | 12/1999 | Close |
| 5,998,953 A | 12/1999 | Nakamura et al. |
| 5,998,971 A | 12/1999 | Corbridge |
| 6,000,088 A | 12/1999 | Wright et al. |
| 6,009,358 A | 12/1999 | Angott et al. |
| 6,012,618 A | 1/2000 | Matsuo et al. |
| 6,021,545 A | 2/2000 | Delgado et al. |
| 6,023,813 A | 2/2000 | Thatcher et al. |
| 6,023,814 A | 2/2000 | Imamura |
| 6,025,687 A | 2/2000 | Himeda et al. |
| 6,026,539 A | 2/2000 | Mouw et al. |
| 6,030,464 A | 2/2000 | Azevedo |
| 6,030,465 A | 2/2000 | Marcussen et al. |
| 6,032,327 A | 3/2000 | Oka et al. |
| 6,032,542 A | 3/2000 | Warnick et al. |
| 6,036,572 A | 3/2000 | Sze |
| 6,038,501 A | 3/2000 | Kawakami |
| 6,040,669 A | 3/2000 | Hog |
| 6,041,471 A | 3/2000 | Charky et al. |
| 6,041,472 A | 3/2000 | Kasen et al. |
| 6,046,800 A | 4/2000 | Ohtomo et al. |
| 6,049,620 A | 4/2000 | Dickinson et al. |
| 6,050,648 A | 4/2000 | Keleny |
| 6,052,821 A | 4/2000 | Chouly et al. |
| 6,055,042 A | 4/2000 | Sarangapani |
| 6,055,702 A | 5/2000 | Imamura et al. |
| 6,061,868 A | 5/2000 | Moritsch et al. |
| 6,065,182 A | 5/2000 | Wright et al. |
| 6,070,290 A | 6/2000 | Schwarze et al. |
| 6,073,432 A | 6/2000 | Schaedler |
| 6,076,025 A | 6/2000 | Ueno et al. |
| 6,076,026 A | 6/2000 | Jambhekar et al. |
| 6,076,226 A | 6/2000 | Reed |
| 6,076,227 A | 6/2000 | Schallig et al. |
| 6,081,257 A | 6/2000 | Zeller |
| 6,088,020 A | 7/2000 | Mor |
| 6,094,775 A | 8/2000 | Behmer |
| 6,099,091 A | 8/2000 | Campbell |
| 6,101,670 A | 8/2000 | Song |
| 6,101,671 A | 8/2000 | Wright et al. |
| 6,108,031 A | 8/2000 | King et al. |
| 6,108,067 A | 8/2000 | Okamoto |
| 6,108,076 A | 8/2000 | Hanseder |
| 6,108,269 A | 8/2000 | Kabel |
| 6,108,597 A | 8/2000 | Kirchner et al. |
| 6,108,859 A | 8/2000 | Burgoon |
| 6,112,143 A | 8/2000 | Allen et al. |

(56) References Cited

U.S. PATENT DOCUMENTS

| | | |
|---|---|---|
| 6,112,996 A | 9/2000 | Matsuo |
| 6,119,057 A | 9/2000 | Kawagoe |
| 6,122,798 A | 9/2000 | Kobayashi et al. |
| 6,124,694 A | 9/2000 | Bancroft et al. |
| 6,125,498 A | 10/2000 | Roberts et al. |
| 6,131,237 A | 10/2000 | Kasper et al. |
| 6,138,063 A | 10/2000 | Himeda |
| 6,142,252 A | 11/2000 | Kinto et al. |
| 6,146,041 A | 11/2000 | Chen et al. |
| 6,146,278 A | 11/2000 | Kobayashi |
| 6,154,279 A | 11/2000 | Thayer |
| 6,154,694 A | 11/2000 | Aoki et al. |
| 6,160,479 A | 12/2000 | Ahlen et al. |
| 6,167,332 A | 12/2000 | Kurtzberg et al. |
| 6,167,587 B1 | 1/2001 | Kasper et al. |
| 6,192,548 B1 | 2/2001 | Huffman |
| 6,192,549 B1 | 2/2001 | Kasen et al. |
| 6,202,243 B1 | 3/2001 | Beaufoy et al. |
| 6,216,307 B1 | 4/2001 | Kaleta et al. |
| 6,220,865 B1 | 4/2001 | Macri et al. |
| 6,226,830 B1 | 5/2001 | Hendriks et al. |
| 6,230,362 B1 | 5/2001 | Kasper et al. |
| 6,237,741 B1 | 5/2001 | Guidetti |
| 6,240,342 B1 | 5/2001 | Fiegert et al. |
| 6,243,913 B1 | 6/2001 | Frank et al. |
| 6,255,793 B1 | 7/2001 | Peless et al. |
| 6,259,979 B1 | 7/2001 | Holmquist |
| 6,261,379 B1 | 7/2001 | Conrad et al. |
| 6,263,539 B1 | 7/2001 | Baig |
| 6,263,989 B1 | 7/2001 | Won |
| 6,272,936 B1 | 8/2001 | Oreper et al. |
| 6,276,478 B1 | 8/2001 | Hopkins et al. |
| 6,278,918 B1 | 8/2001 | Dickson et al. |
| 6,279,196 B2 | 8/2001 | Kasen et al. |
| 6,282,526 B1 | 8/2001 | Ganesh |
| 6,283,034 B1 | 9/2001 | Miles |
| 6,285,778 B1 | 9/2001 | Nakajima et al. |
| 6,285,930 B1 | 9/2001 | Dickson et al. |
| 6,286,181 B1 | 9/2001 | Kasper et al. |
| 6,300,737 B1 | 10/2001 | Bergvall et al. |
| 6,321,337 B1 | 11/2001 | Reshef et al. |
| 6,321,515 B1 | 11/2001 | Colens |
| 6,323,570 B1 | 11/2001 | Nishimura et al. |
| 6,324,714 B1 | 12/2001 | Walz et al. |
| 6,327,741 B1 | 12/2001 | Reed |
| 6,332,400 B1 | 12/2001 | Meyer |
| 6,339,735 B1 | 1/2002 | Peless et al. |
| 6,362,875 B1 | 3/2002 | Burkley |
| 6,370,453 B2 | 4/2002 | Sommer |
| 6,374,155 B1 | 4/2002 | Wallach et al. |
| 6,374,157 B1 | 4/2002 | Takamura |
| 6,381,802 B2 | 5/2002 | Park |
| 6,385,515 B1 | 5/2002 | Dickson et al. |
| 6,388,013 B1 | 5/2002 | Saraf et al. |
| 6,389,329 B1 | 5/2002 | Colens |
| 6,397,429 B1 | 6/2002 | Legatt et al. |
| 6,400,048 B1 | 6/2002 | Nishimura et al. |
| 6,401,294 B2 | 6/2002 | Kasper |
| 6,408,226 B1 | 6/2002 | Byrne et al. |
| 6,412,141 B2 | 7/2002 | Kasper et al. |
| 6,415,203 B1 | 7/2002 | Inoue et al. |
| 6,418,586 B2 | 7/2002 | Fulghum |
| 6,421,870 B1 | 7/2002 | Basham et al. |
| 6,427,285 B1 | 8/2002 | Legatt et al. |
| 6,430,471 B1 | 8/2002 | Kintou et al. |
| 6,431,296 B1 | 8/2002 | Won |
| 6,437,227 B1 | 8/2002 | Theimer |
| 6,437,465 B1 | 8/2002 | Nishimura et al. |
| 6,438,456 B1 | 8/2002 | Feddema et al. |
| 6,438,793 B1 | 8/2002 | Miner et al. |
| 6,442,476 B1 | 8/2002 | Poropat |
| 6,442,789 B1 | 9/2002 | Legatt et al. |
| 6,443,509 B1 | 9/2002 | Levin et al. |
| 6,444,003 B1 | 9/2002 | Sutcliffe |
| 6,446,302 B1 | 9/2002 | Kasper et al. |
| 6,454,036 B1 | 9/2002 | Airey et al. |
| D464,091 S | 10/2002 | Christianson |
| 6,457,206 B1 | 10/2002 | Judson |
| 6,459,955 B1 | 10/2002 | Bartsch et al. |
| 6,463,368 B1 | 10/2002 | Feiten et al. |
| 6,465,982 B1 | 10/2002 | Bergvall et al. |
| 6,473,167 B1 | 10/2002 | Odell |
| 6,480,762 B1 | 11/2002 | Uchikubo et al. |
| 6,481,515 B1 | 11/2002 | Kirkpatrick et al. |
| 6,482,252 B1 | 11/2002 | Conrad et al. |
| 6,490,539 B1 | 12/2002 | Dickson et al. |
| 6,491,127 B1 | 12/2002 | Holmberg et al. |
| 6,493,612 B1 | 12/2002 | Bisset et al. |
| 6,493,613 B2 | 12/2002 | Peless et al. |
| 6,496,754 B2 | 12/2002 | Song et al. |
| 6,496,755 B2 | 12/2002 | Wallach et al. |
| 6,502,657 B2 | 1/2003 | Kerrebrock et al. |
| 6,504,610 B1 | 1/2003 | Bauer et al. |
| 6,507,773 B2 | 1/2003 | Parker et al. |
| 6,519,808 B2 | 2/2003 | Legatt et al. |
| 6,525,509 B1 | 2/2003 | Petersson et al. |
| D471,243 S | 3/2003 | Cioffi et al. |
| 6,530,102 B1 | 3/2003 | Pierce et al. |
| 6,530,117 B2 | 3/2003 | Peterson |
| 6,532,404 B2 | 3/2003 | Colens |
| 6,535,793 B2 | 3/2003 | Allard |
| 6,540,424 B1 | 4/2003 | Hall et al. |
| 6,540,607 B2 | 4/2003 | Mokris et al. |
| 6,548,982 B1 | 4/2003 | Papanikolopoulos et al. |
| 6,553,612 B1 | 4/2003 | Dyson et al. |
| 6,556,722 B1 | 4/2003 | Russell et al. |
| 6,556,892 B2 | 4/2003 | Kuroki et al. |
| 6,557,104 B2 | 4/2003 | Vu et al. |
| D474,312 S | 5/2003 | Stephens et al. |
| 6,563,130 B2 | 5/2003 | Dworkowski et al. |
| 6,571,415 B2 | 6/2003 | Gerber et al. |
| 6,571,422 B1 | 6/2003 | Gordon et al. |
| 6,572,711 B2 | 6/2003 | Sclafani et al. |
| 6,574,536 B1 | 6/2003 | Kawagoe et al. |
| 6,580,246 B2 | 6/2003 | Jacobs |
| 6,584,376 B1 | 6/2003 | Van Kommer |
| 6,586,908 B2 | 7/2003 | Petersson et al. |
| 6,587,573 B1 | 7/2003 | Stam et al. |
| 6,590,222 B1 | 7/2003 | Bisset et al. |
| 6,594,551 B2 | 7/2003 | McKinney et al. |
| 6,594,844 B2 | 7/2003 | Jones |
| 6,597,076 B2 | 7/2003 | Scheible et al. |
| D478,884 S | 8/2003 | Slipy et al. |
| 6,601,265 B1 | 8/2003 | Burlington |
| 6,604,021 B2 | 8/2003 | Imai et al. |
| 6,604,022 B2 | 8/2003 | Parker et al. |
| 6,605,156 B1 * | 8/2003 | Clark et al. ................ 134/6 |
| 6,609,269 B2 | 8/2003 | Kasper |
| 6,611,120 B2 | 8/2003 | Song et al. |
| 6,611,734 B2 | 8/2003 | Parker et al. |
| 6,611,738 B2 | 8/2003 | Ruffner |
| 6,615,108 B1 | 9/2003 | Peless et al. |
| 6,615,434 B1 | 9/2003 | Davis et al. |
| 6,615,885 B1 | 9/2003 | Ohm |
| 6,622,465 B2 | 9/2003 | Jerome et al. |
| 6,624,744 B1 | 9/2003 | Wilson et al. |
| 6,625,843 B2 | 9/2003 | Kim et al. |
| 6,629,028 B2 | 9/2003 | Paromtchik et al. |
| 6,633,150 B1 | 10/2003 | Wallach et al. |
| 6,637,546 B1 | 10/2003 | Wang |
| 6,639,659 B2 | 10/2003 | Granger |
| 6,658,325 B2 | 12/2003 | Zweig |
| 6,658,354 B2 | 12/2003 | Lin |
| 6,658,692 B2 | 12/2003 | Lenkiewicz et al. |
| 6,658,693 B1 | 12/2003 | Reed |
| 6,661,239 B1 | 12/2003 | Ozick |
| 6,662,889 B2 | 12/2003 | De Fazio et al. |
| 6,668,951 B2 | 12/2003 | Won |
| 6,670,817 B2 | 12/2003 | Fournier et al. |
| 6,671,592 B1 | 12/2003 | Bisset et al. |
| 6,671,925 B2 | 1/2004 | Field et al. |
| 6,677,938 B1 | 1/2004 | Maynard |
| 6,687,571 B1 | 2/2004 | Byrne et al. |
| 6,690,134 B1 | 2/2004 | Jones et al. |

(56) References Cited

U.S. PATENT DOCUMENTS

| | | |
|---|---|---|
| 6,690,993 B2 | 2/2004 | Foulke et al. |
| 6,697,147 B2 | 2/2004 | Ko et al. |
| 6,705,332 B2 | 3/2004 | Field et al. |
| 6,711,280 B2 | 3/2004 | Stafsudd et al. |
| 6,732,826 B2 | 5/2004 | Song et al. |
| 6,735,811 B2 | 5/2004 | Field et al. |
| 6,735,812 B2 | 5/2004 | Hekman et al. |
| 6,737,591 B1 | 5/2004 | Lapstun et al. |
| 6,741,054 B2 | 5/2004 | Koselka et al. |
| 6,741,364 B2 | 5/2004 | Lange et al. |
| 6,748,297 B2 | 6/2004 | Song et al. |
| 6,756,703 B2 | 6/2004 | Chang |
| 6,760,647 B2 | 7/2004 | Nourbakhsh et al. |
| 6,764,373 B1 | 7/2004 | Osawa et al. |
| 6,769,004 B2 | 7/2004 | Barrett |
| 6,774,596 B1 | 8/2004 | Bisset |
| 6,779,380 B1 | 8/2004 | Nieuwkamp |
| 6,781,338 B2 | 8/2004 | Jones et al. |
| 6,809,490 B2 | 10/2004 | Jones et al. |
| 6,810,305 B2 | 10/2004 | Kirkpatrick |
| 6,810,350 B2 | 10/2004 | Blakley |
| 6,830,120 B1 | 12/2004 | Yashima et al. |
| 6,832,407 B2 | 12/2004 | Salem et al. |
| 6,836,701 B2 | 12/2004 | McKee |
| 6,841,963 B2 | 1/2005 | Song et al. |
| 6,845,297 B2 | 1/2005 | Allard |
| 6,848,146 B2 | 2/2005 | Wright et al. |
| 6,854,148 B1 | 2/2005 | Rief et al. |
| 6,856,811 B2 | 2/2005 | Burdue et al. |
| 6,859,010 B2 | 2/2005 | Jeon et al. |
| 6,859,682 B2 | 2/2005 | Naka et al. |
| 6,860,206 B1 | 3/2005 | Rudakevych et al. |
| 6,865,447 B2 | 3/2005 | Lau et al. |
| 6,870,792 B2 | 3/2005 | Chiappetta |
| 6,871,115 B2 | 3/2005 | Huang et al. |
| 6,883,201 B2 | 4/2005 | Jones et al. |
| 6,886,651 B1 | 5/2005 | Slocum et al. |
| 6,888,333 B2 | 5/2005 | Laby |
| 6,901,624 B2 | 6/2005 | Mori et al. |
| 6,906,702 B1 | 6/2005 | Tanaka et al. |
| 6,914,403 B2 | 7/2005 | Tsurumi |
| 6,917,854 B2 | 7/2005 | Bayer |
| 6,925,357 B2 | 8/2005 | Wang et al. |
| 6,925,679 B2 | 8/2005 | Wallach et al. |
| 6,929,548 B2 | 8/2005 | Wang |
| D510,066 S | 9/2005 | Hickey et al. |
| 6,938,298 B2 | 9/2005 | Aasen |
| 6,940,291 B1 | 9/2005 | Ozick |
| 6,941,199 B1 | 9/2005 | Bottomley et al. |
| 6,956,348 B2 | 10/2005 | Landry et al. |
| 6,957,712 B2 | 10/2005 | Song et al. |
| 6,960,986 B2 | 11/2005 | Asama et al. |
| 6,965,209 B2 | 11/2005 | Jones et al. |
| 6,965,211 B2 | 11/2005 | Tsurumi |
| 6,968,592 B2 | 11/2005 | Takeuchi et al. |
| 6,971,140 B2 | 12/2005 | Kim |
| 6,975,246 B1 | 12/2005 | Trudeau |
| 6,980,229 B1 | 12/2005 | Ebersole |
| 6,985,556 B2 | 1/2006 | Shanmugavel et al. |
| 6,993,954 B1 | 2/2006 | George et al. |
| 6,999,850 B2 | 2/2006 | McDonald |
| 7,013,527 B2 | 3/2006 | Thomas et al. |
| 7,024,278 B2 | 4/2006 | Chiappetta et al. |
| 7,024,280 B2 | 4/2006 | Parker et al. |
| 7,027,893 B2 | 4/2006 | Perry et al. |
| 7,030,768 B2 | 4/2006 | Wanie |
| 7,031,805 B2 | 4/2006 | Lee et al. |
| 7,032,469 B2 | 4/2006 | Bailey |
| 7,040,869 B2 | 5/2006 | Beenker |
| 7,041,029 B2 | 5/2006 | Fulghum et al. |
| 7,051,399 B2 | 5/2006 | Field et al. |
| 7,053,578 B2 | 5/2006 | Diehl et al. |
| 7,054,716 B2 | 5/2006 | McKee et al. |
| 7,055,210 B2 | 6/2006 | Keppler et al. |
| 7,057,120 B2 | 6/2006 | Ma et al. |
| 7,057,643 B2 | 6/2006 | Iida et al. |
| 7,059,012 B2 | 6/2006 | Song et al. |
| 7,065,430 B2 | 6/2006 | Naka et al. |
| 7,066,291 B2 | 6/2006 | Martins et al. |
| 7,069,124 B1 | 6/2006 | Whittaker et al. |
| 7,079,923 B2 | 7/2006 | Abramson et al. |
| 7,085,623 B2 | 8/2006 | Siegers |
| 7,085,624 B2 | 8/2006 | Aldred et al. |
| 7,113,847 B2 | 9/2006 | Chmura et al. |
| 7,133,746 B2 | 11/2006 | Abramson et al. |
| 7,142,198 B2 | 11/2006 | Lee |
| 7,148,458 B2 | 12/2006 | Schell et al. |
| 7,155,308 B2 | 12/2006 | Jones |
| 7,167,775 B2 | 1/2007 | Abramson et al. |
| 7,171,285 B2 | 1/2007 | Kim et al. |
| 7,173,391 B2 | 2/2007 | Jones et al. |
| 7,174,238 B1 | 2/2007 | Zweig |
| 7,188,000 B2 | 3/2007 | Chiappetta et al. |
| 7,193,384 B1 | 3/2007 | Norman et al. |
| 7,196,487 B2 | 3/2007 | Jones et al. |
| 7,201,786 B2 | 4/2007 | Wegelin et al. |
| 7,206,677 B2 | 4/2007 | Hulden |
| 7,211,980 B1 | 5/2007 | Bruemmer et al. |
| 7,225,500 B2 | 6/2007 | Diehl et al. |
| 7,246,405 B2 | 7/2007 | Yan |
| 7,248,951 B2 | 7/2007 | Hulden |
| 7,275,280 B2 | 10/2007 | Haegermarck et al. |
| 7,283,892 B1 | 10/2007 | Boillot et al. |
| 7,288,912 B2 | 10/2007 | Landry et al. |
| 7,318,248 B1 | 1/2008 | Yan |
| 7,320,149 B1 | 1/2008 | Huffman et al. |
| 7,321,807 B2 | 1/2008 | Laski |
| 7,324,870 B2 | 1/2008 | Lee |
| 7,328,196 B2 | 2/2008 | Peters |
| 7,332,890 B2 | 2/2008 | Cohen et al. |
| 7,346,428 B1 | 3/2008 | Huffman et al. |
| 7,352,153 B2 | 4/2008 | Yan |
| 7,359,766 B2 | 4/2008 | Jeon et al. |
| 7,360,277 B2 | 4/2008 | Moshenrose et al. |
| 7,363,108 B2 | 4/2008 | Noda et al. |
| 7,388,879 B2 | 6/2008 | Sabe et al. |
| 7,389,156 B2 | 6/2008 | Ziegler et al. |
| 7,389,166 B2 | 6/2008 | Harwig et al. |
| 7,408,157 B2 | 8/2008 | Yan |
| 7,418,762 B2 | 9/2008 | Arai et al. |
| 7,430,455 B2 | 9/2008 | Casey et al. |
| 7,430,462 B2 | 9/2008 | Chiu et al. |
| 7,441,298 B2 * | 10/2008 | Svendsen et al. ............... 15/49.1 |
| 7,444,206 B2 | 10/2008 | Abramson et al. |
| 7,448,113 B2 | 11/2008 | Jones et al. |
| 7,459,871 B2 | 12/2008 | Landry et al. |
| 7,467,026 B2 | 12/2008 | Sakagami et al. |
| 7,474,941 B2 | 1/2009 | Kim et al. |
| 7,503,096 B2 | 3/2009 | Lin |
| 7,515,991 B2 | 4/2009 | Egawa et al. |
| 7,539,557 B2 | 5/2009 | Yamauchi |
| 7,555,363 B2 | 6/2009 | Augenbraun et al. |
| 7,557,703 B2 | 7/2009 | Yamada et al. |
| 7,568,259 B2 | 8/2009 | Yan |
| 7,571,511 B2 | 8/2009 | Jones et al. |
| 7,578,020 B2 * | 8/2009 | Jaworski et al. ............... 15/50.3 |
| 7,600,521 B2 | 10/2009 | Woo |
| 7,603,744 B2 | 10/2009 | Reindle |
| 7,611,583 B2 | 11/2009 | Buckley et al. |
| 7,617,557 B2 | 11/2009 | Reindle |
| 7,620,476 B2 | 11/2009 | Morse et al. |
| 7,636,928 B2 | 12/2009 | Uno |
| 7,636,982 B2 | 12/2009 | Jones et al. |
| 7,647,144 B2 | 1/2010 | Haegermarck |
| 7,650,666 B2 | 1/2010 | Jang |
| 7,660,650 B2 | 2/2010 | Kawagoe et al. |
| 7,663,333 B2 | 2/2010 | Jones et al. |
| 7,693,605 B2 | 4/2010 | Park |
| 7,706,917 B1 | 4/2010 | Chiappetta et al. |
| 7,761,954 B2 * | 7/2010 | Ziegler et al. ................... 15/320 |
| 7,765,635 B2 | 8/2010 | Park |
| 7,784,147 B2 | 8/2010 | Burkholder et al. |
| 7,801,645 B2 | 9/2010 | Taylor et al. |
| 7,805,220 B2 | 9/2010 | Taylor et al. |

(56) References Cited

U.S. PATENT DOCUMENTS

| | | |
|---|---|---|
| 7,809,944 B2 | 10/2010 | Kawamoto |
| 7,832,048 B2 | 11/2010 | Harwig et al. |
| 7,849,555 B2 | 12/2010 | Hahm et al. |
| 7,853,645 B2 | 12/2010 | Brown et al. |
| 7,860,680 B2 | 12/2010 | Arms et al. |
| 7,920,941 B2 | 4/2011 | Park et al. |
| 7,937,800 B2 | 5/2011 | Yan |
| 7,957,836 B2 | 6/2011 | Myeong et al. |
| 8,087,117 B2 | 1/2012 | Kapoor et al. |
| 2001/0004719 A1 | 6/2001 | Sommer |
| 2001/0013929 A1 | 8/2001 | Torsten |
| 2001/0020200 A1 | 9/2001 | Das et al. |
| 2001/0025183 A1 | 9/2001 | Shahidi |
| 2001/0037163 A1 | 11/2001 | Allard |
| 2001/0043509 A1 | 11/2001 | Green et al. |
| 2001/0045883 A1 | 11/2001 | Holdaway et al. |
| 2001/0047231 A1 | 11/2001 | Peless et al. |
| 2001/0047895 A1 | 12/2001 | De Fazio et al. |
| 2002/0011367 A1 | 1/2002 | Kolesnik |
| 2002/0011813 A1 | 1/2002 | Koselka et al. |
| 2002/0016649 A1 | 2/2002 | Jones |
| 2002/0021219 A1 | 2/2002 | Edwards |
| 2002/0027652 A1 | 3/2002 | Paromtchik et al. |
| 2002/0036779 A1 | 3/2002 | Kiyoi et al. |
| 2002/0081937 A1 | 6/2002 | Yamada et al. |
| 2002/0095239 A1 | 7/2002 | Wallach et al. |
| 2002/0097400 A1 | 7/2002 | Jung et al. |
| 2002/0104963 A1 | 8/2002 | Mancevski |
| 2002/0108209 A1 | 8/2002 | Peterson |
| 2002/0112742 A1 | 8/2002 | Bredo et al. |
| 2002/0113973 A1 | 8/2002 | Ge |
| 2002/0116089 A1 | 8/2002 | Kirkpatrick |
| 2002/0120364 A1 | 8/2002 | Colens |
| 2002/0124343 A1 | 9/2002 | Reed |
| 2002/0153185 A1 | 10/2002 | Song et al. |
| 2002/0156556 A1 | 10/2002 | Ruffner |
| 2002/0159051 A1 | 10/2002 | Guo |
| 2002/0166193 A1 | 11/2002 | Kasper |
| 2002/0169521 A1 | 11/2002 | Goodman et al. |
| 2002/0173877 A1 | 11/2002 | Zweig |
| 2002/0189871 A1 | 12/2002 | Won |
| 2003/0009259 A1 | 1/2003 | Hattori et al. |
| 2003/0015232 A1 | 1/2003 | Nguyen |
| 2003/0019071 A1 | 1/2003 | Field et al. |
| 2003/0023356 A1 | 1/2003 | Keable |
| 2003/0024986 A1 | 2/2003 | Mazz et al. |
| 2003/0025472 A1 | 2/2003 | Jones et al. |
| 2003/0028286 A1 | 2/2003 | Glenn et al. |
| 2003/0030399 A1 | 2/2003 | Jacobs |
| 2003/0058262 A1 | 3/2003 | Sato et al. |
| 2003/0060928 A1 | 3/2003 | Abramson et al. |
| 2003/0067451 A1 | 4/2003 | Tagg et al. |
| 2003/0097875 A1 | 5/2003 | Lentz et al. |
| 2003/0120389 A1 | 6/2003 | Abramson et al. |
| 2003/0124312 A1 | 7/2003 | Autumn |
| 2003/0126352 A1 | 7/2003 | Barrett |
| 2003/0137268 A1 | 7/2003 | Papanikolopoulos et al. |
| 2003/0146384 A1 | 8/2003 | Logsdon et al. |
| 2003/0159232 A1 | 8/2003 | Hekman et al. |
| 2003/0168081 A1 | 9/2003 | Lee et al. |
| 2003/0175138 A1 | 9/2003 | Beenker |
| 2003/0192144 A1 | 10/2003 | Song et al. |
| 2003/0193657 A1 | 10/2003 | Uomori et al. |
| 2003/0216834 A1 | 11/2003 | Allard |
| 2003/0221114 A1 | 11/2003 | Hino et al. |
| 2003/0229421 A1 | 12/2003 | Chmura et al. |
| 2003/0229474 A1 | 12/2003 | Suzuki et al. |
| 2003/0233171 A1 | 12/2003 | Heiligensetzer |
| 2003/0233177 A1 | 12/2003 | Johnson et al. |
| 2003/0233870 A1 | 12/2003 | Mancevski |
| 2003/0233930 A1 | 12/2003 | Ozick |
| 2004/0016077 A1 | 1/2004 | Song et al. |
| 2004/0020000 A1 | 2/2004 | Jones |
| 2004/0030448 A1 | 2/2004 | Solomon |
| 2004/0030449 A1 | 2/2004 | Solomon |
| 2004/0030450 A1 | 2/2004 | Solomon |
| 2004/0030451 A1 | 2/2004 | Solomon |
| 2004/0030570 A1 | 2/2004 | Solomon |
| 2004/0030571 A1 | 2/2004 | Solomon |
| 2004/0031113 A1 | 2/2004 | Wosewick et al. |
| 2004/0049877 A1 | 3/2004 | Jones et al. |
| 2004/0055163 A1 | 3/2004 | McCambridge et al. |
| 2004/0068351 A1 | 4/2004 | Solomon |
| 2004/0068415 A1 | 4/2004 | Solomon |
| 2004/0068416 A1 | 4/2004 | Solomon |
| 2004/0074038 A1 | 4/2004 | Im et al. |
| 2004/0074044 A1 | 4/2004 | Diehl et al. |
| 2004/0076324 A1 | 4/2004 | Burl et al. |
| 2004/0083570 A1 | 5/2004 | Song et al. |
| 2004/0085037 A1 | 5/2004 | Jones et al. |
| 2004/0088079 A1 | 5/2004 | Lavarec et al. |
| 2004/0093122 A1 | 5/2004 | Galibraith |
| 2004/0098167 A1 | 5/2004 | Yi et al. |
| 2004/0111184 A1 | 6/2004 | Chiappetta et al. |
| 2004/0111821 A1 | 6/2004 | Lenkiewicz et al. |
| 2004/0113777 A1 | 6/2004 | Matsuhira et al. |
| 2004/0117064 A1 | 6/2004 | McDonald |
| 2004/0117846 A1 | 6/2004 | Karaoguz et al. |
| 2004/0118998 A1 | 6/2004 | Wingett et al. |
| 2004/0128028 A1 | 7/2004 | Miyamoto et al. |
| 2004/0133316 A1 | 7/2004 | Dean |
| 2004/0134336 A1 | 7/2004 | Solomon |
| 2004/0134337 A1 | 7/2004 | Solomon |
| 2004/0143919 A1 | 7/2004 | Wilder |
| 2004/0148419 A1 | 7/2004 | Chen et al. |
| 2004/0148731 A1 | 8/2004 | Damman et al. |
| 2004/0153212 A1 | 8/2004 | Profio et al. |
| 2004/0156541 A1 | 8/2004 | Jeon et al. |
| 2004/0158357 A1 | 8/2004 | Lee et al. |
| 2004/0181706 A1 | 9/2004 | Chen et al. |
| 2004/0187249 A1 | 9/2004 | Jones et al. |
| 2004/0187457 A1 | 9/2004 | Colens |
| 2004/0196451 A1 | 10/2004 | Aoyama |
| 2004/0200505 A1 | 10/2004 | Taylor et al. |
| 2004/0201361 A1 | 10/2004 | Koh et al. |
| 2004/0204792 A1 | 10/2004 | Taylor et al. |
| 2004/0204804 A1 | 10/2004 | Lee et al. |
| 2004/0210345 A1 | 10/2004 | Noda et al. |
| 2004/0210347 A1 | 10/2004 | Sawada et al. |
| 2004/0211444 A1 | 10/2004 | Taylor et al. |
| 2004/0221790 A1 | 11/2004 | Sinclair et al. |
| 2004/0236468 A1 | 11/2004 | Taylor et al. |
| 2004/0244138 A1 | 12/2004 | Taylor et al. |
| 2004/0255425 A1 | 12/2004 | Arai et al. |
| 2005/0000543 A1 | 1/2005 | Taylor et al. |
| 2005/0010330 A1 | 1/2005 | Abramson et al. |
| 2005/0010331 A1 | 1/2005 | Taylor et al. |
| 2005/0015920 A1 | 1/2005 | Kim et al. |
| 2005/0021181 A1 | 1/2005 | Kim et al. |
| 2005/0028316 A1 | 2/2005 | Thomas et al. |
| 2005/0053912 A1 | 3/2005 | Roth et al. |
| 2005/0055796 A1 | 3/2005 | Wright et al. |
| 2005/0067994 A1 | 3/2005 | Jones et al. |
| 2005/0081782 A1 | 4/2005 | Buckley et al. |
| 2005/0085947 A1 | 4/2005 | Aldred et al. |
| 2005/0091782 A1 | 5/2005 | Gordon et al. |
| 2005/0091786 A1 | 5/2005 | Wright et al. |
| 2005/0137749 A1 | 6/2005 | Jeon et al. |
| 2005/0144751 A1 | 7/2005 | Kegg et al. |
| 2005/0150074 A1 | 7/2005 | Diehl et al. |
| 2005/0150519 A1 | 7/2005 | Keppler et al. |
| 2005/0154795 A1 | 7/2005 | Kuz et al. |
| 2005/0156562 A1 | 7/2005 | Cohen et al. |
| 2005/0162119 A1 | 7/2005 | Landry et al. |
| 2005/0163119 A1 | 7/2005 | Ito et al. |
| 2005/0165508 A1 | 7/2005 | Kanda et al. |
| 2005/0166354 A1 | 8/2005 | Uehigashi |
| 2005/0166355 A1 | 8/2005 | Tani |
| 2005/0166356 A1* | 8/2005 | Uehigashi ............ 15/319 |
| 2005/0172445 A1 | 8/2005 | Diehl et al. |
| 2005/0183229 A1 | 8/2005 | Uehigashi |
| 2005/0183230 A1 | 8/2005 | Uehigashi |
| 2005/0187678 A1 | 8/2005 | Myeong et al. |
| 2005/0192707 A1 | 9/2005 | Park et al. |

(56) References Cited

U.S. PATENT DOCUMENTS

| | | |
|---|---|---|
| 2005/0204717 A1 | 9/2005 | Colens |
| 2005/0209736 A1 | 9/2005 | Kawagoe |
| 2005/0211880 A1 | 9/2005 | Schell et al. |
| 2005/0212929 A1 | 9/2005 | Schell et al. |
| 2005/0213082 A1 | 9/2005 | DiBernardo et al. |
| 2005/0213109 A1 | 9/2005 | Schell et al. |
| 2005/0217042 A1 | 10/2005 | Reindle |
| 2005/0218852 A1 | 10/2005 | Landry et al. |
| 2005/0222933 A1 | 10/2005 | Wesby |
| 2005/0229340 A1 | 10/2005 | Sawalski et al. |
| 2005/0229355 A1 | 10/2005 | Crouch et al. |
| 2005/0235451 A1 | 10/2005 | Yan |
| 2005/0251292 A1 | 11/2005 | Casey et al. |
| 2005/0255425 A1 | 11/2005 | Pierson |
| 2005/0258154 A1 | 11/2005 | Blankenship et al. |
| 2005/0273967 A1 | 12/2005 | Taylor et al. |
| 2005/0288819 A1 | 12/2005 | De Guzman |
| 2006/0000050 A1 | 1/2006 | Cipolla et al. |
| 2006/0005344 A1* | 1/2006 | Uehigashi ................. 15/319 |
| 2006/0009879 A1 | 1/2006 | Lynch et al. |
| 2006/0010638 A1* | 1/2006 | Shimizu et al. ............ 15/319 |
| 2006/0020369 A1 | 1/2006 | Taylor et al. |
| 2006/0020370 A1 | 1/2006 | Abramson |
| 2006/0021168 A1 | 2/2006 | Nishikawa |
| 2006/0025134 A1 | 2/2006 | Cho et al. |
| 2006/0037170 A1 | 2/2006 | Shimizu |
| 2006/0042042 A1 | 3/2006 | Mertes et al. |
| 2006/0044546 A1 | 3/2006 | Lewin et al. |
| 2006/0060216 A1 | 3/2006 | Woo |
| 2006/0061657 A1 | 3/2006 | Rew et al. |
| 2006/0064828 A1 | 3/2006 | Stein et al. |
| 2006/0087273 A1 | 4/2006 | Ko et al. |
| 2006/0089765 A1 | 4/2006 | Pack et al. |
| 2006/0100741 A1 | 5/2006 | Jung |
| 2006/0107894 A1 | 5/2006 | Buckley et al. |
| 2006/0119839 A1 | 6/2006 | Bertin et al. |
| 2006/0143295 A1 | 6/2006 | Costa-Requena et al. |
| 2006/0146776 A1 | 7/2006 | Kim |
| 2006/0150361 A1 | 7/2006 | Aldred et al. |
| 2006/0184293 A1 | 8/2006 | Konandreas et al. |
| 2006/0185690 A1 | 8/2006 | Song et al. |
| 2006/0190133 A1 | 8/2006 | Konandreas et al. |
| 2006/0190134 A1 | 8/2006 | Ziegler et al. |
| 2006/0190146 A1 | 8/2006 | Morse et al. |
| 2006/0196003 A1 | 9/2006 | Song et al. |
| 2006/0200281 A1 | 9/2006 | Ziegler et al. |
| 2006/0220900 A1 | 10/2006 | Ceskutti et al. |
| 2006/0229774 A1 | 10/2006 | Park et al. |
| 2006/0259194 A1 | 11/2006 | Chiu |
| 2006/0259494 A1 | 11/2006 | Watson et al. |
| 2006/0278161 A1 | 12/2006 | Burkholder et al. |
| 2006/0288519 A1 | 12/2006 | Jaworski et al. |
| 2006/0293787 A1 | 12/2006 | Kanda et al. |
| 2006/0293808 A1 | 12/2006 | Qian |
| 2007/0006404 A1 | 1/2007 | Cheng et al. |
| 2007/0016328 A1 | 1/2007 | Ziegler et al. |
| 2007/0017061 A1 | 1/2007 | Yan |
| 2007/0028574 A1 | 2/2007 | Yan |
| 2007/0032904 A1 | 2/2007 | Kawagoe et al. |
| 2007/0042716 A1 | 2/2007 | Goodall et al. |
| 2007/0043459 A1 | 2/2007 | Abbott et al. |
| 2007/0061041 A1 | 3/2007 | Zweig |
| 2007/0061043 A1 | 3/2007 | Ermakov et al. |
| 2007/0114975 A1 | 5/2007 | Cohen et al. |
| 2007/0142964 A1 | 6/2007 | Abramson |
| 2007/0150096 A1 | 6/2007 | Yeh et al. |
| 2007/0156286 A1 | 7/2007 | Yamauchi |
| 2007/0157415 A1 | 7/2007 | Lee et al. |
| 2007/0157420 A1 | 7/2007 | Lee et al. |
| 2007/0179670 A1 | 8/2007 | Chiappetta et al. |
| 2007/0226949 A1 | 10/2007 | Hahm et al. |
| 2007/0234492 A1 | 10/2007 | Svendsen et al. |
| 2007/0244610 A1 | 10/2007 | Ozick et al. |
| 2007/0245511 A1 | 10/2007 | Hahm et al. |
| 2007/0250212 A1 | 10/2007 | Halloran et al. |
| 2007/0261193 A1 | 11/2007 | Gordon et al. |
| 2007/0266508 A1 | 11/2007 | Jones et al. |
| 2008/0007203 A1 | 1/2008 | Cohen et al. |
| 2008/0039974 A1 | 2/2008 | Sandin et al. |
| 2008/0052846 A1 | 3/2008 | Kapoor et al. |
| 2008/0091304 A1 | 4/2008 | Ozick et al. |
| 2008/0109126 A1 | 5/2008 | Sandin et al. |
| 2008/0134458 A1 | 6/2008 | Ziegler et al. |
| 2008/0140255 A1 | 6/2008 | Ziegler et al. |
| 2008/0155768 A1 | 7/2008 | Ziegler et al. |
| 2008/0184518 A1 | 8/2008 | Taylor et al. |
| 2008/0266748 A1 | 10/2008 | Lee |
| 2008/0276407 A1 | 11/2008 | Schnittman et al. |
| 2008/0281470 A1 | 11/2008 | Gilbert et al. |
| 2008/0282494 A1 | 11/2008 | Won et al. |
| 2008/0294288 A1 | 11/2008 | Yamauchi |
| 2008/0302586 A1 | 12/2008 | Yan |
| 2008/0307590 A1 | 12/2008 | Jones et al. |
| 2009/0007366 A1 | 1/2009 | Svendsen et al. |
| 2009/0038089 A1 | 2/2009 | Landry et al. |
| 2009/0048727 A1 | 2/2009 | Hong et al. |
| 2009/0049640 A1 | 2/2009 | Lee et al. |
| 2009/0055022 A1 | 2/2009 | Casey et al. |
| 2009/0102296 A1 | 4/2009 | Greene et al. |
| 2009/0292393 A1 | 11/2009 | Casey et al. |
| 2010/0006028 A1 | 1/2010 | Buckley et al. |
| 2010/0011529 A1 | 1/2010 | Won et al. |
| 2010/0049365 A1 | 2/2010 | Jones et al. |
| 2010/0063628 A1 | 3/2010 | Landry et al. |
| 2010/0082193 A1 | 4/2010 | Chiappetta |
| 2010/0107355 A1 | 5/2010 | Won et al. |
| 2010/0257690 A1 | 10/2010 | Jones et al. |
| 2010/0257691 A1 | 10/2010 | Jones et al. |
| 2010/0263158 A1 | 10/2010 | Jones et al. |
| 2010/0268384 A1 | 10/2010 | Jones et al. |
| 2010/0293742 A1 | 11/2010 | Chung et al. |
| 2010/0312429 A1 | 12/2010 | Jones et al. |

FOREIGN PATENT DOCUMENTS

| | | |
|---|---|---|
| DE | 3536907 C2 | 2/1989 |
| DE | 3404202 C2 | 12/1992 |
| DE | 199311014 U1 | 10/1993 |
| DE | 4338841 A1 | 5/1995 |
| DE | 4414683 A1 | 10/1995 |
| DK | 338988 A | 12/1988 |
| EP | 0265542 A1 | 5/1988 |
| EP | 0281085 A2 | 9/1988 |
| EP | 0286328 A1 | 10/1988 |
| EP | 0294101 A2 | 12/1988 |
| EP | 0352045 A2 | 1/1990 |
| EP | 0433697 A2 | 6/1991 |
| EP | 0437024 A1 | 7/1991 |
| EP | 0554978 A2 | 8/1993 |
| EP | 0615719 A1 | 9/1994 |
| FR | 722755 | 3/1932 |
| FR | 2601443 A1 | 1/1988 |
| GB | 702426 | 1/1954 |
| GB | 2128842 A | 5/1984 |
| GB | 2225221 A | 5/1990 |
| GB | 2267360 A | 12/1993 |
| GB | 2283838 A | 5/1995 |
| GB | 2284957 A | 6/1995 |
| JP | 53021869 | 2/1978 |
| JP | 53110257 A2 | 9/1978 |
| JP | 57064217 | 4/1982 |
| JP | 59005315 | 2/1984 |
| JP | 59033511 U | 3/1984 |
| JP | 59094005 | 5/1984 |
| JP | 59099308 | 6/1984 |
| JP | 59112311 | 6/1984 |
| JP | 59120124 | 7/1984 |
| JP | 59131668 | 9/1984 |
| JP | 59164973 | 9/1984 |
| JP | 59184917 A | 10/1984 |
| JP | 2283343 A2 | 11/1984 |
| JP | 59212924 | 12/1984 |
| JP | 59226909 | 12/1984 |
| JP | 60089213 A | 5/1985 |

(56) References Cited

FOREIGN PATENT DOCUMENTS

| | | |
|---|---|---|
| JP | 60211510 A | 10/1985 |
| JP | 60259895 | 12/1985 |
| JP | 61023221 | 1/1986 |
| JP | 61097712 A | 5/1986 |
| JP | 61160366 | 7/1986 |
| JP | 62070709 | 4/1987 |
| JP | 62074018 A | 4/1987 |
| JP | 62120510 A | 6/1987 |
| JP | 62154008 | 7/1987 |
| JP | 62164431 | 7/1987 |
| JP | 62263507 A | 11/1987 |
| JP | 62263508 A | 11/1987 |
| JP | 62189057 U | 12/1987 |
| JP | 63079623 A | 4/1988 |
| JP | 63158032 | 7/1988 |
| JP | 63203483 A | 8/1988 |
| JP | 63241610 A | 10/1988 |
| JP | 1118752 | 8/1989 |
| JP | 3051023 A | 3/1991 |
| JP | 4019586 | 1/1992 |
| JP | 4074285 A | 3/1992 |
| JP | 4084921 A | 3/1992 |
| JP | 5023269 A | 2/1993 |
| JP | 5042076 A | 2/1993 |
| JP | 5046246 | 2/1993 |
| JP | 5091604 A | 4/1993 |
| JP | 5095879 A | 4/1993 |
| JP | 5150827 A | 6/1993 |
| JP | 5150829 A | 6/1993 |
| JP | 5040519 Y2 | 10/1993 |
| JP | 05257527 A | 10/1993 |
| JP | 5257533 | 10/1993 |
| JP | 05285861 A | 11/1993 |
| JP | 5302836 A | 11/1993 |
| JP | 5312514 A | 11/1993 |
| JP | 5324068 A | 12/1993 |
| JP | 5341904 A | 12/1993 |
| JP | 6038912 | 2/1994 |
| JP | 6137828 A | 5/1994 |
| JP | 6154143 A | 6/1994 |
| JP | 6293095 A | 10/1994 |
| JP | 06327598 A | 11/1994 |
| JP | 6105781 A | 12/1994 |
| JP | 7047046 A | 2/1995 |
| JP | 07129239 A | 5/1995 |
| JP | 7059702 B | 6/1995 |
| JP | 07222705 A2 | 8/1995 |
| JP | 7270518 A | 10/1995 |
| JP | 7313417 A | 12/1995 |
| JP | 8000393 A | 1/1996 |
| JP | 8016776 A | 1/1996 |
| JP | 8084696 A | 4/1996 |
| JP | 8089449 A | 4/1996 |
| JP | 08089451 A | 4/1996 |
| JP | 8123548 A | 5/1996 |
| JP | 8152916 A | 6/1996 |
| JP | 8263137 A | 10/1996 |
| JP | 8335112 A | 12/1996 |
| JP | 8339297 A | 12/1996 |
| JP | 9044240 A | 2/1997 |
| JP | 9066855 A | 3/1997 |
| JP | 9145309 A | 6/1997 |
| JP | 09179625 A | 7/1997 |
| JP | 09185410 | 7/1997 |
| JP | 9192069 A | 7/1997 |
| JP | 2555263 Y2 | 8/1997 |
| JP | 9204223 A | 8/1997 |
| JP | 09206258 A | 8/1997 |
| JP | 9265319 A | 10/1997 |
| JP | 9269807 A | 10/1997 |
| JP | 9269810 A | 10/1997 |
| JP | 9319431 A1 | 12/1997 |
| JP | 9319432 A | 12/1997 |
| JP | 9319434 A | 12/1997 |
| JP | 9325812 A | 12/1997 |
| JP | 10055215 A | 2/1998 |
| JP | 10117973 A | 5/1998 |
| JP | 10118963 A | 5/1998 |
| JP | 10165738 A | 6/1998 |
| JP | 10177414 A | 6/1998 |
| JP | 10295595 A | 11/1998 |
| JP | 10314088 | 12/1998 |
| JP | 11015941 A | 1/1999 |
| JP | 11102220 A | 4/1999 |
| JP | 11162454 A | 6/1999 |
| JP | 11174145 A | 7/1999 |
| JP | 11175149 A | 7/1999 |
| JP | 11213157 A | 8/1999 |
| JP | 11510935 A | 9/1999 |
| JP | 11267994 | 10/1999 |
| JP | 11295412 A | 10/1999 |
| JP | 2000047728 | 2/2000 |
| JP | 2000056006 A | 2/2000 |
| JP | 2000056831 A | 2/2000 |
| JP | 2000060782 A | 2/2000 |
| JP | 2000066722 A | 3/2000 |
| JP | 2000075925 A | 3/2000 |
| JP | 2000102499 A | 4/2000 |
| JP | 2000242335 A | 9/2000 |
| JP | 2000275321 | 10/2000 |
| JP | 2000279353 A | 10/2000 |
| JP | 2000353014 A | 12/2000 |
| JP | 2001022443 A | 1/2001 |
| JP | 2001067588 | 3/2001 |
| JP | 2001087182 | 4/2001 |
| JP | 2001508572 A | 6/2001 |
| JP | 2001197008 A | 7/2001 |
| JP | 3197758 B2 | 8/2001 |
| JP | 3201903 B2 | 8/2001 |
| JP | 2001216482 A | 8/2001 |
| JP | 2001250979 A | 9/2001 |
| JP | 2001258807 | 9/2001 |
| JP | 2001265437 A | 9/2001 |
| JP | 2001275908 A | 10/2001 |
| JP | 2002073170 A | 3/2002 |
| JP | 2002078650 A | 3/2002 |
| JP | 2002086377 A | 3/2002 |
| JP | 2002204768 A | 7/2002 |
| JP | 2002204769 A | 7/2002 |
| JP | 2002532180 A | 10/2002 |
| JP | 2002-323926 A | 11/2002 |
| JP | 2002323925 | 11/2002 |
| JP | 2002333920 A | 11/2002 |
| JP | 2002355206 | 12/2002 |
| JP | 2002360471 A | 12/2002 |
| JP | 2002360482 A | 12/2002 |
| JP | 2002366227 | 12/2002 |
| JP | 2002369778 | 12/2002 |
| JP | 2003005296 A | 1/2003 |
| JP | 2003010076 A | 1/2003 |
| JP | 2003010088 A | 1/2003 |
| JP | 2003028528 A | 1/2003 |
| JP | 2003036116 A | 2/2003 |
| JP | 2003038401 A | 2/2003 |
| JP | 2003038402 A | 2/2003 |
| JP | 2003047579 | 2/2003 |
| JP | 2003047579 A | 2/2003 |
| JP | 2003061882 A | 3/2003 |
| JP | 2003084994 | 3/2003 |
| JP | 2003167628 A | 6/2003 |
| JP | 2003180586 A | 7/2003 |
| JP | 2003180587 A | 7/2003 |
| JP | 2003186539 A | 7/2003 |
| JP | 2003262520 A | 9/2003 |
| JP | 2003294413 A | 10/2003 |
| JP | 2003304992 A | 10/2003 |
| JP | 2003310509 A | 11/2003 |
| JP | 2003323214 A | 11/2003 |
| JP | 2004049593 A | 2/2004 |
| JP | 2004123040 A | 4/2004 |
| JP | 2004139264 | 5/2004 |
| JP | 2004148021 A | 5/2004 |
| JP | 2004160102 A | 6/2004 |
| JP | 2004166968 A | 6/2004 |

(56) References Cited

FOREIGN PATENT DOCUMENTS

| | | |
|---|---|---|
| JP | 2004-194715 A | 7/2004 |
| JP | 2004522231 | 7/2004 |
| JP | 2004303134 | 10/2004 |
| JP | 2004351234 A | 12/2004 |
| JP | 05027604 A | 2/2005 |
| JP | 2005118354 A | 5/2005 |
| JP | 2005224265 A | 8/2005 |
| JP | 2005230032 A | 9/2005 |
| JP | 2005230044 A | 9/2005 |
| JP | 2005245916 A | 9/2005 |
| JP | 2005352707 A | 12/2005 |
| JP | 2006043071 A | 2/2006 |
| JP | 2006155274 A | 6/2006 |
| JP | 2006164223 A | 6/2006 |
| JP | 2006247467 A | 9/2006 |
| JP | 2006260161 A | 9/2006 |
| JP | 2006293662 A | 10/2006 |
| JP | 2006296697 A | 11/2006 |
| JP | 2007034866 A | 2/2007 |
| JP | 07116849 A | 5/2007 |
| JP | 2007213180 A | 8/2007 |
| JP | 2009015611 A | 1/2009 |
| JP | 2010198552 A | 9/2010 |
| WO | 9526512 A1 | 10/1995 |
| WO | 9530887 A1 | 11/1995 |
| WO | 9617258 A1 | 6/1996 |
| WO | 9715224 A1 | 5/1997 |
| WO | 9740734 A1 | 11/1997 |
| WO | 9741451 A1 | 11/1997 |
| WO | 9853456 A1 | 11/1998 |
| WO | 9905580 A2 | 2/1999 |
| WO | 9916078 A1 | 4/1999 |
| WO | 9938056 A1 | 7/1999 |
| WO | 9938237 A1 | 7/1999 |
| WO | 9943250 A1 | 9/1999 |
| WO | 0038026 A1 | 6/2000 |
| WO | 0038028 A1 | 6/2000 |
| WO | 0038029 A1 | 6/2000 |
| WO | 0004430 A1 | 10/2000 |
| WO | 0078410 A1 | 12/2000 |
| WO | 0106904 A1 | 2/2001 |
| WO | 0106905 A1 | 2/2001 |
| WO | 0180703 A1 | 11/2001 |
| WO | 0191623 A2 | 12/2001 |
| WO | 02075350 A1 | 1/2002 |
| WO | 0224292 A1 | 3/2002 |
| WO | 0239864 A1 | 5/2002 |
| WO | 0239868 A1 | 5/2002 |
| WO | 02058527 A1 | 8/2002 |
| WO | 02062194 A1 | 8/2002 |
| WO | 02067744 A1 | 9/2002 |
| WO | 02067745 A1 | 9/2002 |
| WO | 02067752 A1 | 9/2002 |
| WO | 02069774 A1 | 9/2002 |
| WO | 02069775 A2 | 9/2002 |
| WO | 02071175 A1 | 9/2002 |
| WO | 02074150 A1 | 9/2002 |
| WO | 02075356 A1 | 9/2002 |
| WO | 02075469 A1 | 9/2002 |
| WO | 02075470 A1 | 9/2002 |
| WO | 02081074 A1 | 10/2002 |
| WO | 02101477 A2 | 12/2002 |
| WO | 03015220 A1 | 2/2003 |
| WO | 03024292 A2 | 3/2003 |
| WO | 03040546 A1 | 5/2003 |
| WO | 03040845 A1 | 5/2003 |
| WO | 03040846 A1 | 5/2003 |
| WO | 03062850 A2 | 7/2003 |
| WO | 03062852 A1 | 7/2003 |
| WO | 2004004533 A1 | 1/2004 |
| WO | 2004004534 A1 | 1/2004 |
| WO | 2004006034 A2 | 1/2004 |
| WO | 2004025947 A2 | 3/2004 |
| WO | 2004031878 A1 | 4/2004 |
| WO | 2004058028 A2 | 7/2004 |
| WO | 2004059409 A1 | 7/2004 |
| WO | 2005006935 A1 | 1/2005 |
| WO | 2005037496 A1 | 4/2005 |
| WO | 2005055795 A1 | 6/2005 |
| WO | 2005055796 A2 | 6/2005 |
| WO | 2005076545 A1 | 8/2005 |
| WO | 2005077243 A1 | 8/2005 |
| WO | 2005077244 A1 | 8/2005 |
| WO | 2005081074 A1 | 9/2005 |
| WO | 2005083541 A1 | 9/2005 |
| WO | 2005098475 A1 | 10/2005 |
| WO | 2005098476 A1 | 10/2005 |
| WO | 2006046400 A1 | 5/2006 |
| WO | 2006061133 A1 | 6/2006 |
| WO | 2006068403 A1 | 6/2006 |
| WO | 2006073248 A1 | 7/2006 |
| WO | 2006089307 A2 | 8/2006 |
| WO | 2007028049 A2 | 3/2007 |
| WO | 2007036490 A2 | 4/2007 |
| WO | 2007065033 A2 | 6/2007 |
| WO | 2007137234 A2 | 11/2007 |

OTHER PUBLICATIONS

Barker, "Navigation by the Stars—Ben Barker 4th Year Project," Nov. 2004, 20 pages.
Becker et al., "Reliable Navigation Using Landmarks," IEEE International Conference on Robotics and Automation, 0-7803-1965-6, pp. 401-406, 1995.
Benayad-Cherif et al., "Mobile Robot Navigation Sensors," SPIE vol. 1831 Mobile Robots, VII, pp. 378-387, 1992.
Betke et al. "Mobile robot localization using landmarks," Proceedings of the IEEE/RSJ/GI International Conference on Intelligent Robots and Systems '94 Advanced Robotic Systems and the Real World' (IROS '94), Accessed via IEEE Xplore, 1994, 8 pages.
Bison et al., "Using a structured beacon for cooperative position estimation," *Robotics and Autonomous Systems*, 29(1):33-40, Oct. 1999.
Blaasvaer et al., "AMOR—An Autonomous Mobile Robot Navigation System," Proceedings of the IEEE International Conference on Systems, Man, and Cybernetics, pp. 2266-2271, 1994.
Borges et al., "Optimal Mobile Robot Pose Estimation Using Geometrical Maps," IEEE Transactions on Robotics and Automation, 18(1): 87-94, Feb. 2002.
Braunstingl et al., "Fuzzy Logic Wall Following of a Mobile Robot Based on the Concept of General Perception," ICAR '95, 7th International Conference on Advanced Robotics, Sant Feliu De Guixols, Spain, pp. 367-376, Sep. 1995.
Bulusu et al., "Self Configuring Localization systems: Design and Experimental Evaluation,"*ACM Transactions on Embedded Computing Systems*, 3(1):24-60, 2003.
Caccia et al., "Bottom-Following for Remotely Operated Vehicles,"5th IFAC Conference, Alaborg, Denmark, pp. 245-250, Aug. 2000.
Chae et al., "StarLITE: A new artificial landmark for the navigation of mobile robots," http://www.irc.atr.jp/jk-nrs2005/pdf/Starlite.pdf, 4 pages, 2005.
Chamberlin et al., "Team 1: Robot Locator Beacon System, " NASA Goddard SFC, Design Proposal, 15 pages, Feb. 2006.
Champy, "Physical management of IT assets in Data Centers using RFID technologies," RFID 2005 University, Oct. 12-14, 2005 , 19 pages.
Chiri, "Joystick Control for Tiny OS Robot," http://www.eecs.berkeley.edu/Programs/ugrad/superb/papers2002/chiri.pdf. 12 pages, Aug. 2002.
Christensen et al. "Theoretical Methods for Planning and Control in Mobile Robotics," 1997 First International Conference on Knowledge-Based Intelligent Electronic Systems, Adelaide, Australia, pp. 81-86, May 1997.
CleanMate 365, Intelligent Automatic Vacuum Cleaner, Model No. QQ-1, User Manual www.metapo.com/support/user_manual.pdf 11 pages, Dec. 2005.
Clerentin et al., "A localization method based on two omnidirectional perception systems cooperation," *Proc of IEEE International Conference on Robotics & Automation*, San Francisco, CA vol. 2, pp. 1219-1224, Apr. 2000.

(56) References Cited

OTHER PUBLICATIONS

Corke, "High Performance Visual serving for robots end-point control," SPIE vol. 2056, Intelligent Robots and Computer Vision, 1993, 10 pages.

Cozman et al., "Robot Localization using a Computer Vision Sextant," IEEE International Midwest Conference on Robotics and Automation, pp. 106-111, 1995.

D'Orazio et al., "Model based Vision System for mobile robot position estimation", SPIE, vol. 2058 Mobile Robots VIII, pp. 38-49, 1992.

De Bakker et al., "Smart PSD—array for sheet of light range imaging", Proc. of SPIE, vol. 3965, pp. 1-12, May 2000.

Denning Roboscrub image (1989), 1 page.

Desaulniers et al., "An Efficient Algorithm to find a shortest path for a car-like Robot," IEEE Transactions on robotics and Automation, 11(6):819-828, Dec. 1995.

Dorfmüller-Ulhaas, "Optical Tracking From User Motion to 3D Interaction," http://www.cg.tuwien.ac.at/research/publications/2002/Dorfmueller-Ulhaas-thesis, 182 pages, 2002.

Dorsch et al., "Laser Triangulation: Fundamental uncertainty in distance measurement," Applied Optics, 33(7):1306-1314, Mar. 1994.

Doty et al., "Sweep Strategies for a Sensory-Driven, Behavior-Based Vacuum Cleaning Agent," AAAI 1993 Fall Symposium Series, Instantiating Real-World Agents, pp. 1-6, Oct. 22-24, 1993.

Dudek et al., "Localizing a Robot with Minimum Travel" Proceedings of the sixth annual ACM-SIAM symposium on Discrete Algorithms, 27(2):583-604, Apr. 1998.

Dulimarta et al., "Mobile Robot Localization in Indoor Environment", Pattern Recognition, 30(1):99-111, 1997.

Dyson's Robot Vacuum Cleaner—the DC06, May 2004, Retrieved from the Internet: URL<http://www.gizmag.com/go/1282/>. Accessed Nov. 2011, 3 pages.

EBay, "Roomba Timer -> Timed Cleaning—Floorvac Robotic Vacuum," Retrieved from the Internet: URL Cgi.ebay.com/ws/eBayISAPI.dll?viewitem&category=43526&item=4375198387&rd=1, 5 pages, Apr. 2005.

Electrolux Trilobite, "Time to enjoy life," Retrieved from the Internet: URL<http://www.robocon.co.kr/trilobite/Presentation_Trilobite_Kor_030104.ppt, 26 pages, accessed Dec. 2011.

Electrolux Trilobite, Jan. 12, 2001, http://www.electroluxui.com:8080/2002%5C822%5C833102EN.pdf, accessed Jul. 2, 2012, 10 pages.

Electrolux, "Designed for the well-lived home," Retrieved from the Internet: URL<http://www.electroluxusa.com/node57.as[?currentURL=node142.asp%3F >. Accessed Mar. 2005, 2 pages.

Eren et al., "Accuracy in position estimation of mobile robots based on coded infrared signal transmission," Proceedings: Integrating Intelligent Instrumentation and Control, Instrumentation and Measurement Technology Conference, 1995, IMTC/95. pp. 548-551, 1995.

Eren et al., "Operation of Mobile Robots in a Structured Infrared Environment," Proceedings 'Sensing, Processing, Networking', IEEE Instrumentation and Measurement Technology Conference, 1997 (IMTC/97), Ottawa, Canada vol. 1, pp. 20-25, May 1997.

Euroflex Intelligente Monstre, (English excerpt only), 2006, 15 pages.

Euroflex, Jan. 2006, Retrieved from the Internet: URL< http://www.euroflex.tv/novita_dett.php?id=15, accessed Nov. 2011, 1 page.

eVac Robotic Vacuum S1727 Instruction Manual, Sharper Image Corp, Copyright 2004, 16 pages.

Everyday Robots, "Everyday Robots: Reviews, Discussion and News for Consumers," Aug. 2004, Retrieved from the Internet: URL< www.everydayrobots.com/index.php?option=content&task=view&id=9> (Sep. 2012), 4 pages.

Evolution Robotics, "NorthStar—Low-cost Indoor Localiztion—How it Works," E Evolution Robotics, 2 pages, 2005.

Facchinetti Claudio et al., "Self-Positioning Robot Navigation Using Ceiling Images Sequences," ACCV '95, 5 pages, Dec. 1995.

Facchinetti Claudio et al., "Using and Learning Vision-Based Self-Positioning for Autonomous Robot Navigation," ICARCV '94, vol. 3, pp. 1694-1698, 1994.

Facts on Trilobite, webpage, Retrieved from the Internet: URL< http://trilobiteelectroluxse/presskit_en/model11335asp?print=yes&pressID=>. 2 pages, accessed Dec. 2003.

Fairfield et al., "Mobile Robot Localization with Sparse Landmarks," SPIE vol. 4573, pp. 148-155, 2002.

Favre-Bulle, "Efficient tracking of 3D—Robot Position by Dynamic Triangulation," IEEE Instrumentation and Measurement Technology Conference IMTC 98 Session on Instrumentation and Measurement in Robotics, vol. 1, pp. 446-449, May 1998.

Fayman, "Exploiting Process Integration and Composition in the context of Active Vision," IEEE Transactions on Systems, Man, and Cybernetics—Part C: Application and reviews, vol. 29, No. 1, pp. 73-86, Feb. 1999.

Floorbot GE Plastics—Image, available at http://www.fuseid.com/, 1989-1990, Accessed Sep. 2012, 1 page.

Lambrinos et al., "A mobile robot employing insect strategies for navigation," Retrieved from the Internal: URL<http://www8.cs.umu.se/kurser/TDBD17/VT04/dl/Assignment%20Papers/lambrinos-RAS-2000.pdf>. 38 pages, Feb. 1999.

Lang et al., "Visual Measurement of Orientation Using Ceiling Features", 1994 IEEE, pp. 552-555, 1994.

Lapin, "Adaptive position estimation for an automated guided vehicle," SPIE, vol. 1831 Mobile Robots VII, pp. 82-94, 1992.

LaValle et al., "Robot Motion Planning in a Changing, Partially Predictable Environment," 1994 IEEE International Symposium on Intelligent Control, Columbus, OH, pp. 261-266, Aug. 1994.

Lee et al., "Development of Indoor Navigation system for Humanoid Robot Using Multi-sensors Integration", ION NTM, San Diego, CA pp. 798-805, Jan. 2007.

Lee et al., "Localization of a Mobile Robot Using the Image of a Moving Object," IEEE Transaction on Industrial Electronics, 50(3):612-619, Jun. 2003.

Leonard et al., "Mobile Robot Localization by tracking Geometric Beacons," IEEE Transaction on Robotics and Automation, 7(3):376-382, Jun. 1991.

Li et al. "Robust Statistical Methods for Securing Wireless Localization in Sensor Networks," Information Processing in Sensor Networks, 2005, Fourth International Symposium on, pp. 91-98, Apr. 2005.

Li et al., "Making a Local Map of Indoor Environments by Swiveling a Camera and a Sonar," Proceedings of the 1999 IEEE/RSJ International Conference on Intelligent Robots and Systems, pp. 954-959, 1999.

Lin et al., "Mobile Robot Navigation Using Artificial Landmarks," Journal of robotics System, 14(2): 93-106, 1997.

Linde, Dissertation—"On Aspects of Indoor Localization," Available at: https://eldorado.tu-dortmund.de/handle/2003/22854, University of Dortmund, 138 pages, Aug. 2006.

Lumelsky et al., "An Algorithm for Maze Searching with Azimuth Input", 1994 IEEE International Conference on Robotics and Automation, San Diego, CA vol. 1, pp. 111-116, 1994.

Luo et al., "Real-time Area-Covering Operations with Obstacle Avoidance for Cleaning Robots," IEEE, pp. 2359-2364, 2002.

Ma, Thesis—"Documentation on Northstar," California Institute of Technology, 14 pages, May 2006.

Madsen et al., "Optimal landmark selection for triangulation of robot position," Journal of Robotics and Autonomous Systems, vol. 13 pp. 277-292, 1998.

Malik et al., "Virtual Prototyping for Conceptual Design of a Tracked Mobile Robot," Electrical and Computer Engineering, Canadian Conference on, IEEE, PI. pp. 2349-2352, May 2006.

Martishevcky, "The Accuracy of point light target coordinate determination by dissectoral tracking system", SPIE vol. 2591, pp. 25-30, Oct. 23, 2005.

Maschinemarkt Würzburg 105, No. 27, pp. 3, 30, Jul. 5, 1999.

Matsutek Enterprises Co. Ltd, "Automatic Rechargeable Vacuum Cleaner," http://matsutek.manufacturer.globalsources.com/si/6008801427181/pdtl/Home-vacuum/10 . . . , Apr. 2007, 3 pages.

(56) References Cited

OTHER PUBLICATIONS

McGillem et al., "Infra-red Lacation System for Navigation and Autonomous Vehicles," 1988 IEEE International Conference on Robotics and Automation, vol. 2, pp. 1236-1238, Apr. 1988.

McGillem,et al. "A Beacon Navigation Method for Autonomous Vehicles," *IEEE Transactions on Vehicular Technology*, 38(3):132-139, Aug. 1989.

McLurkin "Stupid Robot Tricks: A Behavior-based Distributed Algorithm Library for Programming Swarms of Robots," Paper submitted for requirements of BSEE at MIT, May 2004, 127 pages.

McLurkin, "The Ants: A community of Microrobots," Paper submitted for requirements of BSEE at MIT, May 1995, 60 pages.

Michelson, "Autonomous navigation," McGraw-Hill—Access Science, Encyclopedia of Science and Technology Online, 2007, 4 pages.

Miro et al., "Towards Vision Based Navigation in Large Indoor Environments," Proceedings of the IEEE/RSJ International Conference on Intelligent Robots and Systems, Beijing, China, pp. 2096-2102, Oct. 2006.

Miwako Doi "Using the symbiosis of human and robots from approaching Research and Development Center," Toshiba Corporation, 16 pages, available at http://warp.ndl.go.jp/info:ndljp/pid/258151/www.soumu.go.jp/joho_tsusin/policyreports/chousa/netrobot/pdf/030214_1_33_a.pdf, 2003.

MobileMag, "Samsung Unveils High-tech Robot Vacuum Cleaner," Retrieved from the Internet: URL<http://www.mobilemag.com/content/100/102/C2261/>. 4 pages, Mar. 2005.

Monteiro et al., "Visual Servoing for Fast Mobile Robot: Adaptive Estimation of Kinematic Parameters," Proceedings of the IECON '93., International Conference on Industrial Electronics, Maui, HI, pp. 1588-1593, Nov. 1993.

Moore et al., "A simple Map-bases Localization strategy using range measurements," *SPIE*, vol. 5804 pp. 612-620, 2005.

Morland, "Autonomous Lawnmower Control", Downloaded from the internet at: http://cns.bu.edu/~cjmorlan/robotics/lawnmower/report.pdf, 10 pages, Jul. 2002.

Munich et al., "ERSP: A Software Platform and Architecture for the Service Robotics Industry," Intelligent Robots and Systems, 2005. (IROS 2005), pp. 460-467, Aug. 2005.

Munich et al., "SIFT-ing Through Features with ViPR", IEEE Robotics & Automation Magazine, pp. 72-77, Sep. 2006.

Nam et al., "Real-Time Dynamic Visual Tracking Using PSD Sensors and extended Trapezoidal Motion Planning", Applied Intelligence 10, pp. 53-70, 1999.

Nitu et al., "Optomechatronic System for Position Detection of a Mobile Mini-Robot," *IEEE Ttransactions on Industrial Electronics*, 52(4):969-973, Aug. 2005.

On Robo, "Robot Reviews Samsung Robot Vacuum (VC-RP3OW)," Retrieved from the Internet: URL <www.onrobo.com/reviews/AT_Home/vacuum_cleaners/on00vcrb30rosam/index.htm>. 2 pages, 2005.

OnRobo "Samsung Unveils Its Multifunction Robot Vacuum," Retrieved from the Internet: URL <www.onrobo.com/enews/0210/samsung_vacuum.shtml>. 3 pages, Mar. 2005.

Pages et al., "A camera-projector system for robot positioning by visual serving," Proceedings of the 2006 Conference on Computer Vision and Pattern Recognition Workshop (CVPRW06), 8 pages, Jun. 2006.

Pages et al., "Optimizing Plane-to-Plane Positioning Tasks by Image-Based Visual Servoing and Structured Light," *IEEE Transactions on Robotics*, 22(5):1000-1010, Oct. 2006.

Pages et al., "Robust decoupled visual servoing based on structured light," 2005 IEEE/RSJ, Int. Conf. on Intelligent Robots and Systems, pp. 2676-2681, 2005.

Park et al., "A Neural Network Based Real-Time Robot Tracking Controller Using Position Sensitive Detectors," IEEE World Congress on Computational Intelligence., 1994 IEEE International Conference on Neutral Networks, Orlando, Florida pp. 2754-2758, Jun./Jul. 1994.

Park et al., "Dynamic Visual Servo Control of Robot Manipulators using Neutral Networks," *The Korean Institute Telematics and Electronics*, 29-B(10):771-779, Oct. 1992.

Paromtchik "Toward Optical Guidance of Mobile Robots," Proceedings of the Fourth World Multiconference on Systemics, Cybermetics and Informatics, Orlando, FL, USA, Jul. 23, 2000, vol. IX, pp. 44-49, available at http://emotion.inrialpes.fr/~paromt/infos/papers/paromtchik:asama:sci:2000.ps.gz, accessed Jul. 3, 2012, 6 pages.

Paromtchik et al., "Optical Guidance System for Multiple mobile Robots," Proceedings 2001 ICRA. IEEE International Conference on Robotics and Automation, vol. 3, pp. 2935-2940, May 2001.

Penna et al., "Models for Map Building and Navigation", IEEE Transactions on Systems. Man. and Cybernetics., 23(5):1276-1301, Sep./Oct. 1993.

Pirjanian et al. "Representation and Execution of Plan Sequences for Multi-Agent Systems," Proceedings of the 2001 IEEE/RSJ International Conference on Intelligent Robots and Systems, Maui, Hawaii, pp. 2117-2123, Oct. 2001.

Pirjanian et al., "A decision-theoretic approach to fuzzy behavior coordination", 1999 IEEE International Symposium on Computational Intelligence in Robotics and Automation, 1999. CIRA '99., Monterey, CA, pp. 101-106, Nov. 1999.

Pirjanian et al., "Distributed Control for a Modular, Reconfigurable Cliff Robot," Proceedings of the 2002 IEEE International Conference on Robotics & Automation, Washington, D.C. pp. 4083-4088, May 2002.

Pirjanian et al., "Improving Task Reliability by Fusion of Redundant Homogeneous Modules Using Voting Schemes," Proceedings of the 1997 IEEE International Conference on Robotics and Automation, Albuquerque, NM, pp. 425-430, Apr. 1997.

Pirjanian et al., "Multi-Robot Target Acquisition using Multiple Objective Behavior Coordination," Proceedings of the 2000 IEEE International Conference on Robotics & Automation, San Francisco, CA, pp. 2696-2702, Apr. 2000.

Pirjanian, "Challenges for Standards for consumer Robotics," IEEE Workshop on Advanced Robotics and its Social impacts, pp. 260-264, Jun. 2005.

Pirjanian, "Reliable Reaction," Proceedings of the 1996 IEEE/SICE/RSJ International Conference on Multisensor Fusion and Integration for Intelligent Systems, pp. 158-165, 1996.

Prassler et al., "A Short History of Cleaning Robots," Autonomous Robots 9, 211-226, 2000, 16 pages.

Put Your Roomba . . . On, Automatic webpages: http://www.acomputeredge.com/roomba, 5 pages, accessed Apr. 2005.

Remazeilles et al., "Image based robot navigation in 3D environments," Proc. of *SPIE*, vol. 6052, pp. 1-14, Dec. 2005.

Rives et al., "Visual servoing based on ellipse features," *SPIE*, vol. 2056 Intelligent Robots and Computer Vision pp. 356-367, 1993.

Roboking—not just a vacuum cleaner, a robot!, Jan. 21, 2004, infocom.uz/2004/01/21/robokingne-prosto-pyilesos-a-robot/, accessed Oct. 10, 2011, 5 pages.

RoboMaid Sweeps Your Floors So You Won't Have To, the Official Site, website: Retrieved from the Internet: URL<http://therobomaid.com/>. 2 pages, accessed Mar. 2005.

Robot Buying Guide, "LG announces the first robotic vacuum cleaner for Korea," Retrieved from the Internet: URL<http://robotbg.corn/news/2003/04/22/lg_announces_the_first_robotic_vacu>. 1 page, Apr. 2003.

Robotics World, "A Clean Sweep," 5 pages, Jan. 2001.

Ronnback, "On Methods for Assistive Mobile Robots," Retrieved from the Internet: URL<http://www.openthesis.org/documents/methods-assistive-mobile-robots-595019.html>. 218 pages, Jan. 2006.

Roth-Tabak et al., "Environment Model for mobile Robots Indoor Navigation," *SPIE*, vol. 1388 Mobile Robots, pp. 453-463, 1990.

Sahin et al., "Development of a Visual Object Localization Module for Mobile Robots," 1999 Third European Workshop on Advanced Mobile Robots, (Eurobot '99), pp. 65-72, 1999.

Salomon et al., "Low-Cost Optical Indoor Localization system for Mobile Objects without Image Processing," IEEE Conference on Emerging Technologies and Factory Automation, 2006. (ETFA '06), pp. 629-632, Sep. 2006.

(56) References Cited

OTHER PUBLICATIONS

Sato, "Range Imaging Based on Moving Pattern Light and Spatio-Temporal Matched Filter," Proceedings International Conference on Image Processing, vol. 1., Lausanne, Switzerland, pp. 33-36, Sep. 1996.
Schenker et al., "Lightweight rovers for Mars science exploration and sample return," Intelligent Robots and Computer Vision XVI, *SPIE* Proc. 3208, pp. 24-36, 1997.
Schofield, "Neither Master nor slave—A Practical Study in the Development and Employment of Cleaning Robots, Emerging Technologies and Factory Automation," 1999 Proceedings ETFA '99 1999 7th IEEE International Conference on Barcelona, Spain, pp. 1427-1434, Oct. 1999.
Shimoga et al., "Touch and Force Reflection for Telepresence Surgery," Engineering in Medicine and Biology Society, 1994. Engineering Advances: New Opportunities for Biomedical Engineers. Proceedings of the 16th Annual International Conference of the IEEE, Baltimore, MD, pp. 1049-1050, 1994.
Sim et al, "Learning Visual Landmarks for Pose Estimation," IEEE International Conference on Robotics and Automation, vol. 3, Detroit, MI, pp. 1972-1978, May 1999.
Sobh et al., "Case Studies in Web-Controlled Devices and Remote Manipulation," Automation Congress, 2002 Proceedings of the 5th Biannual World, pp. 435-440, Dec. 2002.
Special Reports, "Vacuum Cleaner Robot Operated in Conjunction with 3G Celluar Phone," 59(9): 3 pages, Retrieved from the Internet: URL<http://www.toshiba.co.jp/tech/review/2004/09/59_0>. 2004.
Stella et al., "Self-Location for Indoor Navigation of Autonomous Vehicles," Part of the SPIE conference on Enhanced and Synthetic Vision SPIE vol. 3364, pp. 298-302, 1998.
Summet, "Tracking Locations of Moving Hand-held Displays Using Projected Light," Pervasive 2005, LNCS 3468, pp. 37-46, 2005.
Svedman et al., "Structure from Stereo Vision using Unsynchronized Cameras for Simultaneous Localization and Mapping," 2005 IEEE/RSJ International Conference on Intelligent Robots and Systems, pp. 2993-2998, 2005.
SVET Computers—New Technologies—Robot Vacuum Cleaner, Oct. 1999, available at http://www.sk.rs/1999/10/sknt01.html, 1 page, accessed Nov. 1, 2011.
Taipei Times, "Robotic vacuum by Matsuhita about to undergo testing," Retrieved from the Internet: URL<http://www.taipeitimes.com/News/worldbiz/archives/2002/03/26/0000129338>. accessed Mar. 2002, 2 pages.
Takio et al., "Real-Time Position and Pose Tracking Method of Moving Object Using Visual Servo System," 47th IEEE International Symposium on Circuits and Systems, pp. 167-170, 2004.
Teller, "Pervasive pose awareness for people, Objects and Robots," http://www.ai.mit.edu/lab/dangerous-ideas/Spring2003/teller-pose.pdf, 6 pages, Apr. 2003.
Terada et al., "An Acquisition of the Relation between Vision and Action using Self-Organizing Map and Reinforcement Learning," 1998 Second International Conference on Knowledge-Based Intelligent Electronic Systems, Adelaide, Australia, pp. 429-434, Apr. 1998.
The Sharper Image, eVac Robotic Vacuum—Product Details, www.sharperiamge.com/us/en/templates/products/pipmorework1printable.jhtml, 1 page, Accessed Mar. 2005.
TheRobotStore.com, "Friendly Robotics Robotic Vacuum RV400—The Robot Store," www.therobotstore.com/s.nl/sc.9/category.-109/it.A/id.43/.f, 1 page, Apr. 2005.
Thrun, Sebastian, "Learning Occupancy Grid Maps With Forward Sensor Models," Autonomous Robots 15, 28 pages, Sep. 1, 2003.
TotalVac.com, RC3000 RoboCleaner website, 2004, Accessed at http://ww.totalvac.com/robot_vacuum.htm (Mar. 2005), 3 pages.
Trebi-Ollennu et al., "Mars Rover Pair Cooperatively Transporting a Long Payload," Proceedings of the 2002 IEEE International Conference on Robotics & Automation, Washington, D.C. pp. 3136-3141, May 2002.
Tribelhorn et al., "Evaluating the Roomba: A low-cost, ubiquitous platform for robotics research and education," *IEEE*, pp. 1393-1399, 2007.
Tse et al., "Design of a Navigation System for a Household Mobile Robot Using Neural Networks," Department of Manufacturing Engg. & Engg. Management, City University of Hong Kong, pp. 2151-2156, 1998.
Ubot, cleaning robot capable of wiping with a wet duster, Retrieved from the Internet: URL<http://us.aving.net/news/view.php?articleId=23031>. 4 pages, accessed Nov. 2011.
Watanabe et al., "Position Estimation of Mobile Robots With Internal and External Sensors Using Uncertainty Evolution Technique," 1990 IEEE International Conference on Robotics and Automation, Cincinnati, OH, pp. 2011-2016, May 1990.
Watts, "Robot, boldly goes where no man can," The Times—pp. 20, Jan. 1985.
Wijk et al., "Triangulation-Based Fusion of Sonar Data with Application in Robot Pose Tracking," *IEEE Transactions on Robotics and Automation*, 16(6):740-752, Dec. 2000.
Wolf et al., "Robust Vision-Based Localization by Combining an Image-Retrieval System with Monte Carol Localization,", *IEEE Transactions on Robotics*, 21(2):208-216, Apr. 2005.
Wolf et al., "Robust Vision-based Localization for Mobile Robots Using an Image Retrieval System Based on Invariant Features," Proceedings of the 2002 IEEE International Conference on Robotics & Automation, Washington, D.C., pp. 359-365, May 2002.
Wong, "EIED Online>> Robot Business", ED Online ID# 13114, 17 pages, Jul. 2006.
Yamamoto et al., "Optical Sensing for Robot Perception and Localization," 2005 IEEE Workshop on Advanced Robotics and its Social Impacts, pp. 14-17, 2005.
Yata et al., "Wall Following Using Angle Information Measured by a Single Ultrasonic Transducer," Proceedings of the 1998 IEEE, International Conference on Robotics & Automation, Leuven, Belgium, pp. 1590-1596, May 1998.
Yun et al., "Image-Based Absolute Positioning System for Mobile Robot Navigation," IAPR International Workshops SSPR, Hong Kong, pp. 261-269, Aug. 2006.
Yun et al., "Robust Positioning a Mobile Robot with Active Beacon Sensors," *Lecture Notes in Computer Science*, 2006, vol. 4251, pp. 890-897, 2006.
Yuta et al., "Implementation of an Active Optical Range sensor Using Laser Slit for In-Door Intelligent Mobile Robot," IEE/RSJ International Workshop on Intelligent Robots and Systems (IROS 91) vol. 1, Osaka, Japan, pp. 415-420, Nov. 3-5, 1991.
Zha et al., "Mobile Robot Localization Using Incomplete Maps for Change Detection in a Dynamic Environment," Advanced Intelligent Mechatronics '97. Final Program and Abstracts., IEEE/ASME International Conference, pp. 110, Jun. 1997.
Zhang et al., "A Novel Mobile Robot Localization Based on Vision," *SPIE* vol. 6279, 6 pages, Jan. 2007.
Zoombot Remote Controlled Vaccuum-RV-500 New Roomba 2, website: http://cgi.ebay.com/ws/eBayISAPI.dll?ViewItem&category=43526&item=4373497618&rd=1, accessed Apr. 20, 2005, 7 pages.
Floorbotics, VR8 Floor Cleaning Robot, Product Description for Manufacturing, URL: <http://www.consensus.sem.au/SoftwareAwards/CSAarchive/CSA2004/CSAart04/FloorBot/F>. Mar. 2004, 11 pages.
Franz et al., "Biomimetric robot navigation", Robotics and Autonomous Systems, vol. 30 pp. 133-153, 2000.
Friendly Robotics, "Friendly Robotics—Friendly Vac, Robotic Vacuum Cleaner," Retrieved from the Internet: URL< www.friendlyrobotics.com/vac.htm > 5 pages, Apr. 2005.
Friendly Robotics, Retrieved from the Internet: URL<http://www.robotsandrelax.com/PDFs/RV400Manual.pdf>. 18 pages, accessed Dec. 2011.
Fuentes et al., "Mobile Robotics 1994," University of Rochester. Computer Science Department, TR 588, 44 pages, Dec. 1994.
Fukuda et al., "Navigation System based on Ceiling Landmark Recognition for Autonomous mobile robot," 1995 IEEE/RSJ Interna-

(56) References Cited

OTHER PUBLICATIONS tional Conference on Intelligent Robots and Systems 95. 'Human Robot Interaction and Cooperative Robots', Pittsburgh, PA, pp. 1466/1471, Aug. 1995.
Gat, "Robust Low-Computation Sensor-driven Control for Task-Directed Navigation," Proc of IEEE International Conference on Robotics and Automation , Sacramento, CA pp. 2484-2489, Apr. 1991.
Gionis, "A hand-held optical surface scanner for environmental Modeling and Virtual Reality," Virtual Reality World, 16 pages, 1996.
Goncalves et al., "A Visual Front-End for Simultaneous Localization and Mapping", Proceedings of the 2005 IEEE International Conference on Robotics and Automation, Barcelona, Spain, pp. 44-49, Apr. 2005.
Gregg et al., "Autonomous Lawn Care Applications," 2006 Florida Conference on Recent Advances in Robotics, Miami, Florida, May 25-26, 2006, Florida International Universit , 5 pages.
Grumet, "Robots Clean House," Popular Mechanics, Nov. 2003, 3 pages.
Hamamatsu "SI PIN Diode S5980, S5981 S5870—Multi-element photodiodes for surface mounting," Hamatsu Photonics, 2 pages, Apr. 2004.
Hammacher Schlemmer , "Electrolux Trilobite Robotic Vacuum," Retrieved from the Internet: URL< www.hammacher.com/publish/71579.asp?promo=xsells>. 3 pages, Mar. 2005.
Haralick et al. "Pose Estimation from Corresponding Point Data", *IEEE Transactions on Systems, Man, and Cybernetics*, 19(6):1426-1446, Nov. 1989.
Hausler, "About the Scaling Behaviour of Optical Range Sensors," Fringe '97, Proceedings of the 3rd International Workshop on Automatic Processing of Fringe Patterns, Bremen, Germany, pp. 147-155, Sep. 1997.
Hitachi: News release: "The home cleaning robot of the autonomous movement type (experimental machine)," Retrieved from the Internet: URL< www.i4u.com./japanreleases/hitachirobot.htm>. 5 pages, Mar. 2005.
Hoag et al., "Navigation and Guidance in interstellar space," ACTA Astronautica, vol. 2, pp. 513-533 , Feb. 1975.
Home Robot—UBOT; Microbotusa.com, retrieved from the WWW at www.microrobotusa.com, accessed Dec. 2, 2008, 2 pages.
Huntsberger et al., "CAMPOUT: A Control Architecture for Tightly Coupled Coordination of Multirobot Systems for Planetary Surface Exploration," *IEEE Transactions on Systems, Man, and Cybernetics—Part A: Systems and Humans*, 33(5):550-559, Sep. 2003.
Iirobotics.com, "Samsung Unveils Its Multifunction Robot Vacuum," Retrieved from the Internet: URL<.www.iirobotics.com/webpages/hotstuff.php?ubre=111>. 3 pages, Mar. 2005.
InMach "Intelligent Machines," Retrieved from the Internet: URL<www.inmach.de/inside.html>. 1 page , Nov. 2008.
Innovation First, "2004 EDU Robot Controller Reference Guide," Retrieved from the Internet: URL<http://www.ifirobotics.com>. 13 pages, Mar. 2004.
Jarosiewicz et al., "Final Report—Lucid," University of Florida, Departmetn of Electrical and Computer Engineering, EEL 5666—Intelligent Machine Design Laboratory, 50 pages, Aug. 1999.
Jensfelt et al., "Active Global Localization for a mobile robot using multiple hypothesis tracking," *IEEE Transactions on Robots and Automation*, 17(5): 748-760, Oct. 2001.
Jeong et al., "An intelligent map-building system for indoor mobile robot using low cost photo sensors,"*SPIE*, vol. 6042, 6 pages, 2005.
Kahney, "Robot Vacs are in the House," Retrieved from the Internet: URL<www.wired.com/news/technology/o,1282,59237,00.html>. 6 pages, Jun. 2003.
Karcher "Karcher RoboCleaner RC 3000," Retrieved from the Internet: URL<www.robocleaner.de/english/screen3.html>. 4 pages, Dec. 2003.
Karcher Product Manual Download webpage: Retrieved from the Internet: URL<http://www.karcher.com/bta/download.en.shtml?ACTION=SELECTTEILENR&ID=rc3000&submitButtonName=Select+Product+Manual "and associated .pdf file" 5959-915en.pdf (4.7 MB) English/English, 16 pages, accessed Jan. 2004.
Karcher RC 3000 Cleaning Robot-user manual Manufacturer: Alfred-Karcher GmbH & Co, Cleaning Systems, Alfred Karcher-Str 28-40, PO Box 160, D-71349 Winnenden, Germany, Dec. 2002, 8 pages.
Karcher RC3000 RoboCleaner,—IMAGE, Accessed at <http://www.karcher.de/versions/int/assets/video/2_4_robo_en.swf>. Accessed Sep. 2009, 1 page.
Karcher USA, RC3000 Robotic Cleaner, website: http://www.karcher-usa.com/showproducts.php?op=view prod¶ml=143&param2=&param3=, 3 pages, accessed Mar. 2005.
Karcher, "Product Manual Download Karch", available at www.karcher.com, 16 pages, 2004.
Karlsson et al, "Core Technologies for service Robotics," IEEE/RSJ International Conference on Intelligent Robots and Systems (IROS 2004), vol. 3, pp. 2979-2984, Sep. 2004.
Karlsson et al., The vSLAM Algorithm for Robust Localization and Mapping, Proceedings of the 2005 IEEE International Conference on Robotics and Automation, Barcelona, Spain, pp. 24-29, Apr. 2005.
King and Weiman, "HelpmateTM Autonomous Mobile Robots Navigation Systems," SPIE vol. 1388 Mobile Robots, pp. 190-198, 1990.
Kleinberg, The Localization Problem for Mobile Robots, Laboratory for Computer Science, Massachusetts Institute of Technolo! , 1994 IEEE, pp. 521-531, 1994.
Knights, et al., "Localization and Identification of Visual Landmarks," *Journal of Computing Sciences in Colleges*, 16(4):312-313, May 2001.
Kolodko et al., "Experimental System for Real-Time Motion Estimation," Proceedings of the 2003 IEEE/ASME International Conference on Advanced Intelligent Mechatronics (AIM 2003), pp. 981-986, 2003.
Komoriya et al., "Planning of Landmark Measurement for the Navigation of a Mobile Robot," Proceedings of the 1992 IEEE/RSJ International Cofnerence on Intelligent Robots and Systems, Raleigh, NC pp. 1476-1481, Jul. 1992.
Koolvac Robotic Vacuum Cleaner Owner's Manual, Koolatron, 2004, 13 pages.
Krotkov et al., "Digital Sextant," Downloaded from the internet at: http://www.cs.cmu.edul~epk/ , 1 page, 1995.
Krupa et al., "Autonomous 3-D Positioning of Surgical Instruments in Robotized Laparoscopic Surgery Using Visual Servoin," *IEEE Transactions on Robotics and Automation*, 19(5):842-853, Oct. 2003.
Kuhl et al., "Self Localization in Environments using Visual Angles," VRCAI '04 Proceedings of the 2004 ACM SIGGRAPH international conference on Virtual Reality continuum and its applications in industry, pp. 472-475, 2004.
Kurs et al, Wireless Power transfer via Strongly Coupled Magnetic Resonances, Downloaded from www.sciencemag.org, Aug. 2007, 5 pages.
Kurth, "Range-Only Robot Localization and SLAM with Radio", http://www.ri.cmu.edu/pub_files/pub4/kurth_derek_2004_1/kurth_derek_2004_1.pdf. 60 pages, May 2004, accessed Jul. 27, 2012.
Kwon et al., "Table Recognition through Range-based Candidate Generation and Vision based Candidate Evaluation," ICAR 2007, The 13th International Conference on Advanced Robotics Aug. 21-24, 2007, Jeju, Korea, pp. 918-923, 2007.

* cited by examiner

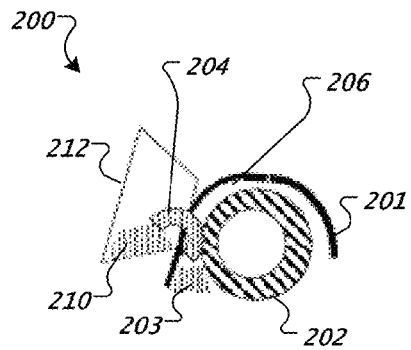
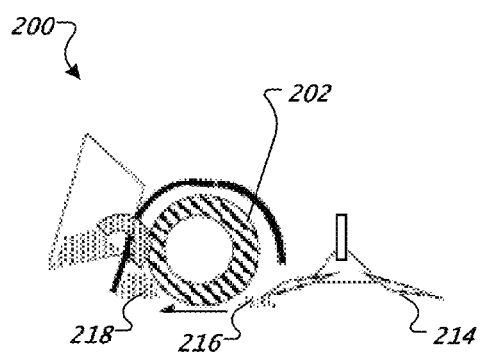
FIG. 17A    FIG. 17B
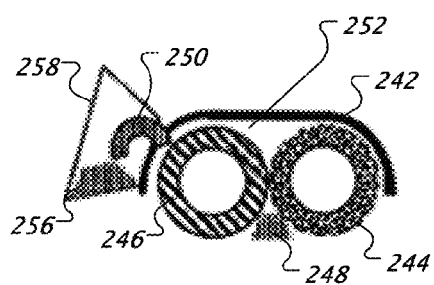
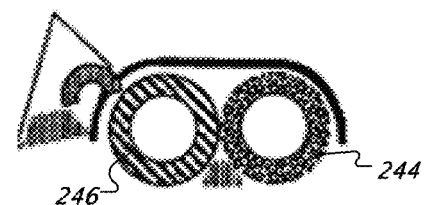
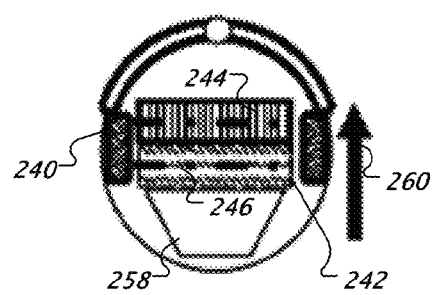
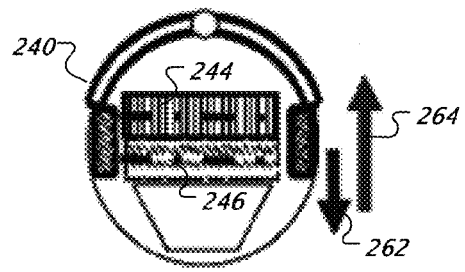
FIG. 17C    FIG. 17D

COVERAGE ROBOT MOBILITY

CROSS-REFERENCE TO RELATED APPLICATIONS

This U.S. continuation patent application claims priority under 35 U.S.C. §120 to U.S. patent application Ser. No. 12/211,938, filed on Sep. 17, 2008, which is a continuation of U.S. patent application Ser. No. 11/633,885, filed on Dec. 4, 2006, which claims priority under 35 U.S.C. §119(e) to U.S. provisional patent application 60/741,442 filed on Dec. 2, 2005. The disclosures of these prior applications are considered part of the disclosure of this application and are incorporated herein by reference in their entireties.

TECHNICAL FIELD

This disclosure relates to autonomous coverage robots.

BACKGROUND

Autonomous robots are robots which can perform desired tasks in unstructured environments without continuous human guidance. Many kinds of robots are autonomous to some degree. Different robots can be autonomous in different ways. An autonomous coverage robot traverses a work surface without continuous human guidance to perform one or more tasks. In the field of home, office and/or consumer-oriented robotics, mobile robots that perform household functions such as vacuum cleaning, floor washing, patrolling, lawn cutting and other such tasks have been widely adopted.

SUMMARY

An autonomous coverage robot will encounter many obstacles while operating. In order to continue operating, the robot will need to continually avoid obstacles, and in cases where trapped by fabric, string, or other entangling soft media, free itself.

In one aspect, an autonomous coverage robot includes a chassis, a drive system mounted on the chassis and configured to maneuver the robot, an edge cleaning head carried by the chassis, and a controller carried by the chassis. The edge cleaning head is driven by an edge cleaning head motor and may rotate about a non-horizontal axis. The edge cleaning head extends beyond a lateral extent of the chassis to engage a floor surface while the robot is maneuvered across the floor. The edge cleaning head may be disposed on or near a peripheral edge of the robot. A brush control process, independent of drive processes, on a controller that controls robot operation is configured to monitor motor current associated with the edge cleaning head. The brush control process on the controller is also configured to reverse bias the edge cleaning head motor in a direction opposite to the previous cleaning direction after detecting a spike (e.g., transient or rapid increase in motor current) or in general an elevated motor current motor (to substantially neutrally rotate and/or be driven to rotate at the same speed as a an unwinding cord, string, or other tangled medium), while continuing to maneuver the robot across the floor performing uninterrupted coverage or cleaning of the floor or other motion behaviors. In one implementation, the brush control process on the controller, following an elevated edge cleaning head motor current, reverse biases the edge cleaning head motor (to substantially neutrally rotate and/or be driven to rotate at the same speed as a an unwinding cord, string, or other tangled medium) and subsequently or concurrently passes a signal to a drive motor control process, directly or indirectly via a supervising process, so that the unwinding may occur at the same time that the robot drives substantially backwards, alters a drive direction, and moves the robot forward.

In one implementation, the edge cleaning head includes a brush with bristles that extend beyond a peripheral edge of the chassis. In one example, the edge cleaning head includes at least one brush element having first and second ends, the bush element defining an axis of rotation about the first end normal to the work surface. The edge cleaning head may rotate about a substantially vertical axis. In one instance, the edge cleaning head includes three brush elements, where each brush element forms an angle with an adjacent brush element of about 120 degrees. In another instance, the edge cleaning head comprises six brush elements, where each brush element forms an angle with an adjacent brush element of about 60 degrees.

In another implementation, the edge cleaning head comprises a rotatable squeegee that extends beyond a peripheral edge of the chassis. The rotatable squeegee may be used for wet cleaning, surface treatments, etc.

In yet another implementation, the edge cleaning head includes a plurality of absorbent fibers that extend beyond a peripheral edge of the chassis upon rotation of the cleaning head. The plurality of absorbent fibers may be used like a mop to clean up spills, clean floors, apply surface treatments, etc.

The robot may include multiple cleaning heads (e.g., two or three) carried by the chassis. In one example, the robot further includes a main cleaning head carried by the chassis, a cleaning head extending across a swath covered by the robot, which forms the main work width of the robot, and which may be driven to rotate about a horizontal axis to engage a floor surface while the robot is maneuvered across the floor. The main cleaning head may include a cylindrical body defining a longitudinal axis of rotation parallel to the work surface, bristles disposed on the cylindrical body, and flexible flaps disposed longitudinally along the cylindrical body. The brush control process on the controller is configured to reverse bias the rotation of the main cleaning head (to substantially neutrally rotate and/or be driven to rotate at the same speed as a an unwinding cord, string, or other tangled medium), in response to an elevated main cleaning head motor current, while a motion control process independently continues to maneuver the robot across the floor. In another example, the robot includes two main cleaning brushes carried by the chassis and driven to rotate about a horizontal axis to engage a floor surface while the robot is maneuvered across the floor. The two main cleaning brushes may be driven to rotate in the same or opposite directions.

In another aspect, a method of disentangling an autonomous coverage robot includes placing the robot on a floor surface, the robot autonomously traversing across the floor surface in a forward direction of the robot while rotating about a non-horizontal axis an edge cleaning head carried by the chassis and driven by an edge cleaning head motor. The edge cleaning head extends beyond a lateral extent of the chassis while engaging the floor surface. The robot independently provides a reverse bias for the edge cleaning head motor (to substantially neutrally rotate and/or be driven to rotate at the same speed as a an unwinding cord, string, or other tangled medium), in response to an elevated edge cleaning head motor current while continuing to maneuver across the floor surface.

In one implementation, the brush control process on the controller of the robot determines movement of the robot in the forward direction before (independently of robot motion control) reversing the rotation of the edge cleaning head in response to an elevated cleaning head motor current. The brush control process of the robot may (independently of robot motion control) reverses the rotation of the edge cleaning head in response to an elevated edge cleaning head motor current for a period of time. In one example, after the brush control process reverses the rotation of the edge cleaning head, the brush control process may directly or through a supervising process pass a signal to the motion control process of the robot to move in a reverse direction, alter a drive direction, and moves in the drive direction.

In another implementation, the robot also includes a main cleaning brush carried by the chassis, which may be driven to rotate about a horizontal axis to engage the floor surface while the robot is maneuvered across the floor. The robot independently reverses the rotation of the main cleaning brush in response to an elevated main cleaning head motor current while continuing to maneuver across the floor surface. The brush cleaning process of the robot may also determine movement of the robot in the forward direction before independently reversing the rotation of the main cleaning brush in response to an elevated main cleaning brush motor current. Furthermore, the brush cleaning process of the robot may also reverse the rotation of the main cleaning brush for a certain period of time or in intervals.

In another aspect, an autonomous coverage robot includes a drive system, a bump sensor, and a proximity sensor. The drive system is configured to maneuver the robot according to a heading (turn) setting and a speed setting. The bump sensor is responsive to a collision of the robot with an obstacle in a forward direction. The proximity sensor is responsive to an obstacle forward of the robot at a proximate distance but not contacting the robot, e.g., 1-10 inches, preferably 1-4 inches. The motion control processes of the drive system may also be configured to reduce the speed setting in response to a signal from the proximity sensor indicating detection of a potential obstacle, while continuing a cleaning or coverage process, including advancing the robot according to the heading setting. Furthermore, the motion control processes of the drive system may also be configured to alter the heading (turn) setting in response to a signal received from the bump sensor indicating contact with an obstacle.

In some instances, the motion control processes of the drive system may be configured to alter the heading setting in response to the signals received from the bump sensor and one or more side proximity sensors to follow a perimeter of the obstacle. In other instances, the drive system may be configured to alter the heading (turn) setting in response to the signals received from the bump sensor and the proximity sensor to direct the robot away from the obstacle. In one example, the drive system is configured to maneuver the robot at a torque (e.g., motor current or motor resistance) setting and the drive system is configured to alter the motor current or motor resistance setting in response to a signal received from the bump sensor indicating contact with an obstacle. The drive system may increase the motor current or motor resistance setting in response to a signal received from the bump sensor indicating contact with an obstacle.

The proximity sensor may include a plurality of sets of at least one infrared emitter and receive pair, directed toward one another to converge at a fixed distance from one another, substantially as disclosed in "Robot obstacle detection system", U.S. Pat. No. 6,594,844, herein incorporated by reference in its entirety. Alternatively, the proximity sensor may include a sonar device. The bump sensor may include a switch, a capacitive sensor, or other contact sensitive device.

The robot may be placed on the floor. In yet another aspect, a method of navigating an autonomous coverage robot with respect to an object on a floor includes the robot autonomously traversing the floor in a cleaning mode at a full cleaning speed. Upon sensing a proximity of the object forward of the robot, the robot reduces the cleaning speed to a reduced cleaning speed while continuing towards the object until the robot detects a contact with the object. Upon sensing contact with the object, the robot turns with respect to the object and cleans next to the object, optionally substantially at the reduced cleaning speed. The robot may follow a perimeter of the object while cleaning next to the object. Upon leaving the perimeter of the robot, the robot may increase speed to a full cleaning speed. The robot may maintain a substantially constant following distance from the object, may maintain a following distance smaller than the extent of extension of an edge cleaning head or brush beyond a following side of the robot body, or may substantially contact the object while cleaning next to the object in response to the initial, reduced cleaning speed contact with the object. In one example, the following distance from the object is substantially a distance between the robot and the object substantially immediately after the contact with the object. In another example, the following distance from the object is between about 0 and 2 inches.

In one instance, the robot performs a maneuver to move around the object in response to the contact with the object. The maneuver may include the robot moving in a substantially semi-circular path, or a succession of alternating partial spirals (e.g., arcs with progressively decreasing radius) around the object. Alternatively, the maneuver may include the robot moving away from the object and then moving in a direction substantially tangential to the object.

Upon sensing a proximity of the object forward of the robot, the robot may decrease the full cleaning speed to a reduced cleaning speed at a constant rate, an exponential rate, a non-linear rate, or some other rate. In addition, upon sensing contact with the object, the robot may increase a torque (e.g., motor current) setting of the drive, main brush, or side brush motors.

In yet another aspect, an autonomous robot includes a chassis, a drive system mounted on the chassis and configured to maneuver the robot, and a floor proximity sensor carried by the chassis and configured to detect a floor surface below the robot. The floor proximity sensor includes a beam emitter configured to direct a beam toward the floor surface and a beam receiver responsive to a reflection of the directed beam from the floor surface and mounted in a downwardly-directed receptacle of the chassis. The floor proximity sensor may be a substantially sealed unit (e.g., in the downward direction) and may also include a beam-transparent cover having a forward and rearward edge disposed across a lower end of the receptacle to prohibit accumulation of sediment, "carpet fuzz", hair, or household dust within the receptacle. The cover may include a lens made of an anti-static material. The forward edge of the cover, i.e., the edge of the cover in the direction of robot motion, at the leading edge of the robot, is elevated above the rearward edge. The lower surface of the receptacle may be wedge shaped. In one example, the floor proximity sensor includes at least one infrared emitter and receiver pair, substantially as disclosed in "Robot obstacle detection system", U.S. Pat. No. 6,594,844.

In one implementation, the drive system of the robot includes at least one driven wheel suspended from the chassis and at least one wheel-floor proximity sensor carried by the chassis and housed adjacent one of the wheels, the wheel-floor proximity sensor configured to detect the floor surface adjacent the wheel. The drive system may also include a controller configured to maneuver the robot away from a perceived cliff in response a signal received from the floor proximity sensor. In some instances, the drive system includes a wheel drop sensor housed near one of the wheels and responsive to substantial downward displacement of the wheel with respect to the chassis. The drive system may include a validation system that validates the operability of the floor proximity sensors when all wheels drop. The validation is based on the inference that all wheels dropped are likely the result of a robot being lifted off the floor by a person, and checks to see that all floor proximity sensors do not register a floor surface (either no reflection measured, or a reflection that is too strong). Any sensor that registers a floor surface or a too strong reflection (e.g., indicating a blocked sensor) is considered blocked. In response to this detection, the robot may initiate a maintenance reporting session in which indicia or lights indicate that the floor proximity sensors are to be cleaned. In response to this detection, the robot will prohibit forward motion until a validation procedure determines that all floor proximity sensors are clear and are functional. Each wheel-floor and wheel drop proximity sensors may include at least one infrared emitter and receiver pair.

DESCRIPTION OF DRAWINGS

FIGS. 17A-H illustrate examples of methods for disentangling coverage robots with various configurations of cleaning heads.

FIG. 17A illustrates a method of disentangling which may be used with a coverage robot having an agitating roller FIG. 17B illustrates a method of disentangling which may be used with a coverage robot having an agitating roller and a brush roller.

FIG. 17C has a side view and a bottom view that illustrates a method for disentangling a coverage robot with dual agitating rollers.

FIG. 17D illustrates an alternate method of disentangling with the robot shown in FIG. 17C.

FIG. 17E illustrates a method of disentangling a coverage robot with two agitation rollers and a brush roller.

FIG. 17F illustrates another method of disentangling the coverage robot.

FIG. 17G has a side view and a bottom view illustrating a disentanglement method with a coverage robot 300 with two agitation rollers and two air ducts.

FIG. 17H has a side view and a bottom view illustrating a disentanglement method with a coverage robot 300 with two agitation rollers, a brush roller and two air ducts.

Like reference symbols in the various drawings indicate like elements.

DETAILED DESCRIPTION

Figure 1:
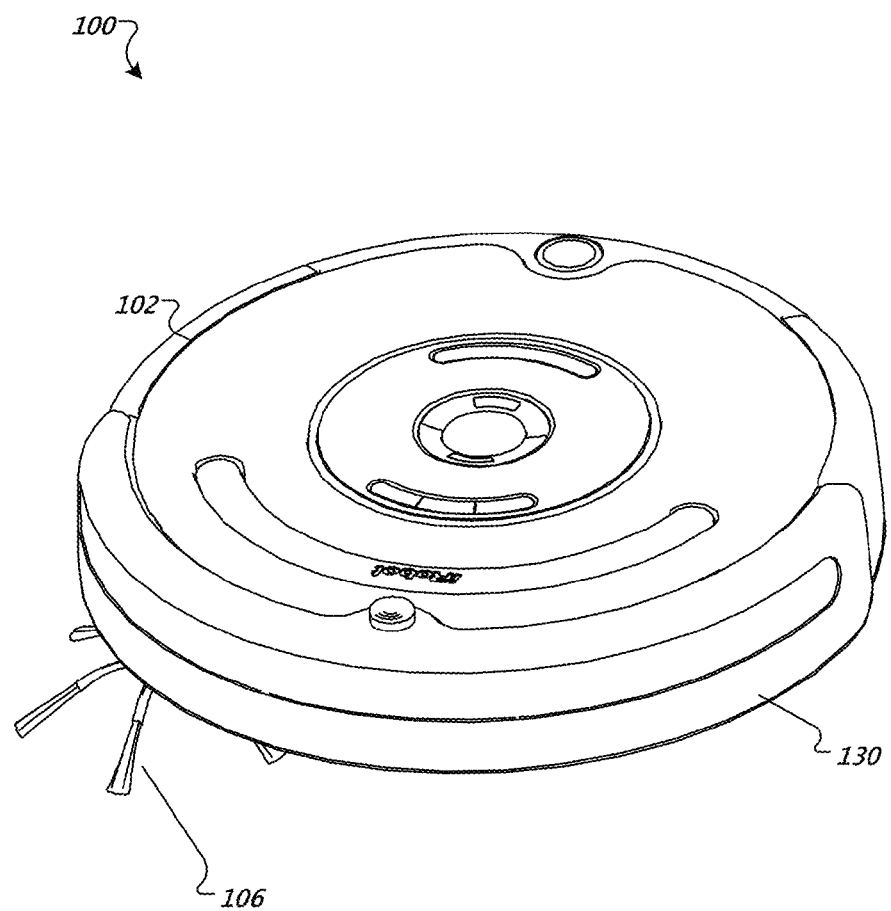
FIG. 1 shows an above-perspective view of an example autonomous coverage robot.
Figure 2:
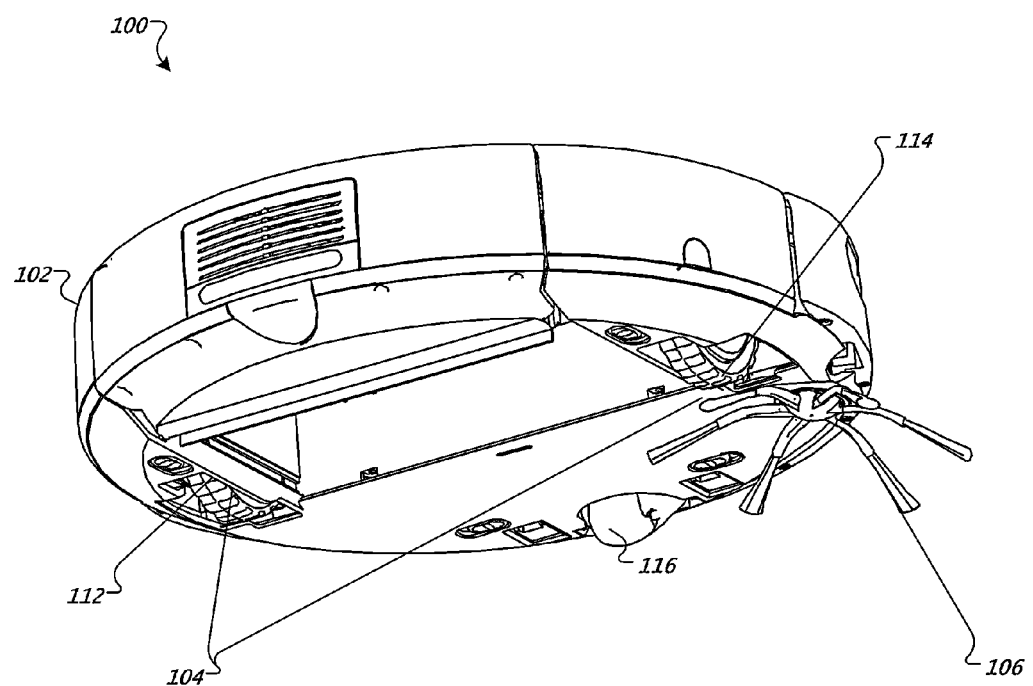
FIG. 2 shows a below-perspective view of an example autonomous coverage robot.
Figure 3:
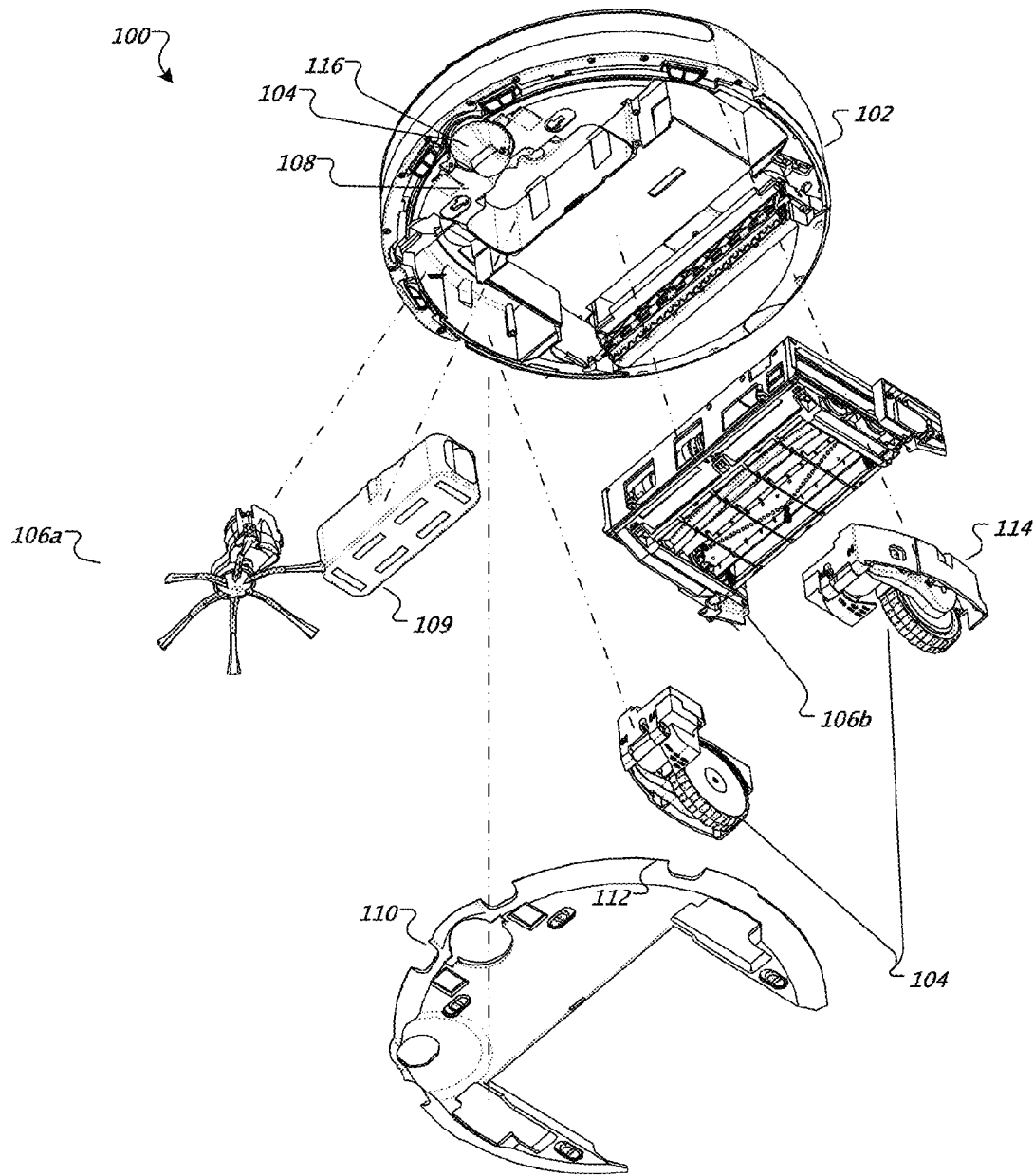
FIG. 3 shows an exploded view of an example autonomous coverage robot.

FIGS. 1-3 show above-perspective, below-perspective, and exploded views of an example autonomous coverage robot 100. Robot 100 has a chassis 102, a drive system 104, an edge cleaning head 106a, and a controller 108. Drive system 104 is mounted on the chassis 102, and is a differential drive (left and right wheels near to or on the center diameter of the robot and independently speed controllable) configured to maneuver robot 100. Edge cleaning head 106a is mounted to extend past the side edge of chassis 102 for removing dirt and debris below and immediately adjacent to robot 100, and more particularly to sweep dirt and debris into the cleaning path of the main cleaning head 106b as the robot cleans in a forward direction. In some implementations, the main or edge cleaning heads 106b, 106a may also be used to apply surface treatments. A controller 108 (also depicted in FIG. 9A) is carried by chassis 102 and is controlled by behavior based robotics to provide commands to the components of robot 100 based on sensor readings or directives, as described below, to clean or treat floors in an autonomous fashion. A battery 109 may provide a source of power for robot 100 and its subsystems. A bottom cover 110 may protect internal portions of robot 100 and keep out dust and debris.

Drive system 104 includes a left drive wheel assembly 112, a right drive wheel assembly 114 and a castor wheel assembly 116. Drive wheel assemblies 112, 114 and castor wheel assembly 116 are connected to chassis 102 and provide support to robot 106. Controller 108 may provide commands to the drive system to drive wheels 112 and 114 forward or backwards to maneuver robot 100. For instance, a command may be issued by controller 108 to engage both wheel assemblies in a forward direction, resulting in forward motion of robot 100. In another instance, a command may be issued for a left turn that causes left wheel assembly 112 to be engaged in the forward direction while right wheel assembly 114 is driven in the rear direction, resulting in robot 100 making a clockwise turn when viewed from above.

Figure 4:
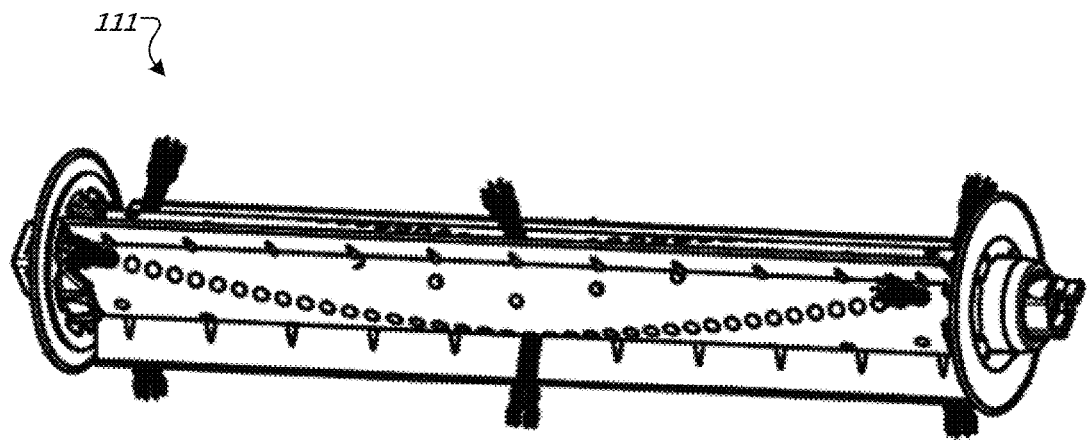
FIG. 4 shows a front-perspective view of an example main cleaning head which may be incorporated in an autonomous coverage robot.
Figure 5:
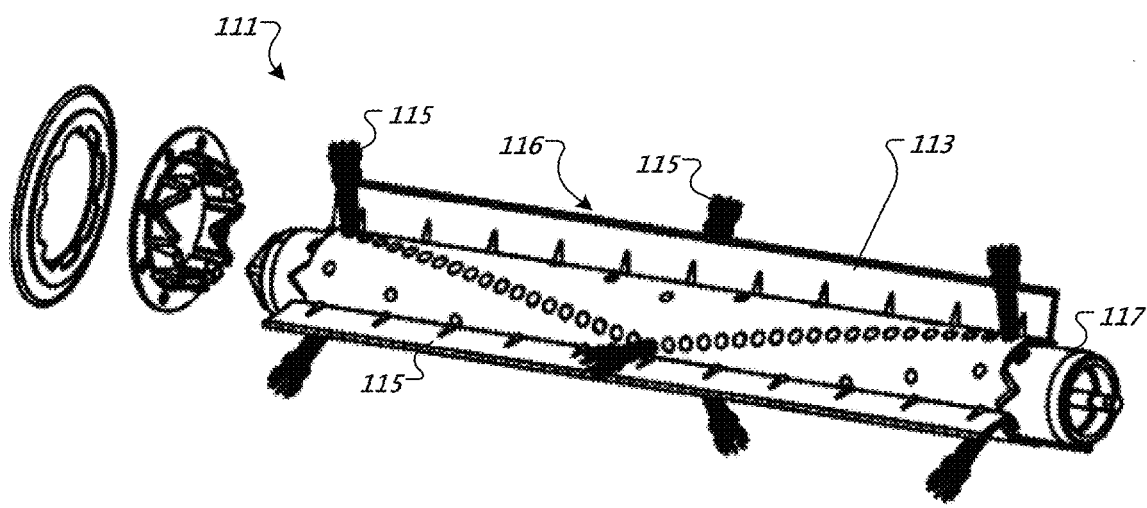
FIG. 5 shows an exploded view of an example main cleaning head which may be used with an autonomous coverage robot.

FIGS. 4 and 5 show front perspective and exploded views of a main cleaning brush 111 which may be incorporated in the main cleaning head 106b of the robot 100 via attachment to chassis 102. General structure of a robot and cleaning heads as disclosed herein is similar to that disclosed in U.S. Pat. No. 6,883,201, herein incorporated by reference in its entirety, except when so noted. In general, when a robot brush becomes entangled with cords, strings, hair, fringes or tassels, the brush motor may encounter over-current or temperature rise, and may cause increased energy consumption, poor cleaning, slowing or jamming of the brush. If the robot is so controlled or the entangling item is heavy or secured, the robot may be held in place, and if sensors are available to detect stasis, may stop moving and thereby fail to clean. A robot that gets stuck during its working routine must be "rescued" and cleaned in order to continue autonomous function. Theoretically, there may be additional expenditure of energy to combat static or dynamic friction in the drive wheels, caster, bin squeegee and cleaning head drive train (reverse-drive). The fringes/tassels/cords may wind tightly around a smallest wind diameter of the cleaning brush (e.g., usually the core of a brush 111, if the brush 111 includes only bristles). If the smallest diameter of the cleaning brush 111 is solid (no elasticity), additional energy may be required to overcome static or dynamic friction in a gear train of the cleaning head and the brushes in contact with the floor, e.g., when the brush is rotated in the opposite within the cleaning head in order to unwind the fringes/tassels/cords. If the tassel or string is permitted to continue winding about the brush, it may be necessary to remove the brush 111 from the cleaning head 106b in order to remove the entanglement. Main cleaning head 111 has baffles or soft flaps 113 and bristles 115 arranged along a cleaning head body 117. Soft flaps 113 disposed along the length of cleaning head body 117 may minimize static friction. Cleaning head body 117 may be rotated about its horizontal axis so that it engages the floor surface while robot 100 is moving across a floor, causing baffles 113 and bristles 115 to agitate dirt and debris which may be on the floor's surface. Controller 108 may be configured to reverse bias the rotation of main cleaning head 111 (i.e., provide sufficient reverse current to permit the cleaning brush to freely rotate when the robot draws out and unwinds an entanglement as it moves away in a forward direction) following a sharp rise in or an elevated main cleaning head motor current, while continuing to conduct a cleaning cycle or other cycle as the controller 108 executes individual motion control behaviors to move the robot 100 across the floor. A rim 116 of soft flaps 113 in this case can become the smallest diameter of cleaning head 111. Rim 116 is flexible (pliable, soft), so as to require little energy to deform, potentially diverting energy away from that required to initiate robot 100 movement. A momentary delay in a brush gear train encountering static friction provides an opportunity for robot 100 to resume movement, thereby enabling easier disentanglement of brushes. Similarly, a cord or tassel may become less entangled about the larger diameter of the rim 116 (in comparison to a core such as core 117 or even smaller core) simply because the brush 111 does not complete as many turns per unit length of entangled cord or tassel. Furthermore, a length-wise scooped (curved) nature of the flaps 13 further acts as a spring forcing the tassels/fringes to unravel/open during the momentary lag between the robot being set in motion and a reverse bias to bias back-driving of the entangled cleaning head 111. Bristles 115 may be used primarily used to clean, while flaps 113 may be used primarily for disentanglement purposes. This allows robot 100 to continue to clean (agitate the carpet) if an entangled string snaps off and gets retained by flaps 113 in cleaning head 111. Other robot details and features combinable with those described herein may be found in the following U.S. Provisional Patent Application No. 60/747,791, the entire contents of which are hereby incorporated by reference.

Figure 6A:
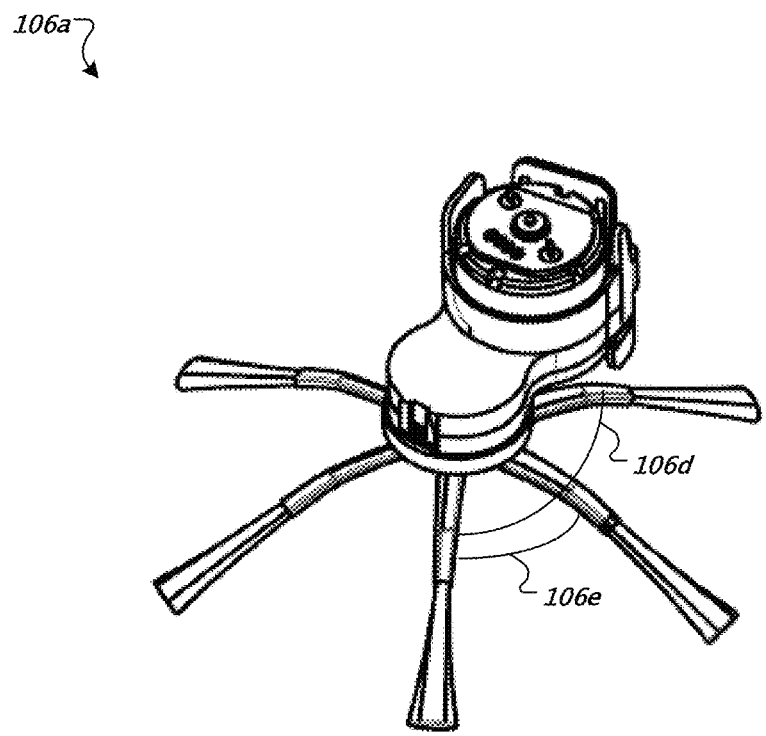
FIG. 6A shows an above-perspective view of an example edge cleaning head which uses a rotatable brush.
Figure 6B:
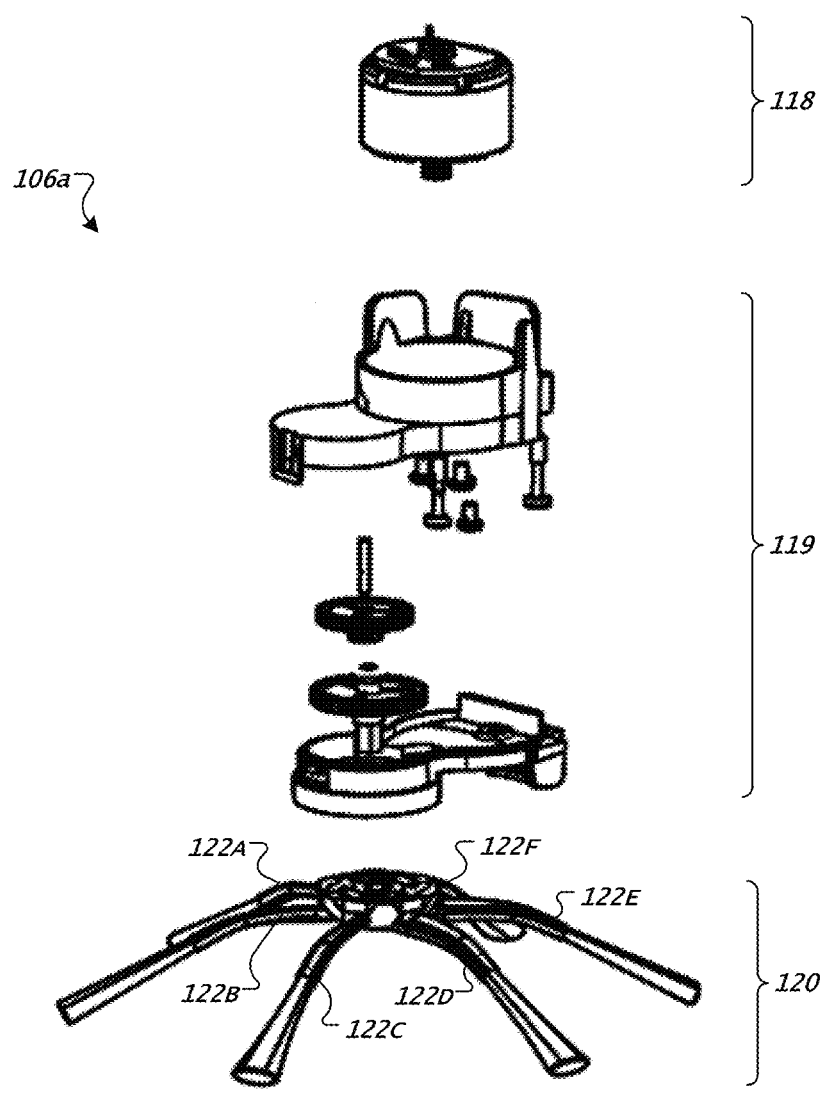
FIG. 6B shows an exploded view of an example edge cleaning head.
Figure 6C:
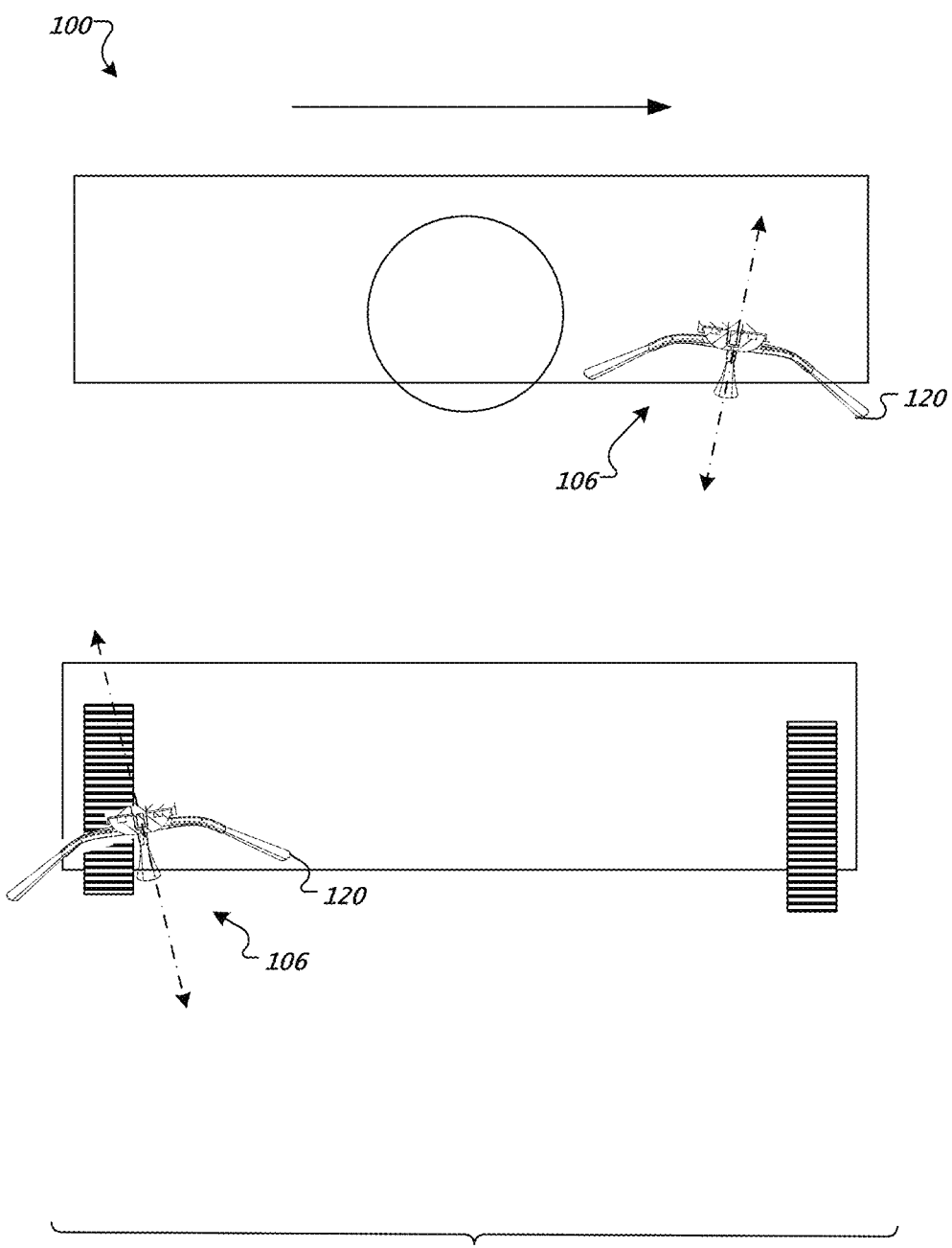
FIG. 6C shows schematic views of a tilt of an example edge cleaning head.

FIGS. 6A and 6B show above-perspective and exploded views of edge cleaning head 106. Edge cleaning head 106a is carried by chassis 102 and driven by an edge cleaning head motor 118 and drive transmission 119 to rotate a brush 120 about a non-horizontal axis. Brush 120 has brush elements 122A-F that extend beyond a peripheral edge of chassis 102. Each brush element 122A-F forms an angle of about 60 degrees with adjacent brush elements and is tipped with bristles extending along the axis of the elements. Brush 120 may be rotated about a vertical axis, such that the ends of bush elements 122A-F move normal to the work surface. Edge cleaning head 106 may be located near the edge of robot 100 so that brush 120 is capable of sweeping dirt and debris beyond the edge of chassis 102. In some implementations, the edge cleaning head 106 operates about an axis offset (tilted) from a vertical axis of the robot. As shown in schematic form in FIG. 6C the brush 106 may be tilted, in both forward and side to side directions (i.e., tilted downward with respect to the plane of wheel contact about a line about 45 degrees from the direction of travel within that plane), in order to collect debris from outside the robot's periphery toward the main work width, but not disturb such collected debris once it is there or otherwise eject debris from the work width of the robot. The axis offset is optionally adjustable to customize the tilt of the cleaning head 106 to suit various carpet types, such as shag.

Figure 7:
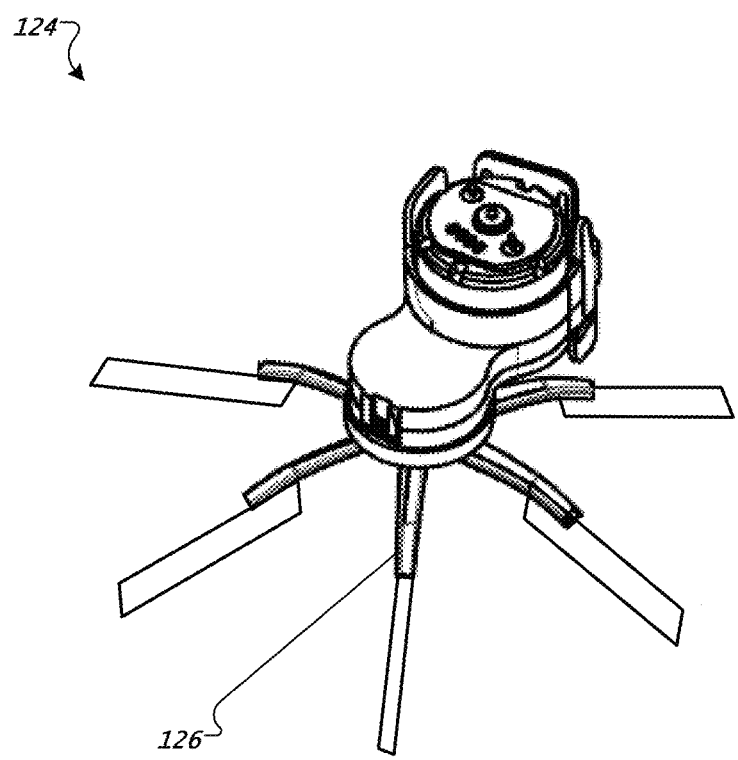
FIG. 7 shows an example of an edge cleaning head with a rotatable squeegee.

Other configurations of edge cleaning heads may also be used with robot 100. For example, an edge cleaning head may have three evenly-spaced brush elements separated by 120 degrees. FIG. 7 shows another example of an edge cleaning head 124 in which a rotatable squeegee 126 is used in place of a brush. In other configurations, an edge cleaning head may have one or more absorbent fibers that extend beyond a peripheral edge of chassis 102.

Figure 8A:
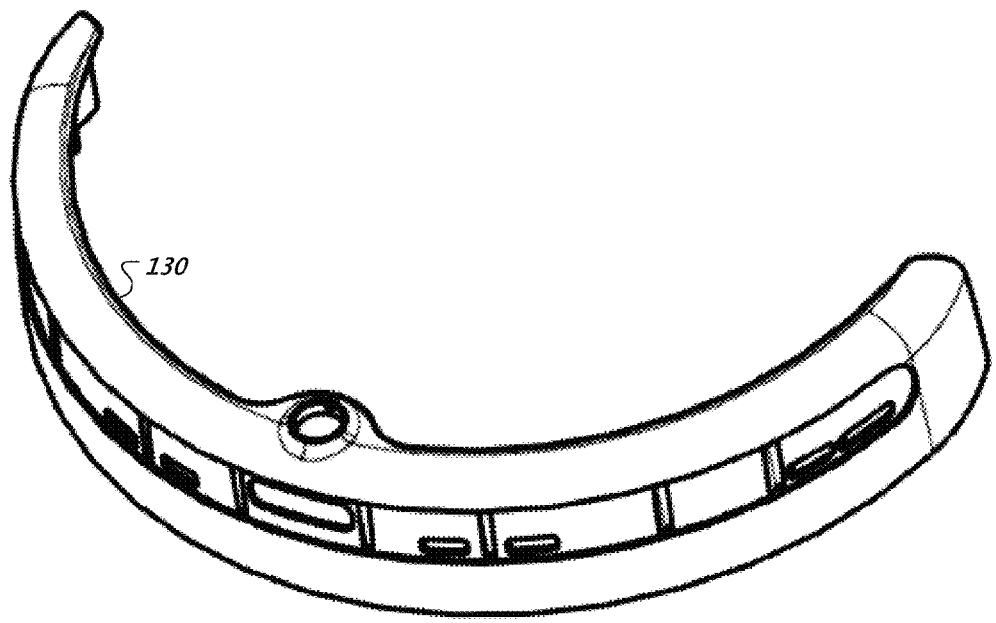
FIG. 8A shows a bumper which may be used with autonomous coverage robot.
Figure 8B:
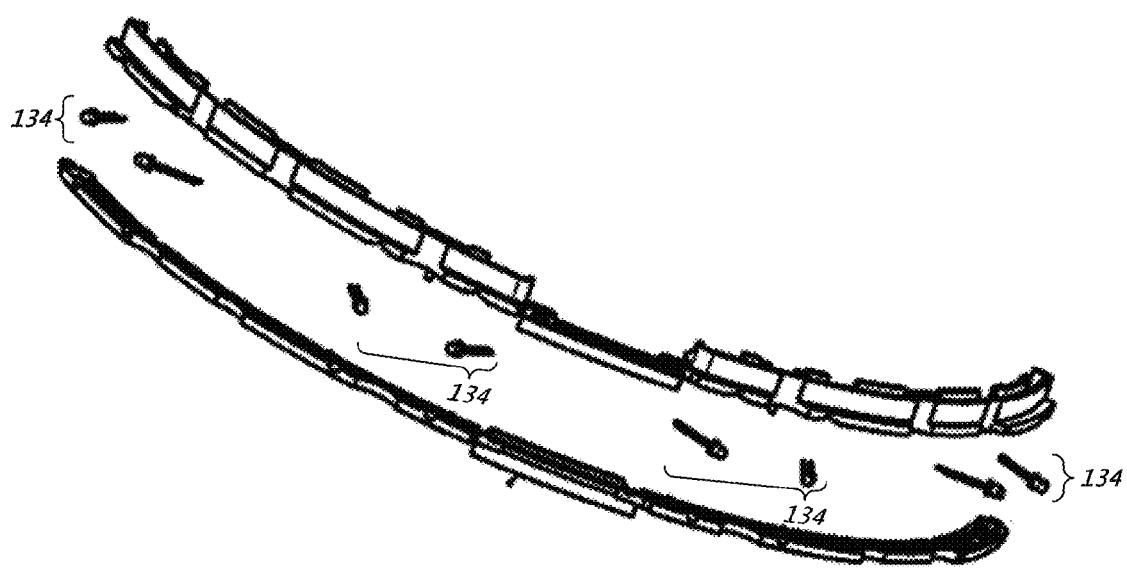
FIG. 8B shows kinetic bump sensors and proximity sensors.

FIG. 8A shows a bumper 130 which may be used with the autonomous coverage robot 100. FIG. 8B shows proximity sensors 134 which may be housed within bumper 130. Drive system 104 may be configured to maneuver robot 100 according to a heading setting and a speed setting. Proximity sensors 134 may sense a potential obstacle in front of the robot.

Figure 9A:
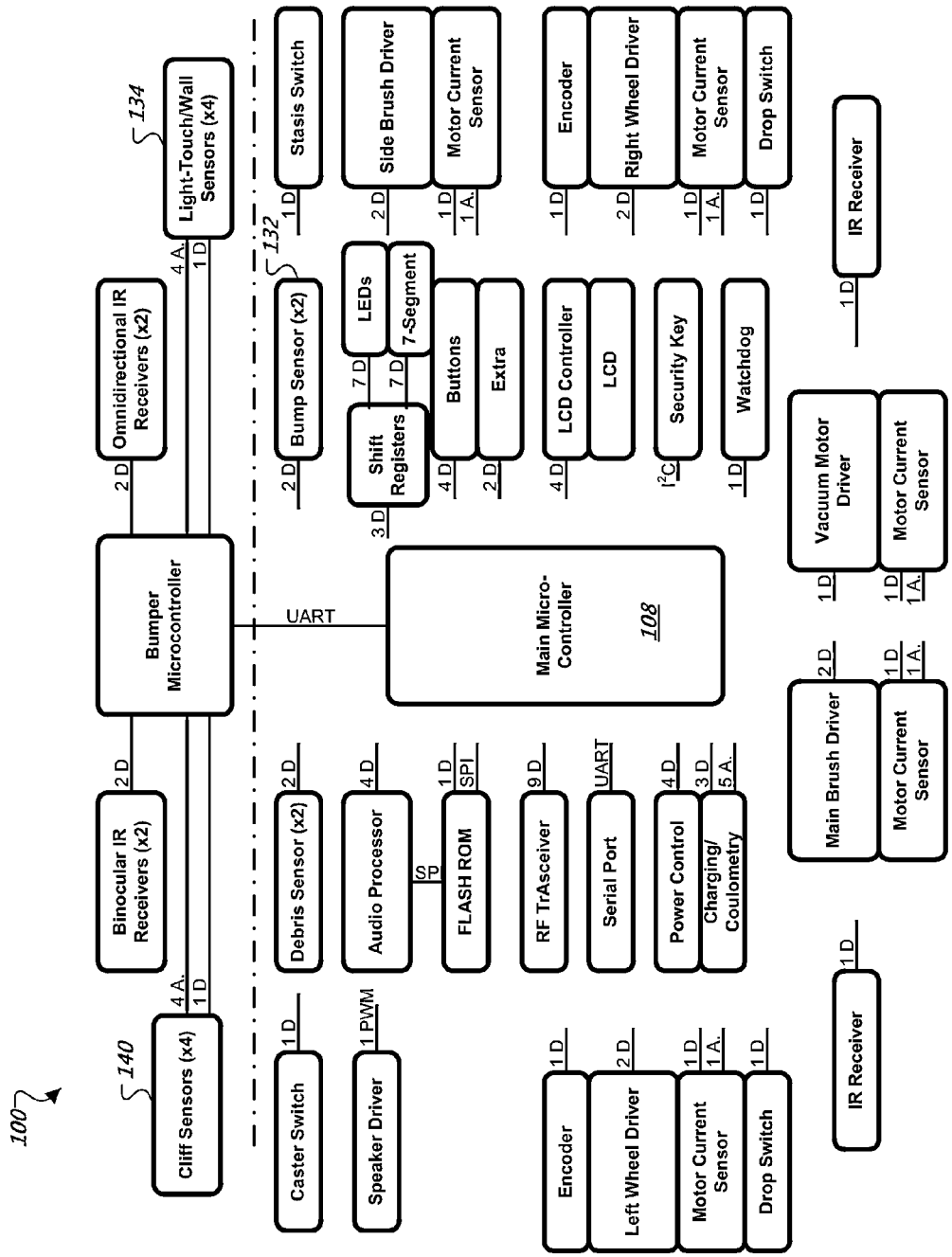
FIG. 9A shows a block diagram of an exemplary robot.

FIG. 9A shows a schematic view of electronics of the robot 100. The robot 100 includes a controller 103 which communicates with a bumper micro-controller 107A, that together control an omni-directional receiver, directional receiver, the wall proximity sensors 134, and the bumper switches 132. The controller 103 monitors all other sensor inputs, including the cliff sensors 140 and motor current sensors for each of the motors.

Control of the direction and speed of the robot 100 may be handled by motion control behaviors selected by an arbiter according to the principles of behavior based robotics for coverage and confinement, generally disclosed in U.S. Pat. Nos. 6,809,490 and 6,781,338, herein incorporated by reference in their entireties (and executed by controller 108), to reduce the speed magnitude of robot 100 when proximity sensor 134 detects a potential obstacle. The motion behaviors executed by the controller 108 may also alter the velocity of robot 100 when kinetic bump sensors 132 detect a collision of robot 100 with an obstacle. Accordingly, referring to FIG. 9A, robot 100 traverses a floor surface by executing a cruising or STRAIGHT behavior 900. When robot 100 detects a proximate, but not yet contacting obstacle via proximity sensors 134, robot 100 executes a gentle touch routine 902 (which may be a behavior, a part of a behavior, or formed by more than one behavior), in which robot 100 does not proceed at full cleaning speed into the obstacle; but instead reduces its approach speed from a full cleaning speed of about 300 mm/sec to a reduced cleaning speed of about 100 mm/sec via controller 108 toward the potential obstacle, such that when a collision does occur, the collision is less noisy, and less likely to mar surfaces. The overall noise, the potential damage to the robot 100 or the object being collided thereby is reduced. When robot 100 detects contact with the object via kinetic bump sensors 132, robot 100 executes one of the following routines: bounce 910, follow obstacle perimeter 912, alter drive direction and move away from object 914, or alter drive direction to curve to approach the object and follow along it (e.g., a wall). Bounce 910 entails robot 100 moving so as to bounce along the object. Follow obstacle perimeter 912 entails robot 100 using proximity sensors 134 to follow along a perimeter of the object at a predefined distance to, for example, clean up close to the object and/or clean to the very edge of a wall. The robot 100 continuously cleans the room, and when it detects a proximate object (which may be a wall, table, chair, sofa, or other obstacle) in the forward direction, it continues cleaning in the same direction without interruption, albeit at a reduced speed. In predetermined and/or random instances, the robot 100 will bump the object, turn in place so that the edge of the main cleaning head 106b is as close to the wall as possible, and closely follow the object on the side of the robot, essentially at the reduced cleaning speed, such that the side/edge brush 106a collects debris or dirt from the corner between the floor and the wall or obstacle. Once the robot 100 leaves the wall, after a predetermined and/or randomized distance within predetermined limits, the robot 100 increases its speed up to full cleaning speed. On other occasions, it will bump the object, turn in place until facing away from the object or wall, and immediately proceed away from the object or wall at full cleaning speed.

The robot 100 employs a behavioral software architecture within the controller 103. While embodiments of the robot 100 discussed herein may use behavioral based control only in part or not at all, behavior based control is effective at controlling the robot to be robust (i.e. not getting stuck or failing) as well as safe. The robot 100 employs a control and software architecture that has a number of behaviors that are executed by an arbiter in controller 103. A behavior is entered into the arbiter in response to a sensor event. In one embodiment, all behaviors have a fixed relative priority with respect to one another. The arbiter (in this case) recognizes enabling conditions, which behaviors have a full set of enabling conditions, and selects the behavior having the highest priority among those that have fulfilled enabling conditions. In order of decreasing priority, the behaviors are generally categorized as escape and/or avoidance behaviors (such as avoiding a cliff or escaping a corner), and working behaviors (e.g., wall following, bouncing, or driving in a straight line). The behaviors may include: different escape (including escaping corners, anti-canyoning, stuck situations, "ballistic" temporary fire-and-forget movement that suppress some avoid behaviors, e.g., as disclosed in U.S. Pat. No. 6,809,490) cliff avoiding, virtual wall avoiding (a virtual wall may be a beacon with a gateway beam), spot coverage (covering in a confined pattern such as a spiral or boustrophedon patch), align (turning in place, using side proximity sensors to align with a forward obstacle encountered while obstacle following, e.g., an inside corner), following (representing either or both of substantially parallel or bump following along an obstacle using a side proximity sensor or bumper that extends to the side of the robot), responding to a bump in order to "bounce" (a behavior that occurs after the robot bumps an object), and drive (cruising). Movement of the robot, if any, occurs while a behavior is arbitrated. If more than one behavior is in the arbiter, the behavior with a higher priority is executed, as long as any corresponding required conditions are met. For example, the cliff avoiding behavior will not be executed unless a cliff has been detected by a cliff detection sensor, but execution of the cliff avoiding behavior always takes precedence over the execution of other behaviors that also have satisfied enabling conditions.

The reactive behaviors have, as their enabling conditions or triggers, various sensors and detections of phenomena. These include sensors for obstacle avoidance and detection, such as forward proximity detection (multiple), forward bump detection (multiple), cliff sensors (multiple), detection of a virtual wall signal (which may instead be considered a coverage trigger). Sensors of these types are be monitored and conditioned by filters, conditioning, and their drivers, which can generate the enabling conditions as well as record data that helps the behavior act predictably and on all available information (e.g., conversion to one-bit "true/false" signals, recording of likely angle of impact or incidence based on strength or time differences from a group of sensors, or historical, averaging, frequency, or variance information).

Actual physical sensors may be represented in the architecture by "virtual" sensors synthesized from the conditioning and drivers. Additional "virtual" sensors that are synthesized from detectable or interpreted physical properties, proprioceptive or interpreted upon the robot 100, such as over-current of a motor, stasis or stuck condition of the robot 100 (by monitoring a lack of odometry reading from a wheel encoder or counter), battery charge state via coulometry, and other virtual sensors.

In addition, reactive behaviors can act according to enabling conditions that represent detected phenomena to be sought or followed. A beam or wireless (RF, acoustic) signal can be detected without direction; or in some cases with direction. A remote beam or marker (bar code, retro-reflective, distinctive, fiducial, or natural recognized by vision landmark) giving a direction can permit homing or relative movement; without direction the robot 100 can nonetheless move to servo on the presence, absence, and/or relative strength of a detected signal. The reflection of a beam from the robot 100, edge, or line can be similarly detected, and following behaviors (such as obstacle following by the robot 100) conducted by servoing on such signal. A debris or artifact signal can be collected by monitoring debris or objects collected by or traversed by the robot, and that signal can be an enabling condition for a reactive behavior controlling a spot coverage pattern.

The robot 100 maintains concurrent processes, "parallel" processes that are not generally considered reactive behaviors. A scheduler may be necessary to allocate processor time to most other processes, e.g., including the arbiter and behaviors, in a co-operative or other multitasking manner. If more threading is available, less processes may be managed by the scheduler. As noted, filters and conditioning and drivers, can interpret and translate raw signals. These processes are not considered reactive behaviors, and exercise no direct control over the motor drives or other actuators. In addition, in the present embodiment, brush motor controller(s) control the main and side brushes, although these may alternatively be controlled by dedicated brush behaviors and a brush control arbiter.

In accordance with another example, the gentle touch routine 902 may employ an infrared proximity detector 134 that should go off (i.e., when a receiver receives from a reflection originating in the overlapping space of an emitter and receiver angled toward one another) from about 1 to 10 inches (preferably, from 1 to 4 inches). This distance is selected in order to be within the effective range of the IR proximity or cross-beam sensor 134, yet with sufficient time to slow the mobile robot 100 before a collision with a detected obstacle). Conventional proximity sensors return a signal strength depending on obstacle albedo; cross-beam sensors 134 can be thresholded for various albedos intruding in the specific distance from the sensor where the receiver and emitter's beam/field cross. Additionally, slowing down based on a proximately detected wall may be suppressed in or turned off by the user, independently of the bump sensor 132. Controller 108 may slow the robot's descent substantially in a steady reduction then cruise slowly. Controller 108 may execute an S-curve slowly over about 3 inches, can slow down steadily but at an accelerating or decelerating rate over about 3 inches. During escape behaviors, for example, panic, stasis, stuck, anti-canyoning, the robot may essentially can be turn off the proximity sensors 134—usually by not using the proximity sensors 134 as an enabling condition for any escape behavior or some avoidance behaviors.

Drive system 104 may be configured to reduce the speed setting in response to a signal from proximity sensor 134 which indicating detection of a forward obstacle, while continuing to advance the robot 100 and work the floor or surface according to the existing heading setting. Drive system 104 may be configured to alter the heading setting in response to a signal received from bump sensor 132 that indicates contact with an obstacle. For example, drive system 104 may be configured to alter the heading setting in response to the signals received from the bump sensor 132 and the proximity sensor 134 such that robot 100 follows a perimeter of the obstacle. In another example, drive system 104 may be configured to change heading to direct robot 104 away from the obstacle.

Proximity sensors 134 may include one or more pairs of infrared emitters and receivers. For instance, a modulated emitter and a standard receiver may be used. A light pipe (not shown), collimating or diffusing optics, Fresnel or diffractive optics, may be used in some implementations to eliminate blind spots by providing a more uniform light pattern or a light pattern more concentrated or more likely to be detected in high probability/high impact areas, such as the immediate forward direction. Alternatively, some implementations may make use of sonar or other types of proximity sensors.

In some implementations, kinetic bump sensor 132 may include a mechanical switch 130. In some implementations, bump sensor 132 may include a capacitive sensor. Other types of contact sensors may also be used as well.

Drive system 104 may be configured to maneuver robot 100 at a torque (or motor current) setting in response to a signal received from bump sensor 132 which indicates contact with an obstacle. For instance, drive system 104 may increase the torque (or motor current) setting in response to a signal received from the bump sensor indicating contact with an obstacle.

In another example method of navigating an autonomous coverage robot with respect to an object on a floor, robot 100 may be initially placed on the floor (or may already be on the floor, e.g., if the robot starts itself from a charging dock) with robot 100 autonomously traversing the floor in a cleaning mode at a full cleaning speed. If robot 100 senses a nearby object in front of robot 100, it reduces the cleaning speed (e.g., to a reduced cleaning speed) and continues moving toward the object and working/cleaning the floor until detecting impact, which is likely to be with the object but may be another object. Upon sensing impact with an object, robot 100 turns with respect to the object that it bumped and cleans next to, i.e., along, the object. Robot 100 may, for instance, follow the object's perimeter while cleaning along or next to the object. In another instance, robot 100 may maintain a somewhat constant following distance from the object while cleaning next to the object in response to the contact with the object. The following distance from the object may be a distance between robot 100 and the object immediately after the contact with the object, for instance, 0 to 2 inches. The distance is optionally less than the distance that the side or edge brush unit 106a extends beyond the side of the robot.

Robot 100 may, in some instances, perform a maneuver to move around the object in response to the contact with the object. For example, robot 100 may move in a somewhat semi-circular path around the object, or a succession of alternating partial spirals (e.g., arcs with progressively decreasing radius). In another instance, robot 100 may move away from the object and then move in a direction that is somewhat tangential to the object.

Robot 100 may decrease the cleaning speed to a reduced speed at a constant rate, for instance, at a non-linear or exponential rate. The full cleaning speed of robot 100 may be about 300 mm/s and the reduced cleaning speed of robot 100 may be about 100 mm/s.

Figure 10:
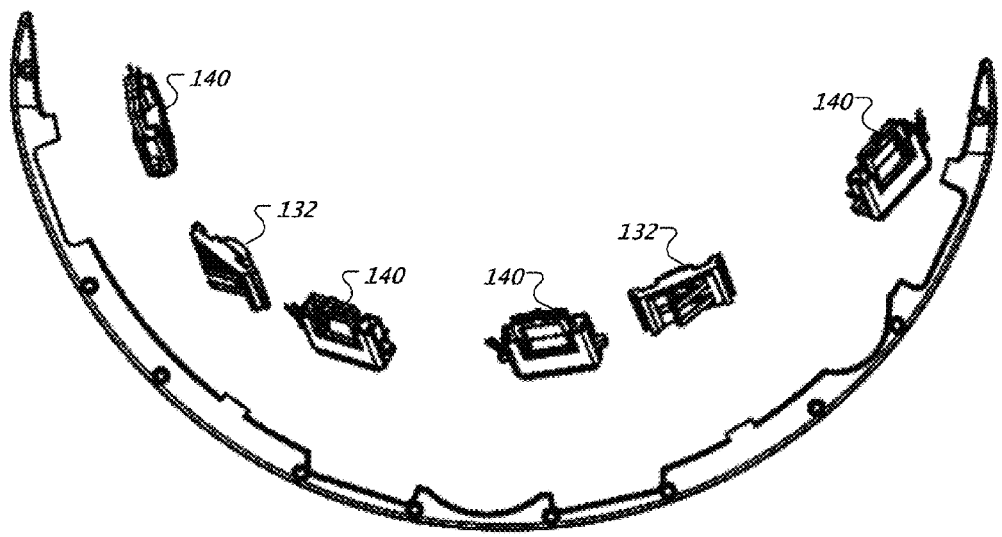
FIG. 10 shows floor proximity sensors and an attachment brace which may be used for detecting an adjacent floor.

FIG. 10 shows kinetic bump sensors 132, floor proximity sensors 140 and an attachment brace 142 which may be used with robot 100 for detecting an adjacent floor. Kinetic bump sensors 132 may sense collisions between robot 100 and objects in the robot's forward path. Floor proximity sensors may be carried by chassis 102 and be used to sense when robot 100 is near a "cliff", such as a set of stairs. Floor proximity sensors 140 may send signals to controller 108 indicating whether or not a cliff is detected. Based on signals from the floor proximity sensors 140, controller 108 may direct drive system 104 to change speed or velocity to avoid the cliff.

Figure 11:
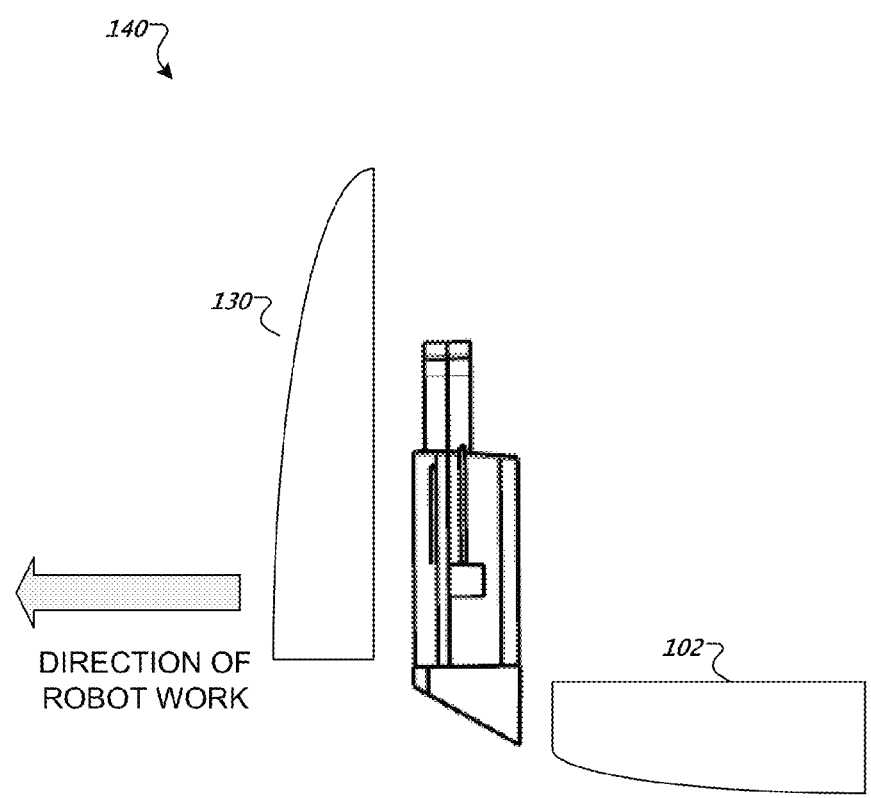
FIGS. 11 and 12 show side and exploded views of a floor proximity sensor.
Figure 12:
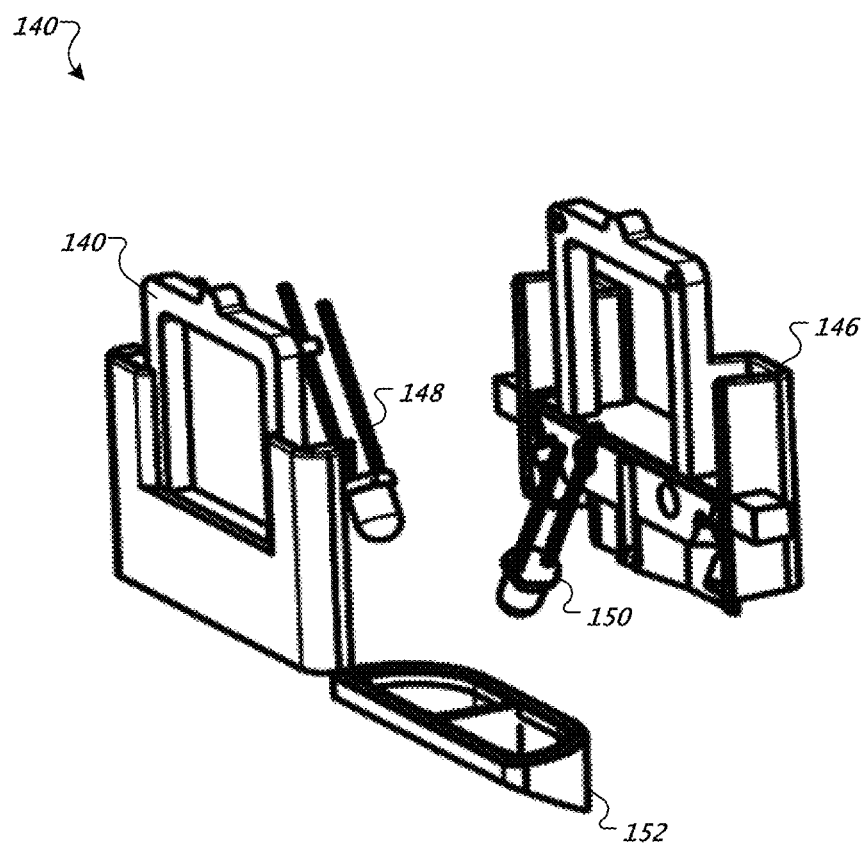

FIGS. 11 and 12 show side and exploded views of a floor proximity sensor 140. Floor proximity sensor 140 has a body with a forward section 144, a rear section 146, an emitter 148, a receiver 150, and a cover 152. Emitter 148 and receiver 150 may be capable of emitting and receiving infrared light. Emitter 148 and receiver 150 are arranged within the forward and rear body sections 144, 146 at an angle so that their axes line up at a point beneath robot 100 at the approximate floor distance.

Figure 13:
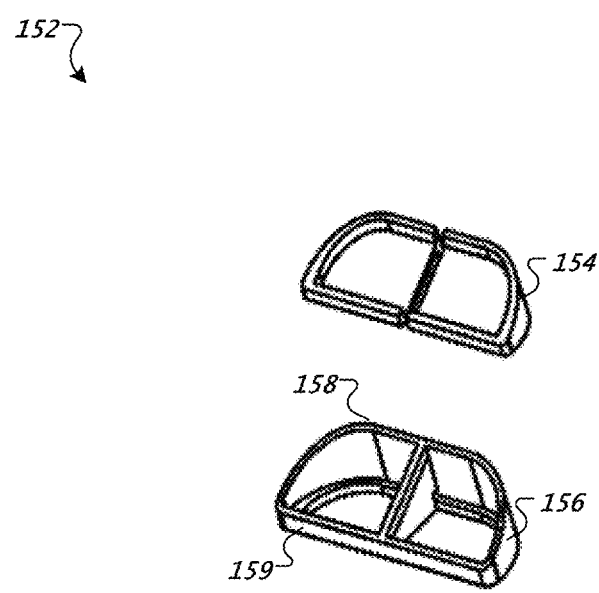
FIG. 13 shows an exploded view of a cover used with the floor proximity sensor shown in FIGS. 11 and 12.

FIG. 13 shows an exploded view of cover 152. Cover 152 consists of a lens 154 and a cover body 156. Lens 152 may be transparent to infrared light and cover body 156 may be opaque to facilitate focusing emissions sent from emitter 148. The forward edge 158 of cover 152 is elevated above its rearward edge 159 to aid in reducing dust build up and to ensure that light is received by receiver 150 primarily when sensor 140 is positioned correctly over a floor and a reduced amount is received when sensor 140 is over a "cliff". In some implementations, cover 152 is constructed using a material with anti-static (dissipative or conductive) properties, such as an anti-static polycarbonate, copper oxide doped or coated polycarbonate, anti-static Lexan "LNP" available from General Electric, Inc., anti-static polyethylene, anti-static ABS/polycarbonate alloy, or other like material. One example includes ABS 747 and PC 114R or 1250Y mixed with anti-static powder. Preferably, the robot shell, chassis, and other parts are also anti-static (e.g., antistatic ABS), dissipative and/or conductive, at least in part in order to ground the anti-static cover 152. The cover 152 may also be grounded by any conductive path to ground. When the coverage robot 100 traverses a floor, a cover 152 with out anti-static properties can become electrostatically charged (e.g., via friction), thereby having a propensity to accumulate oppositely charged debris, such as fuzz, which may obstructing a sensing view of the emitter 148 and receiver 150.

In cases where the floor proximity sensor 140 is properly placed on a floor, light emitted from emitter 148 reflects off the floor and back to receiver 150, resulting in a signal that is readable by controller 108. In the event that the floor proximity sensor 140 is not over a floor, the amount of light received by receiver 150 is reduced, resulting in a signal that may be interpreted by controller 108 as a cliff.

Figure 14:
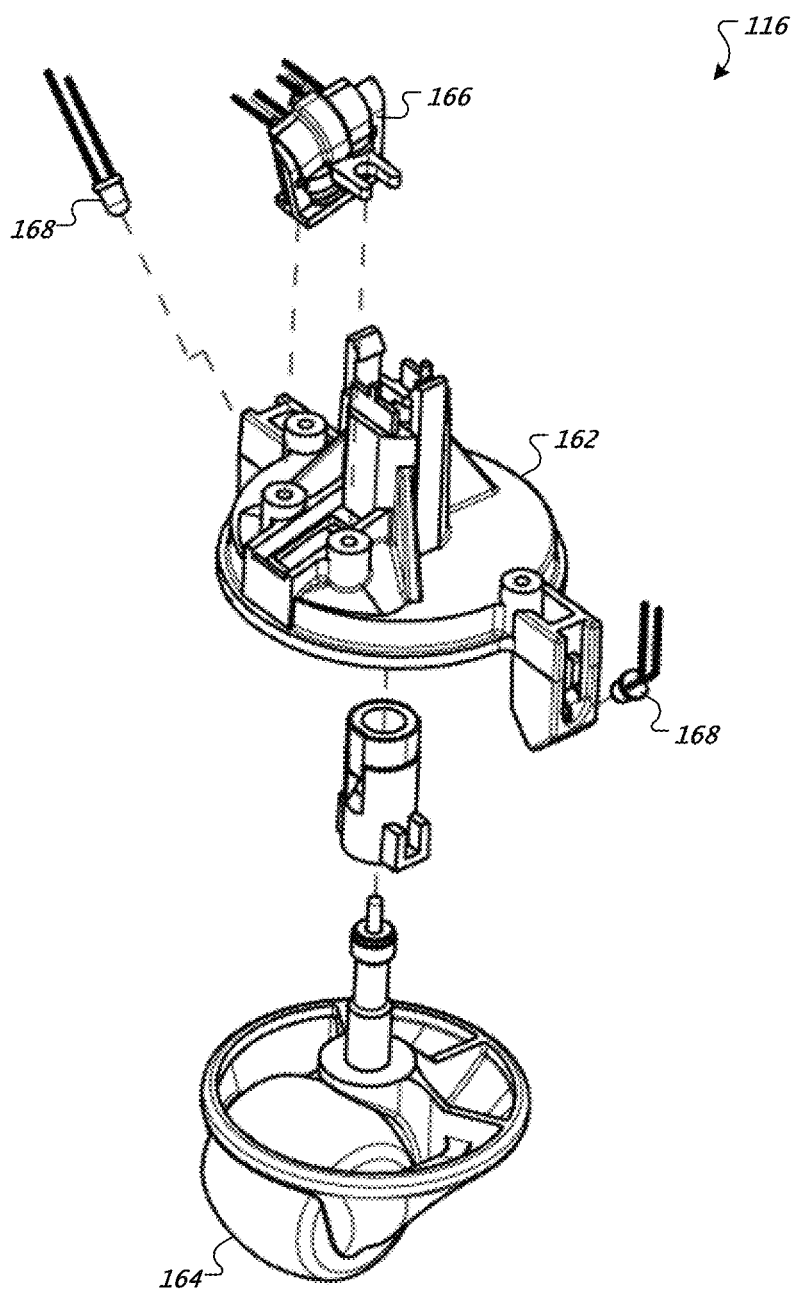
FIG. 14 is an exploded view showing an example of a caster wheel assembly.

FIG. 14 is an exploded view showing an example of the caster wheel assembly 116. Caster wheel assembly 116 is separately and independently removable from the chassis 102 and the coverage robot 100. The caster wheel assembly 116 includes a caster wheel housing 162, a caster wheel 164, a wheel-drop sensor 166, and a wheel-floor proximity sensor 168.

The caster wheel housing 162 carries the caster wheel 164, the wheel drop sensor 866, and wheel-floor proximity sensor 168. The caster wheel 164 turns about a vertical axis and rolls about a horizontal axis in the caster wheel housing 162.

The wheel drop sensor 166 detects downward displacement of the caster wheel 164 with respect to the chassis 102. The wheel drop sensor 166 determines if the caster wheel 164 is in contact with the work surface.

The wheel-floor proximity sensor 168 is housed adjacent to the caster wheel 164. The wheel-floor proximity sensor 168 detects the proximity of the floor relative to the chassis 102. The wheel-floor proximity sensor 168 includes an infrared (IR) emitter and an IR receiver. The IR emitter produces an IR signal. The IR signal reflects off of the work surface. The IR receiver detects the reflected IR signal and determines the proximity of the work surface. Alternatively, the wheel-floor proximity sensor 168 may use another type of sensor, such as a visible light sensor. The wheel-floor proximity sensor 808 prevents the coverage robot 100 from moving down a cliff in the work surface, such as a stair step or a ledge. In certain implementations, the drive wheel assemblies 114, 116 each include a wheel-floor proximity sensor.

Figure 15:
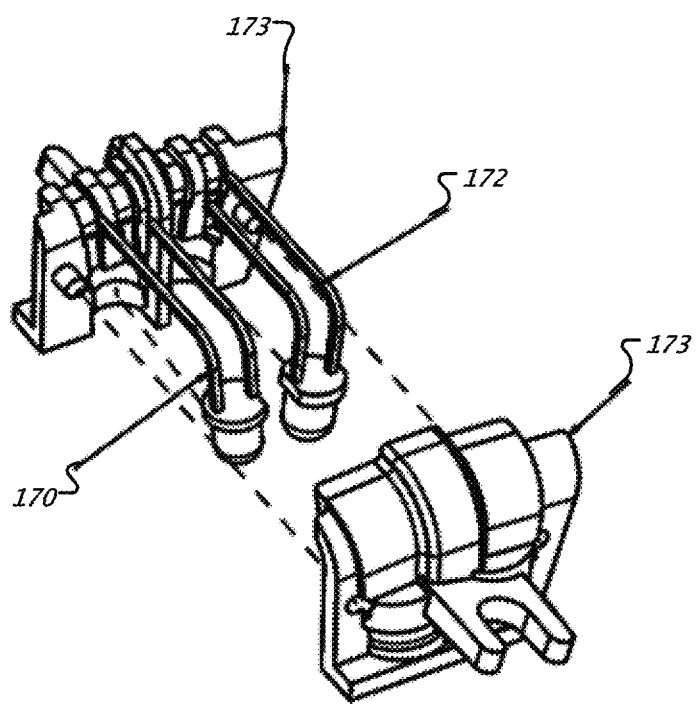
FIG. 15 is an exploded view showing an example of a wheel-drop sensor.

FIG. 15 is an exploded view showing an example of the wheel-drop sensor 166. The wheel drop sensor 806 includes an IR emitter 170 and an IR receiver 172 in a housing 173. The IR emitter 170 produces an IR signal. The IR signal reflects from the caster wheel 164. The IR receiver 172 detects the reflected IR signal and determines the vertical position of the caster wheel 164.

Figure 16:
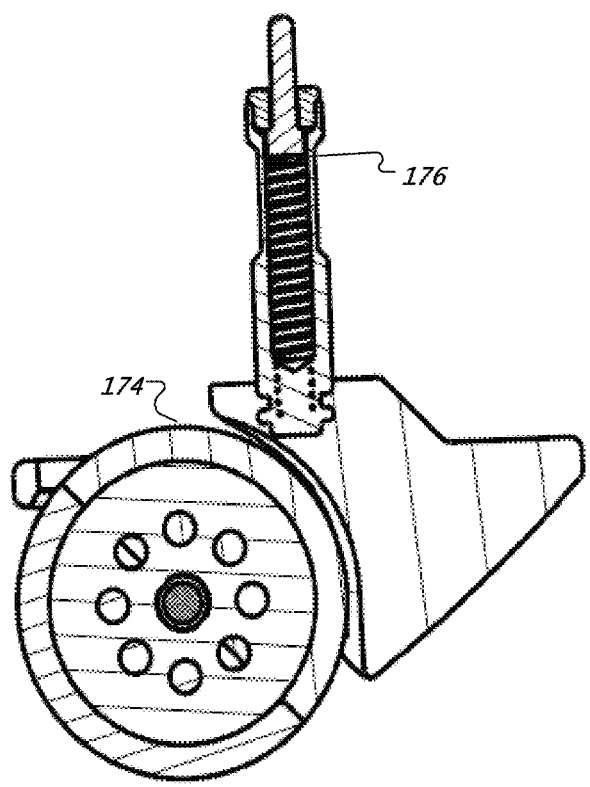
FIG. 16 is a cross-sectional view showing an example of a caster wheel assembly.

FIG. 16 is a cross-sectional view showing an example of the caster wheel assembly 116. The view shows a top surface 174 of the caster wheel 164 from which the IR signal reflects. The IR receiver 172 uses the reflected IR signal to determine the vertical position of the caster wheel 164.

In some instances, drive system 104 may further include a validation system that validates the operability of the floor proximity sensors when all wheels drop. The validation is based on the inference that all wheels dropped are likely the result of a robot being lifted off the floor by a person, and checks to see that all floor proximity sensors do not register a floor surface (either no reflection measured, or a reflection that is too strong). Any sensor that registers a floor surface or a too strong reflection (e.g., indicating a blocked sensor) is considered blocked. In response to this detection, the robot may initiate a maintenance reporting session in which indicia or lights indicate that the floor proximity sensors are to be cleaned. In response to this detection, the robot will prohibit forward motion until a validation procedure determines that all floor proximity sensors are clear and are functional. For example, a mechanical switch sensor may be positioned above castor wheel 168 at a location 176 that causes it to close when the castor is depressed (e.g. it is pushed upwards by the floor), thus providing a alternate signal to controller 108 that castor wheel 164 is on the floor.

Occasionally, an autonomous coverage robot may find itself entangled with an external object, such as frills on the end of a rug or shoe laces dangling from a untied shoe. A method of disentangling an autonomous coverage robotic (such as robot 100) may initially include placing robot 100 on a floor surface, which should be considered to include instances when the robot starts itself from a dock (e.g., after a significant delay, but nonetheless having been placed on the floor). Robot 100 autonomously moves forward across the floor surface while operating the cleaning heads 106a, 106b. Robot 100 may reverse bias edge cleaning head motor 118 in response to a measured increase (e.g., spike or increase above threshold, rapid increase of a predetermined slope) in motor current while continuing to maneuver across the floor surface in an unchanged direction, working and/or cleaning the floor without interruption.

In some instances, robot 100 may move forward before (independently of forward motion control by the motion behaviors) reverse biasing the rotation of edge cleaning head 106a in response to an elevated cleaning head motor current. Robot 100 may independently reverse the rotation of edge cleaning head 106a in response to an increased edge cleaning head 106a motor current for a period of time. The time period for increased current may be specified, for instance, in seconds. After reverse biasing the rotation of edge cleaning head 106, robot 100 may move in a reverse direction, alter its direction of travel, and move in the new direction.

In particular combination, the robot includes a main cleaning head 106b extending across the middle of the robot, e.g., in a direction transverse to the robot working path or substantially in a direction parallel to the main drive wheels, as well as an edge cleaning head which is arranged at the lateral side of the robot, in a position to extend the edge cleaning head beyond the perimeter of the robot in the side direction so as to clean beside the robot (as opposed to solely underneath the body of the robot). The main cleaning head 106b includes at least one rotationally driven brush 111, and the edge cleaning head 106a includes at least one rotationally driven brush 120.

Figure 9B:
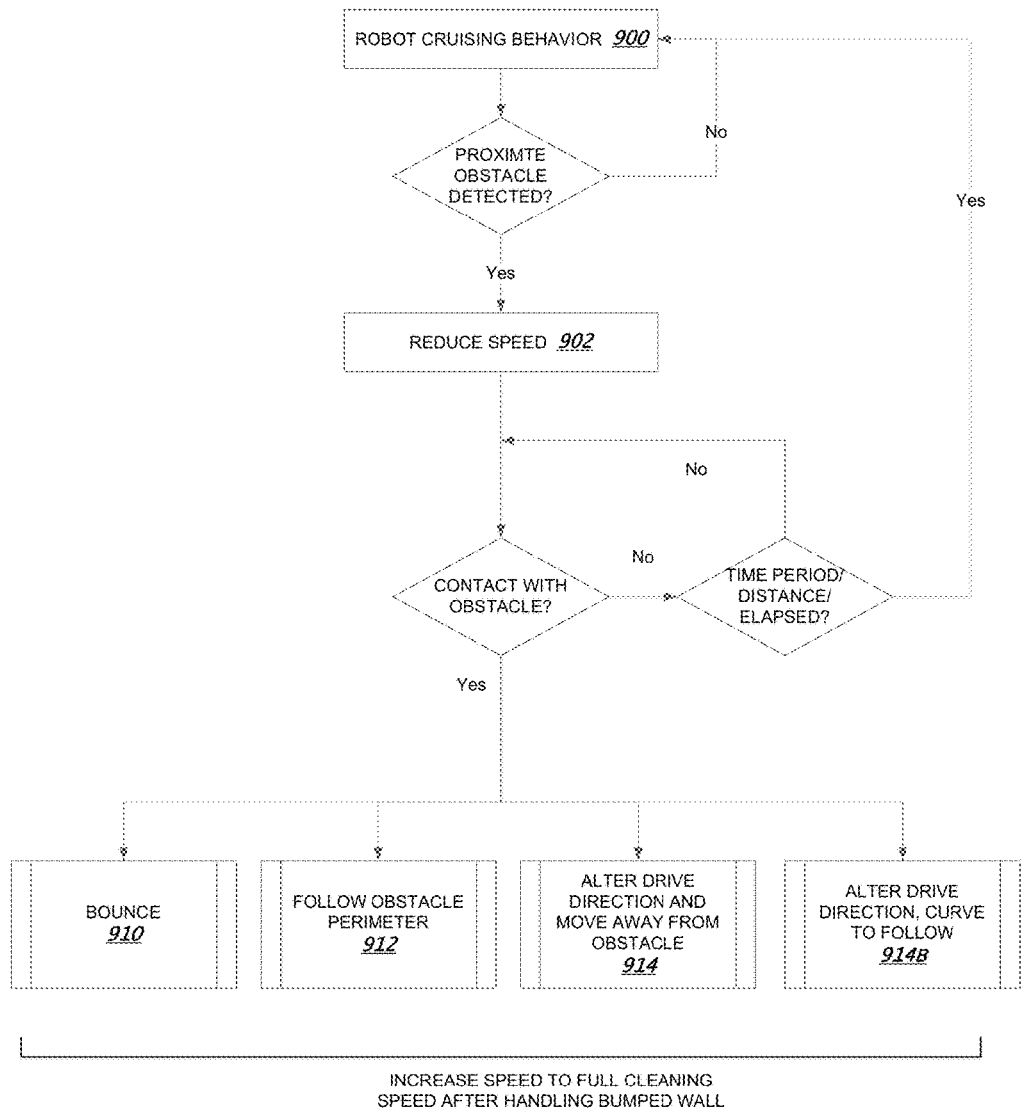
FIGS. 9B and 9C show flow charts describing motion control and brush operation.
Figure 9C:
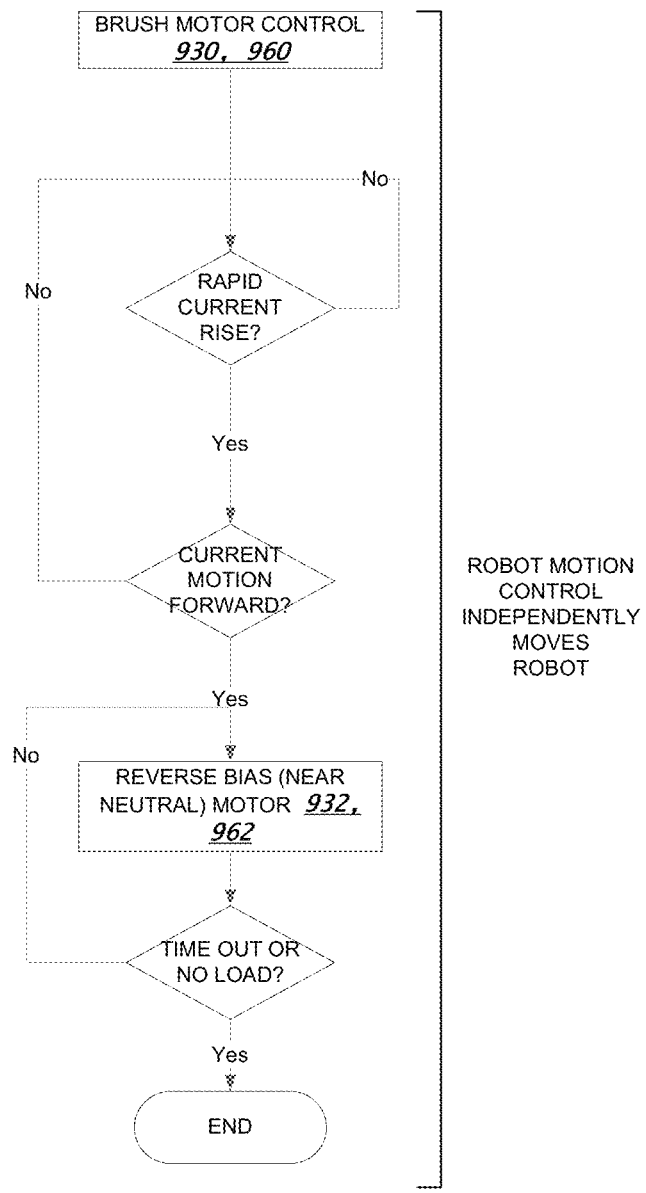

As shown in FIG. 9C, the main cleaning head 106b is controlled by, e.g., a brush motor control process 930. The brush motor control process monitors a current sensor of the main cleaning head motor, and when a rapid current rise occurs (e.g., spike or rise above threshold, integrated or otherwise determined slope of a predetermined amount), optionally checks if the robot is moving forward (e.g., by monitoring a process, a flag indicating forward motion, or the main drive motors directly). If the robot 100 is moving forward, without interrupting such motion (optionally isolated from the capability to do so as the robot motion is controlled by independent behaviorally controlled drive), the brush motor control process 930 applies a reverse bias to the brush motor.

The reverse bias does not rapidly rotate the motor in the reverse direction so as to avoid winding the same entangled cord, string, or tassel about the brush in the opposite direction. Instead, the brush motor control process 930 applies a slight bias, sufficient to keep the rotation of the brush near neutral. When the robot 100 moves forward, the cord, string, or tassel pulling on the brush to unwind the entanglement will only transmit an attenuated torque in the reverse direction to the motor (e.g., because of a reduction gearbox between the motor and brush permitting back-driving the gearbox at a reversed mechanical advantage), but, combined with the reverse bias, the attenuated torque results in assisted but slow unwinding of the entangled brush, of increasing speed as more tension is applied by the cord or string, e.g., as the robot moves further away from the site where the cord or string or tassel is fixed.

The reverse bias continues until a time out or until no pulling or jamming load (e.g., no entanglement) is detected on the motor, whereupon the process ends and the cleaning head resumes normal rotation in a direction to clean the surface.

The edge brush 120 of the edge cleaning head 106a is subject to substantially the same control in an edge brush motor control process 960, in which the edge brush 120 rotation is reverse biased 962 in a similar fashion (also shown in FIG. 9B).

Accordingly, both main 106b and edge 106a brushes are controlled independently of one another and of robot motion, and each may disentangle itself without monitoring or disturbing the other. In some instances, each will become simultaneously entangled, and independent but simultaneous control permits them to the unwound or self-clearing at the same time. In addition, by having the brush motor under reactive control (not awaiting a drive motor state or other overall robot state) and with only a slight reverse bias, the brush will be available to unwind as soon as any rapid current rise is detected, catching an entanglement earlier, but will not move in reverse by any amount sufficient to cause a similar entangling problem in the opposite direction.

In some instances, because the motion control is independent of and does not monitor the brush state, the robot 100 continues to move forward and the cleaning head 106b begins to reverse bias the rotation of main cleaning head 111 after the robot 100 has proceeded some amount forward. In some instances, robot 100 may reverse the rotation of main cleaning head 111 in response to an elevated cleaning head motor current for a period of time. After reversing the rotation of main cleaning head 111, robot 100 may move in a reverse direction, alter a drive direction, and move in the drive direction.

FIGS. 17A-H illustrate examples of methods for disentangling coverage robots with various configurations of cleaning heads. In general, the cleaning heads have rollers which may be driven by electric motors. Dirt and debris may be picked up by the cleaning heads and deposited in a container for later manual or automatic disposal. Electronic control devices may be provided for the control of drive motors for changing the coverage robot's direction, and also for the control of agitating brush rollers. Such methods may allow coverage robots to resume cleaning unattended after encountering an entanglement situation.

FIG. 17A shows a side view of a cleaning head 201 of a coverage robot 200 with an agitating roller 202 in tangential contact with the work surface. Roller 202 brushes up dirt 203 towards a suction duct 204 which is integrated within a brush chamber 206. By using an air suction stream, the collected debris 210 may be conveyed to a container 212.

If the movement of rollers 202 is blocked or obstructed to a predetermined or a settable extent, the cleaning head 201 may be stopped, allowing robot 200 to reverse direction with roller 202 minimally powered in the reverse direction sufficiently enough to release the obstruction. For example, if a cord has become wound about roller 202, the roller 202 may be disengaged and allowed to turn so that the cord unwinds as robot 200 retreats. Robot 200 may then resume operation of roller 202 in the original direction of rotation and resume robot motion in the original direction.

FIG. 17B shows another example of disentanglement using robot 200 with the addition of a brush roller 214. Brush roller 214 may be driven by the same or a different motor and rotate normal to the working surface. Brush roller 214 sends dirt 216 from the edges of robot 200 to a pickup area 218 of roller 202.

In this example, if the movement of either rollers 202 or 212 is blocked or obstructed to a predetermined or a settable extent, cleaning head 201 may be stopped, allowing robot 200 to reverse direction with rollers 202, 212 minimally powered in the reverse direction sufficiently enough to release the obstruction. For example, if a cord becomes wound about either roller 202 or 212, the roller 202 or 212, or both, may be disengaged and allowed to turn so that the cord unwinds as robot 200 retreats. Robot 200 may then resume operation of rollers 202, 212 in the original direction of rotation and resume robot motion in the original direction.

FIG. 17C shows a below view of a coverage robot 240 and a side view of a cleaning head 242 within it. A first brush roller 244 and a second brush roller 246 are in tangential contact with the work surface. Rollers 244 and 246 may be rotated by a single or multiple motors for the purpose of agitating the work surface and dynamically lifting debris 248 trapped between them, towards a suction duct 250 which is integrated within brush chamber 252. By means of an air suction stream 254, the collected debris 256 may be conveyed to a container 258.

If the movement of rollers 244, 246 is blocked or obstructed to a predetermined or a settable extent, rollers 202, 212 may be stopped, allowing robot 240 to advance forward, as shown by arrow 260, with the rollers 202, 212 minimally powered in the reverse direction sufficiently enough to release obstruction, and resume operation of the roller motor in the original direction of rotation.

FIG. 17D shows robot 240 performing an alternate example method for disentanglement. If the movement of the agitating rollers 244, 246 is blocked or obstructed to a predetermined or a settable extent, the rollers 244, 246 may be disengaged (i.e. not actively driven). Robot 240 may then reverse directions, as shown by arrow 262, with rollers 244, 246 minimally powered in the reverse direction sufficiently enough to release the obstruction, upon which rollers 244, 246 may be reengaged in their original direction of rotation and robot 240 resumes driving in its original direction (shown by arrow 264).

Figure 17E:
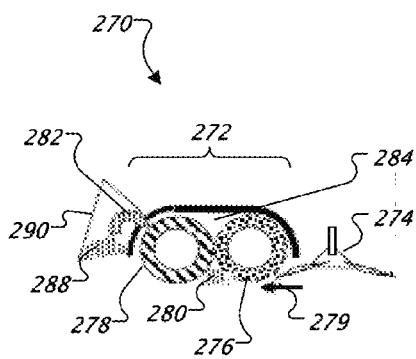

FIG. 17E shows a side view of a coverage robot 270 with three rollers. Robot 270 has a cleaning head 272 and a side brush 274. Cleaning head 272 has a normal agitating roller 276 and a counter-rotating agitating roller 278. Agitating rollers 276 and 278 may be rotationally driven parallel to each other and to the work surface and brush roller 274 may be driven normally to the work surface by electric motor(s) (not shown). Brush roller 274 may pre-sweep the work surface and pushing dirt and debris towards the agitating rollers 276, 278, as shown by arrow 279. Agitating rollers 276, 278 may push dirt 280 towards a suction duct 282 which is integrated within a brush chamber 284. By using an air suction stream, the collected debris 288 may be conveyed to a container 290.

If the movement of agitating rollers 276, 278 is blocked or obstructed to a predetermined or a settable extent, the roller motor(s) may be stopped or temporarily activated in the opposite direction in an attempt to remove the blockage or obstruction. The roller motor(s) may then resume operation in the original direction of rotation.

Figure 17F:
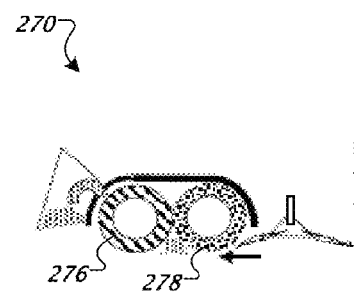

FIG. 17F illustrates another example of a method for disentangling coverage robot 270. If the movement of agitating rollers 276, 278 is blocked or obstructed to a predetermined or a settable extent, the roller motor(s) may be stopped or temporarily activated in the opposite direction. The roller motor(s) may then resume driving rollers 276, 278 in the original direction of rotation while simultaneously reversing the direction of travel of robot 270 or imparting a twisting motion about its axis. Robot 270 may then resume motion in the original direction.

Figure 17G:
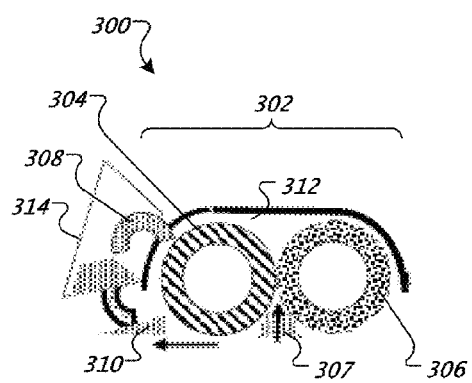

FIG. 17G shows a side view and a bottom view of a coverage robot 300 with two rollers and two air ducts. Robot 300 has a cleaning head 302 a normal agitating roller 304 and a counter-rotating agitating roller 306. Agitating rollers 304 and 306 may be rotationally driven parallel to each other and to the work surface by electric motor(s) (not shown).

Rollers 304, 306 may dynamically lift and push dirt and debris 307 towards a primary air duct 308 which is integrated within a brush chamber 312. Dirt and debris that are passed over by rollers 304, 306 may encounter a secondary air duct 310 located be hind the rollers. A suction stream generated by an air suction motor (not shown) may convey the collected dirt and debris via the ducts 308, 210 to a container 314. Associated electronic control devices provide control to drive motors for turning and changing direction of robot 300, and also for directional control of the agitating rollers 304, 306.

If the movement of the agitating rollers 304, 306 is blocked or obstructed, then the control device do one or more of stopping or minimally powering the roller motor(s) in the reverse direction, then resume operating the roller motor in the original direction of rotation. Simultaneously, robot 300 may at least momentarily reverse its direction or imparting a twisting motion about its axis and then resuming motion in its original direction.

Figure 17H:
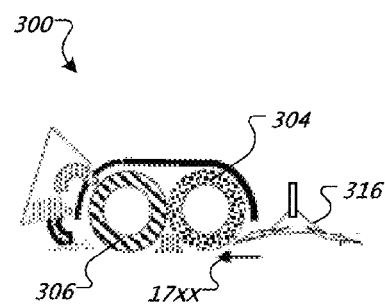

FIG. 17H shows another example of a disentangling method, involving robot 300 with the addition of a brush roller 316. Brush roller 316 has an axis of rotation normal and may be driven by an existing or dedicated electric motor. Brush roller 316 may pre-sweep the work surface and push dirt and debris 318 towards the agitating rollers 304, 306 (as shown by arrow 318). Dirt and debris may then be removed as described above.

If the movement of the agitating rollers 304, 306 is blocked or obstructed, the control device may stop or minimally power the roller motor(s) in the reverse direction reverse, then resume operating the roller motor in the original direction of rotation. Simultaneously, robot 300 may at least momentarily reverse its direction or imparting a twisting motion about its axis and then resuming motion in its original direction.

Other robot details and features combinable with those described herein may be found in the following U.S. patent applications entitled "AUTONOMOUS COVERAGE ROBOT NAVIGATION SYSTEM" having assigned Ser. No. 11/633,869; "MODULAR ROBOT" having assigned Ser. No. 11/633,886; and "ROBOT SYSTEM" having assigned Ser. No. 11/633,883, the entire contents of the aforementioned applications are hereby incorporated by reference.

A number of implementations have been described. Nevertheless, it will be understood that various modifications may be made without departing from the spirit and scope of the following claims. Accordingly, other implementations are within the scope of the following claims.

What is claimed is:

1. An autonomous coverage robot comprising:
   a chassis;
   a drive system mounted on the chassis and configured to maneuver the robot across a floor surface according to a speed setting and a heading setting provided by a controller;
   a cleaning head carried by the chassis and driven by a cleaning head motor to rotate about an axis proximate a forward portion of the chassis, the cleaning head positioned to engage the floor surface while the robot is maneuvered by the drive system;
   a bump sensor responsive to a collision of the robot with an obstacle in a forward direction; and
   a proximity sensor responsive to a potential obstacle forward of the robot,
   wherein the controller is configured to continuously navigate the robot in a cleaning mode while negotiating obstacles by:
      reducing the speed setting in response to a signal from the proximity sensor indicating detection of a potential obstacle, and altering the heading setting in response to a signal received from the bump sensor indicating contact with an obstacle; and
      in response to determining that the cleaning head is entangled:
         altering an angular velocity of the cleaning head; and
         controlling the drive system to maneuver the robot to allow the cleaning head to disentangle as the robot moves.

2. The coverage robot of claim 1, further comprising a motor current sensor in communication with the controller and configured to monitor motor current associated with the cleaning head.

3. The coverage robot of claim 2, wherein the controller is configured to determine that the cleaning head is entangled based on an elevated motor current of the cleaning head motor detected by the motor current sensor.

4. The coverage robot of claim 2, wherein the controller is configured to alter the angular velocity of the cleaning head by reverse biasing the motor current of the cleaning head motor.

5. The coverage robot of claim 2, wherein the controller is configured to alter the angular velocity of the cleaning head by turning off the cleaning head motor.

6. The coverage robot of claim 1, wherein the controller, in response to determining that the cleaning head is entangled, controls the drive system to move the robot backwards, altering a drive direction, and subsequently move the robot forward.

7. The coverage robot of claim 1, wherein the cleaning head comprises a cleaning head body with bristles, rotating about a substantially horizontal axis.

8. The coverage robot of claim 7, wherein the cleaning head further comprises one or more soft flaps disposed along a length of the cleaning head body.

9. The coverage robot of claim 8, wherein the one or more soft flaps are curved lengthwise along the cleaning head body.

10. The coverage robot of claim 1, further comprising an edge cleaning head carried by the chassis and driven by an edge cleaning head motor to rotate about a non-horizontal axis, the edge cleaning head extending beyond a lateral extent of the chassis to engage the floor surface while the robot is maneuvered across the floor.

11. The coverage robot of claim 10, wherein the cleaning head comprises a brush with bristles disposed on a peripheral edge of the robot, rotating about a substantially vertical axis.

12. The coverage robot of claim 1, wherein controlling the drive system to maneuver the robot to allow the cleaning head to disentangle as the robot moves comprises maneuvering the robot such that a flexible member entangled on the cleaning head pulls on the cleaning head to unwind the flexible member from the cleaning head.

13. The coverage robot of claim 1, wherein the drive system is configured to increase the speed setting if the drive system does not receive a subsequent signal indicating the presence of an obstacle while continuing to advance according to the heading setting and the reduced speed setting.

14. The coverage robot of claim 1, wherein the drive system is configured to maneuver the robot at a torque setting, and wherein the controller is configured to alter the torque setting in response to the signal received from the bump sensor indicating contact with an obstacle.

15. The coverage robot of claim 1, wherein the proximity sensor comprises at least one infrared emitter and receive pair.

16. The coverage robot of claim 1, wherein the proximity sensor comprises a sonar device.

17. The coverage robot of claim 1, wherein the bump sensor comprises a switch.

18. The coverage robot of claim 1, wherein the bump sensor comprises a capacitive sensor.

19. The coverage robot of claim 1, wherein the controller is configured to alter the heading setting in response to a signal received from the bump sensor indicating contact with an obstacle by operating the robot to follow a perimeter of the obstacle.

20. The coverage robot of claim 1, wherein the controller is configured to alter the heading setting in response to a signal received from the bump sensor indicating contact with an obstacle by operating the drive system to direct the robot away from the obstacle.

21. An autonomous coverage robot comprising:
a chassis;
a drive system mounted on the chassis and configured to maneuver the robot across a floor surface according to a speed setting and a heading setting provided by a controller;
a cleaning head carried by the chassis and driven by a cleaning head motor to rotate about an axis proximate a forward portion of the chassis, the cleaning head positioned to engage the floor surface while the robot is maneuvered by the drive system;
a bump sensor responsive to a collision of the robot with an obstacle in a forward direction; and
a proximity sensor responsive to a potential obstacle forward of the robot,
wherein the controller is configured to continuously navigate the robot in a cleaning mode while negotiating obstacles by:
reducing the speed setting in response to a signal from the proximity sensor indicating detection of a potential obstacle, and altering the heading setting in response to a signal received from the bump sensor indicating contact with an obstacle;
altering an angular velocity of the cleaning head; and
controlling the drive system to maneuver the robot to allow the cleaning head to disentangle as the robot moves, in response to determining that the cleaning head is entangled.

22. The coverage robot of claim 21, further comprising a motor current sensor in communication with the controller and configured to monitor motor current associated with the cleaning head.

23. The coverage robot of claim 21, wherein the cleaning head comprises a cleaning head body with bristles, rotating about a substantially horizontal axis,
wherein the cleaning head further comprises one or more soft flaps disposed along a length of the cleaning head body, and
wherein the one or more soft flaps are curved lengthwise along the cleaning head body.

24. The coverage robot of claim 21, further comprising an edge cleaning head carried by the chassis and driven by an edge cleaning head motor to rotate about a non-horizontal axis, the edge cleaning head extending beyond a lateral extent of the chassis to engage the floor surface while the robot is maneuvered across the floor.

25. The coverage robot of claim 21, wherein controlling the drive system to maneuver the robot to allow the cleaning head to disentangle as the robot moves comprises maneuvering the robot such that a flexible member entangled on the cleaning head pulls on the cleaning head to unwind the flexible member from the cleaning head.

26. The coverage robot of claim 21, wherein the drive system is configured to maneuver the robot at a torque setting, and wherein the controller is configured to alter the torque setting in response to the signal received from the bump sensor indicating contact with an obstacle.

* * * * *